United States Patent
Masaki et al.

(10) Patent No.: US 7,093,687 B2
(45) Date of Patent: Aug. 22, 2006

(54) ANGLE SENSOR, ANGLE-TORQUE SENSOR AND ELECTRIC POWER STEERING UNIT USING SAME

(75) Inventors: Ryoso Masaki, Tokyo (JP); Satoru Kaneko, Tokyo (JP); Kohji Maki, Tokyo (JP); Ryoichi Menju, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/100,944

(22) Filed: Apr. 7, 2005

(65) Prior Publication Data

US 2005/0173181 A1    Aug. 11, 2005

Related U.S. Application Data

(62) Division of application No. 10/632,743, filed on Jul. 31, 2003, now Pat. No. 6,926,115.

(30) Foreign Application Priority Data

| Jul. 31, 2002 | (JP) | ............................. 2002-222353 |
| Jun. 19, 2003 | (JP) | ............................. 2003-174434 |

(51) Int. Cl.
*B62D 5/04* (2006.01)
*H01F 21/04* (2006.01)

(52) U.S. Cl. ...................... 180/443; 336/115; 336/117; 180/400

(58) Field of Classification Search ........ 336/115–117; 180/443, 446, 400
See application file for complete search history.

(56) References Cited

U.S. PATENT DOCUMENTS

| 4,907,460 | A | * | 3/1990 | Taniguchi et al. ..... 73/862.331 |
| 5,046,372 | A | * | 9/1991 | Taniguchi et al. ..... 73/862.335 |
| 5,363,938 | A | * | 11/1994 | Wilson et al. .............. 180/233 |
| 5,370,588 | A | * | 12/1994 | Sawase et al. ................ 475/84 |
| 5,411,110 | A | * | 5/1995 | Wilson et al. .............. 180/247 |
| 5,703,484 | A | * | 12/1997 | Bieberdorf et al. .... 324/207.22 |
| 6,199,654 | B1 | * | 3/2001 | Kojo et al. ................. 180/443 |
| 6,424,147 | B1 | * | 7/2002 | Kato et al. ............... 324/207.2 |
| 6,852,057 | B1 | * | 2/2005 | Borbolla Gonzalez ...... 475/186 |
| 6,860,159 | B1 | * | 3/2005 | Jin et al. ............... 73/862.331 |

FOREIGN PATENT DOCUMENTS

| JP | 03-361207 | 6/1993 |
| JP | 04-277901 | 4/1994 |
| JP | 11-267851 | 4/2001 |
| JP | 11-270445 | 4/2001 |

* cited by examiner

*Primary Examiner*—Anh Mai
(74) *Attorney, Agent, or Firm*—James B. Conte; Barnes & Thornburg LLP

(57) ABSTRACT

An angle-torque sensor has: a torque detection coil that detects a change in state quantity in a mechanism to detect a relative angle made between input axis and output axis of a torsion bar to be twisted by a torque; an angle detection coil that detects a change in state quantity in a mechanism to detect a rotation angle of a reduction axis which rotates with a rotation being transmitted from the input axis or output axis and being reduced by a reduction mechanism; a torque detection circuit that detects the relative angle from the output of the torque detection coil; and an angle detection circuit that detects the rotation angle from the output of the angle detection coil.

5 Claims, 40 Drawing Sheets

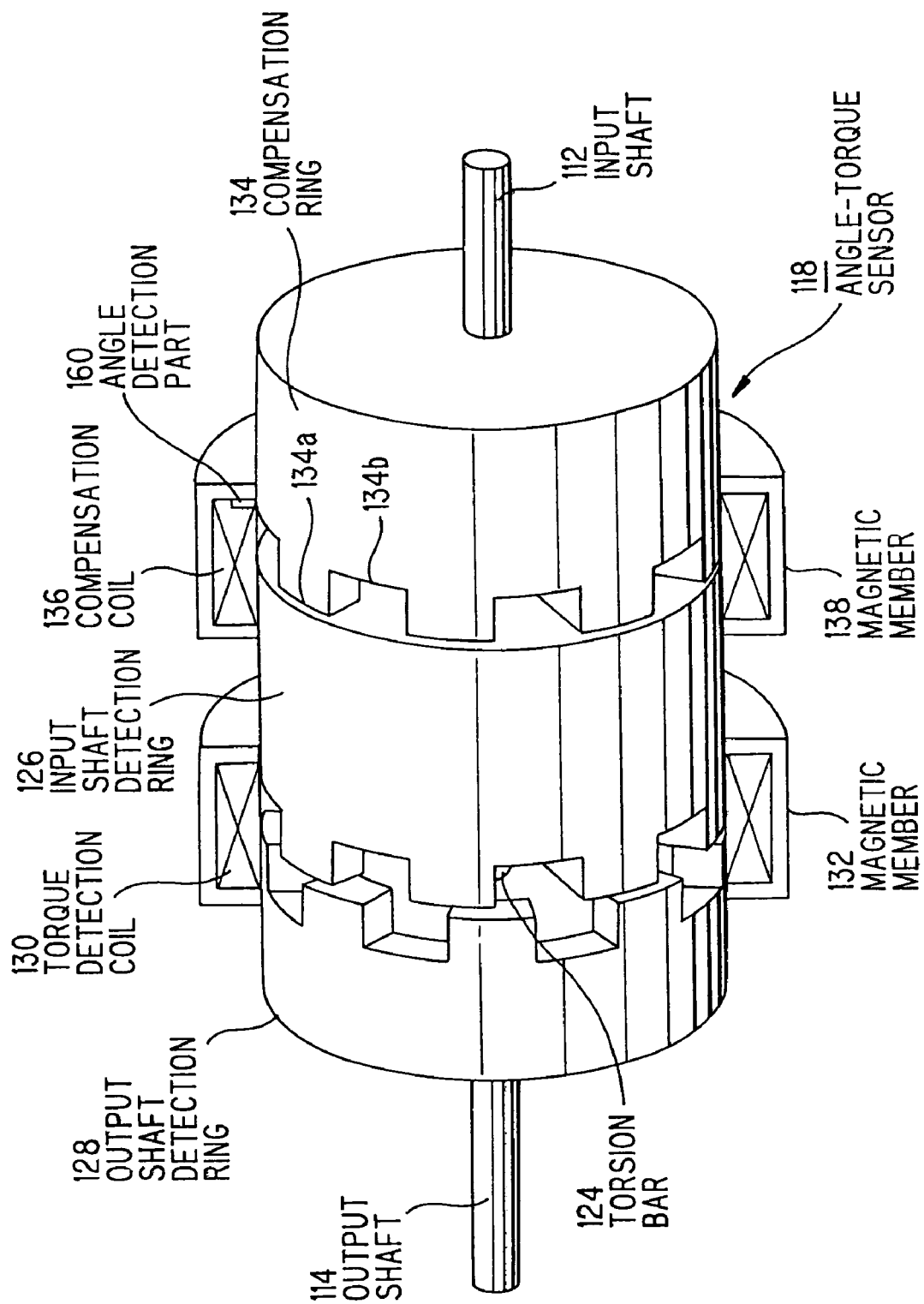

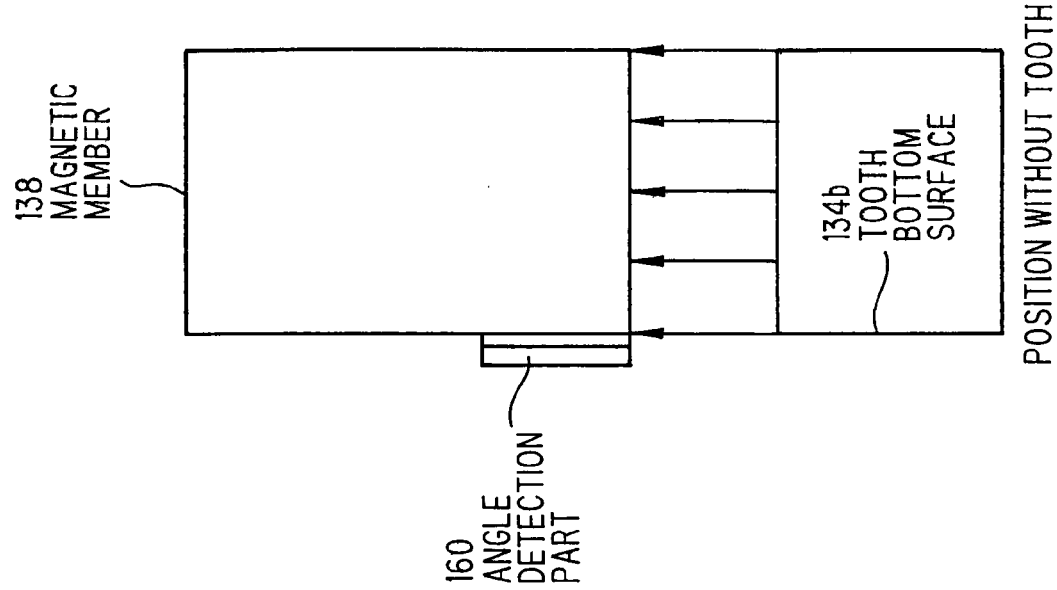
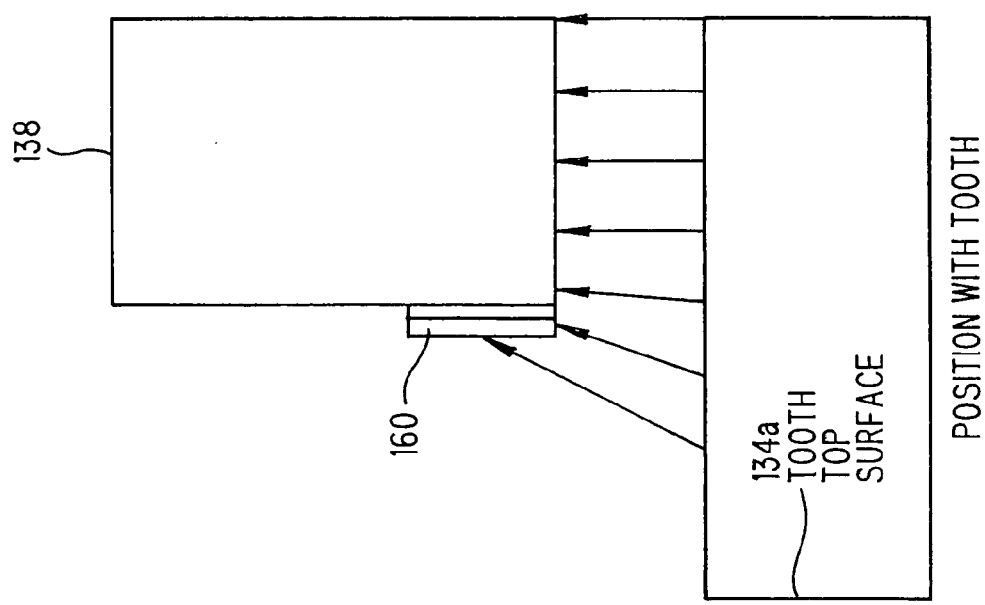

FIG. 26

| ANGLE | 0° | 90° | 180° | 270° |
|---|---|---|---|---|
| FIGURE | FIG.25A | FIG.25B | FIG.25C | FIG.25D |
| MR1 | MINIMUM | MAXIMUM | MAXIMUM | MINIMUM |
| MR2 | MAXIMUM | MINIMUM | MINIMUM | MAXIMUM |
| MR3 | MAXIMUM | MAXIMUM | MINIMUM | MINIMUM |
| MR4 | MAXIMUM | MAXIMUM | MINIMUM | MINIMUM |
| TERMINAL A VOLTAGE | Vo+Vs | Vo | Vo−Vs | Vo |
| TERMINAL B VOLTAGE | Vo | Vo+Vs | Vo | Vo−Vs |

ANGLE
DETECTION
PART 168

ANGLE
DETECTION
PART 170

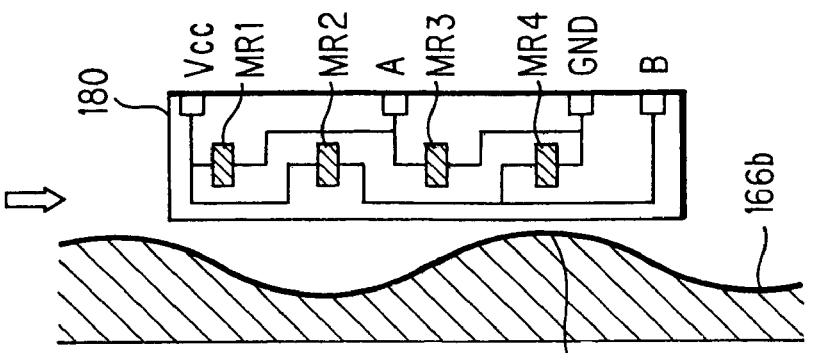
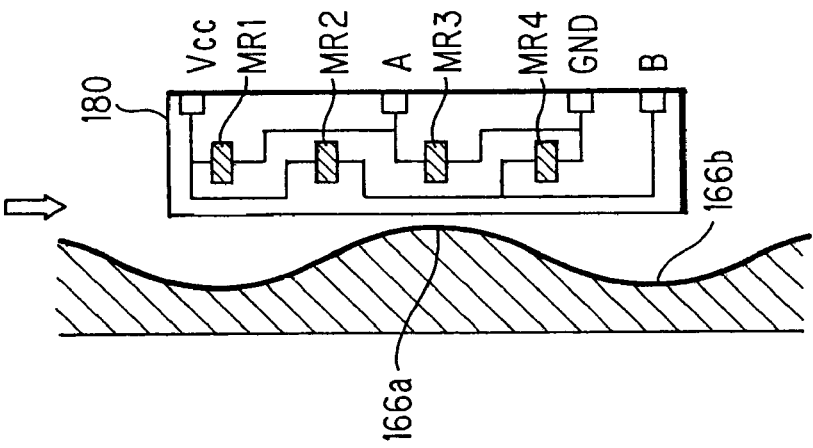
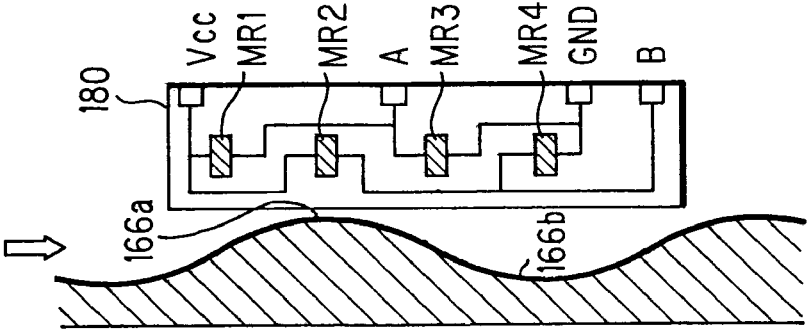
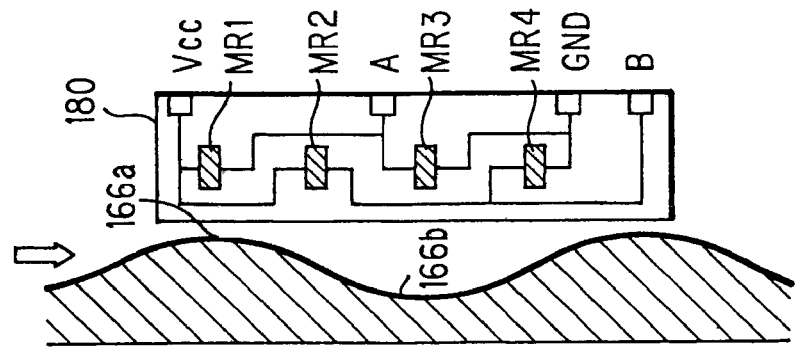

FIG. 33

| ANGLE | 0° | 90° | 180° | 270° |
|---|---|---|---|---|
| FIGURE | FIG.32A | FIG.32B | FIG.32C | FIG.32D |
| MR1 | MINIMUM | MEDIUM | MAXIMUM | MEDIUM |
| MR2 | MEDIUM | MINIMUM | MEDIUM | MAXIMUM |
| MR3 | MAXIMUM | MEDIUM | MAXIMUM | MEDIUM |
| MR4 | MEDIUM | MAXIMUM | MEDIUM | MINIMUM |
| TERMINAL A VOLTAGE | $V_o + V_s$ | $V_o$ | $V_o - V_s$ | $V_o$ |
| TERMINAL B VOLTAGE | $V_o$ | $V_o + V_s$ | $V_o$ | $V_o - V_s$ |

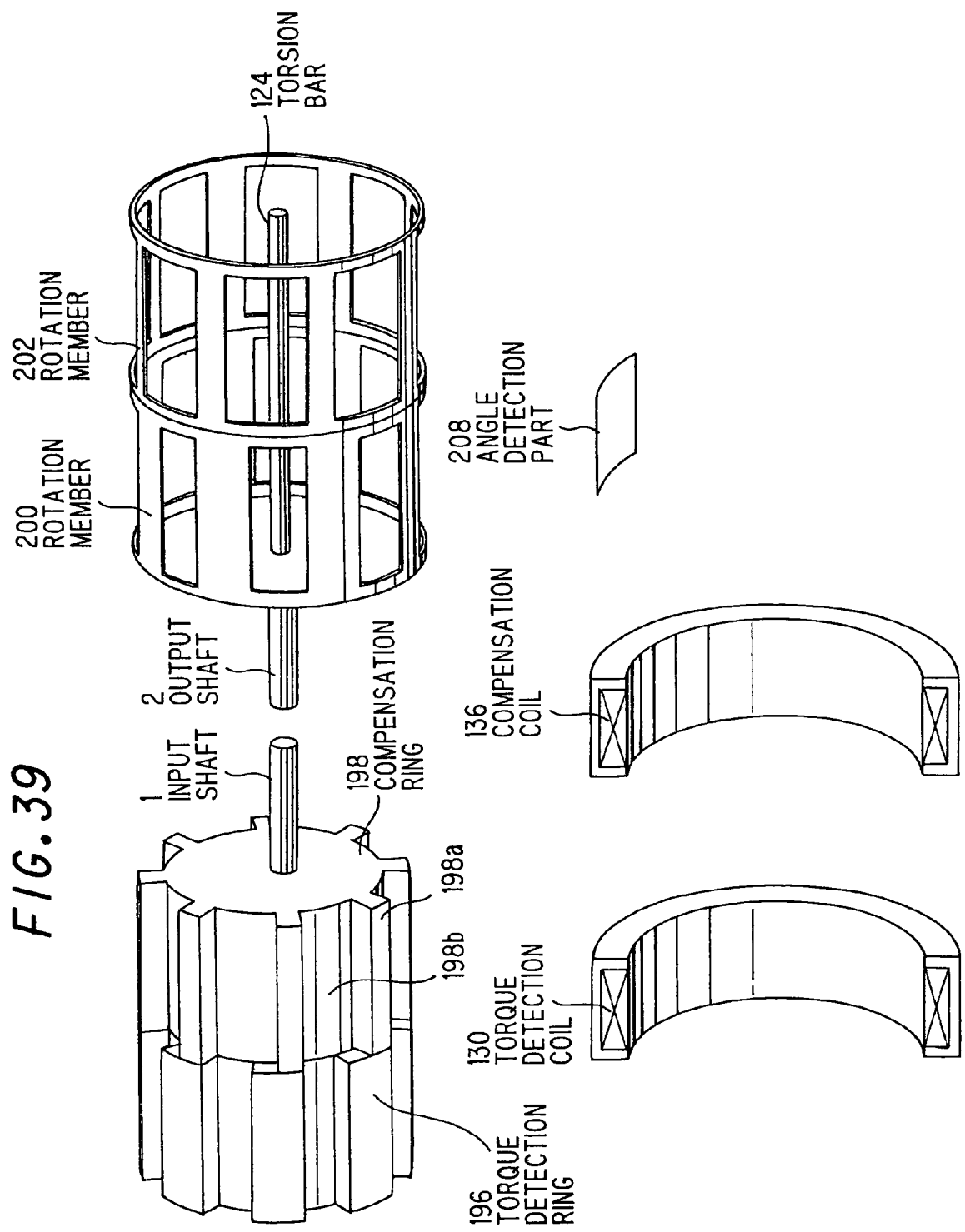

ANGLE 0°

ANGLE 90°

ANGLE 180°

ANGLE 270°

ANGLE SENSOR, ANGLE-TORQUE SENSOR AND ELECTRIC POWER STEERING UNIT USING SAME

The present application is a Divisional of application Ser. No. 10/632,743 filed Jul. 31, 2003 now U.S. Pat. No. 6,926,115. The application is presently pending. The entirety of the application is incorporated herein by reference.

The present application is based on Japanese patent application Nos. 2002-222353 and 2003-174434, the entire contents of which are incorporated herein by reference.

BACKGROUND OF THE INVENTION

1. Field of the Invention

This invention relates to an angle sensor for detecting the rotation angle of a rotating axis, an angle-torque sensor for detecting the rotation angle and torque of a rotating axis, and an electric power steering unit using the angle sensor or angle-torque sensor.

2. Description of the Related Art

Steering sensors are used in an electric power steering unit for automobile in generating a motor torque according to a steering torque by the driver to assist the steering of tires. For example, such a steering sensor is disclosed in Japanese patent application laid-open Nos. 5-149805 and 6-102113. This steering sensor is a noncontact type sensor, detecting the twisting of torsion bar through a change in inductance, thereby obtaining the steering torque. Also, Japanese patent application laid-open Nos. 2001-91375 and 2001-91377 discloses an angle-torque sensor that a torque sensor is integrated with an angle sensor.

For the electric power steering unit, a torque sensor for detecting the steering torque is needed to control the motor torque. An inexpensive torque sensor is desired to lower the manufacturing cost of the electric power steering unit.

Also, for the electric power steering unit, an angle sensor, so called steering angle sensor, for detecting the angle of tires to the straight driving direction of car is needed other than the torque sensor. Because, when the driver releases his hands from the steering wheel while driving a car, the motor should be controlled such that the steering direction of the tires is automatically returned to the straight driving direction as done by a car with no electric power steering unit installed.

By using such an angle-torque sensor that a torque sensor is integrated with an angle sensor as disclosed in Japanese patent application laid-open Nos. 2001-91375 and 2001-91377, the electric power steering unit can have a reduced size.

A sensor is at present desired that can detect the absolute angle of steering axis to make three to four turns with high precision while offering a low manufacturing cost thereof.

In the sensor disclosed in Japanese patent application laid-open No. 2001-91375, a rotation angle of input axis is obtained from the output of first and second magnetic sensors to detect the intensity of magnetic filed in magnetic wave bar disposed on input axis, a steering torque applied to input axis is obtained from an angle difference between a rotation angle of input axis to be obtained from a detection signal of first magnetic sensor for detecting the intensity of magnetic field in magnetic wave bar disposed on input axis and a rotation angle of output axis to be obtained from a detection signal of third magnetic sensor for detecting the intensity of magnetic field in magnetic wave bar disposed on output axis, and its principle is that a fraction of one turn in steering axis is detected as one cycle. In general, since the steering wheel rotates more than one turn clockwise or counterclockwise, the angle sensor is needed to detect an absolute angle of 720° or more. However, the sensor disclosed in Japanese patent application laid-open No. 2001-91375 lacks a precision in detecting the absolute angle since it uses the above principle.

The sensor disclosed in Japanese patent application laid-open No. 2001-91377 is capable of rotating with input axis and sliding in the direction of input axis, a sliding member to which magnets with different polarities are alternately attached on the circumference is fitted into input axis, a change in flux of magnet according to the sliding and rotation in the axis direction of the sliding member is detected by a first and second magnetic sensors, and a steering torque applied to input axis and a rotation angle is thus detected. However, the sensor uses the sliding member with such a complicated structure and, therefore, the manufacturing cost becomes expensive.

SUMMARY OF THE INVENTION

It is an object of the invention to provide an angle sensor that can detect a steering angle as absolute angle with high precision.

It is a further object of the invention to provide a torque-angle sensor that can detect a steering angle and a steering torque with high precision while having a simple structure.

It is a still further object of the invention to provide an electric power steering unit that can detect a steering angle and a steering torque with high precision while having a simple structure.

According to first aspect of the invention, an angle sensor, comprises:

a reduction mechanism that reduces a rotation transmitted from a rotation axis;

a variable inductance mechanism that changes an inductance according to a rotation angle of a reduced axis of the reduction mechanism;

a detection coil that detects the change of inductance; and a circuit that detects the angle of the rotation axis from the output of the detection coil.

According to the invention,

According to second aspect of the invention, an angle sensor, comprises:

a rotation axis;

a magnetic body that rotates according to the rotation of the rotation axis;

a coil that generates a flux in a magnetic path including the magnetic body;

a magnetic sensing element that detects the flux which changes according to the rotation of the rotation axis; and a detection circuit that detects the rotation angle of the rotation axis by using the output of the magnetic sensing element according to the change of flux.

According to third aspect of the invention, an angle sensor, comprises:

a rotation axis;

a magnetic body that includes a tooth portion and rotates according to the rotation of the rotation axis;

a coil that generates a flux in a magnetic path including the magnetic body;

a plurality of magnetic sensing elements that detect a change in flux according to the rotation of the rotation axis in the magnetic path and output alternating signals with different phases from each other; and a detection circuit that detects the rotation angle of the rotation axis by using the alternating signals;

wherein the tooth portion of the magnetic body is capable of moving relatively to the magnetic sensing elements and rotates according to the rotation axis.

According to fourth aspect of the invention, an angle sensor, comprises:

first and second rotation axes disposed on the same axis;

a first magnetic body that rotates according to the rotation of the first rotation axis;

a second magnetic body that rotates according to the rotation of the second rotation axis;

a coil that generates a flux in a magnetic path including the first and second magnetic bodies;

a first magnetic sensing element that detects the flux which changes according to the rotation of the first rotation axis;

a second magnetic sensing element that detects a flux which changes according to the rotation of the second rotation axis; and first and second detection circuits that detect the rotation angle of the first and second rotation axes by using the output of the first and second magnetic sensing elements according to the change of flux.

According to fifth aspect of the invention, an angle sensor, comprises:

a rotation axis;

a magnetic body that rotates according to the rotation of the rotation axis;

a coil that generates a flux in a magnetic path including the magnetic body;

a plurality of magnetic sensing elements that detect the flux which changes according to the rotation of the rotation axis; and a detection circuit that detects the rotation angle of the rotation axis by using the output of the magnetic sensing elements according to the change of flux;

wherein at least one of the plurality of magnetic sensing elements includes a mechanism that rotates being reduced or increased of its speed according to the rotation of the rotation axis.

According to sixth aspect of the invention, an angle sensor, comprises:

a rotation axis;

a first magnetic body that rotates with the rotation axis;

a second magnetic body that rotates reducing or increasing the speed of the rotation axis;

a coil that generates a flux in a magnetic path formed by the first and second magnetic bodies;

a first magnetic sensing element that detects the flux which changes according to the rotation of the first magnetic sensing element;

a second magnetic sensing element that detects a flux which changes according to the rotation of the second magnetic sensing element; and a detection circuit that detect the rotation angle of the rotation axis from a difference between the outputs of the first and second magnetic sensing elements according to the change of flux.

According to seventh aspect of the invention, an angle-torque sensor, comprises:

a torque detection coil that detects a change in state quantity in a mechanism to detect a relative angle made between input axis and output axis of a torsion bar to be twisted by a torque;

an angle detection coil that detects a change in state quantity in a mechanism to detect a rotation angle of a reduction axis which rotates with a rotation being transmitted from the input axis or output axis and being reduced by a reduction mechanism;

a torque detection circuit that detects the relative angle from the output of the torque detection coil; and an angle detection circuit that detects the rotation angle from the output of the angle detection coil.

According to eighth aspect of the invention, an angle-torque sensor, comprises:

first and second rotation axes that are connected to a torsion bar to be twisted by a torque;

a first magnetic body that rotates with the first rotation axis;

a second magnetic body that rotates with the second rotation axis;

a torque detection coil that generates a flux in a magnetic path including the first and second magnetic bodies;

a torque detection circuit that detects the output voltage of the torque detection coil which changes according to a relative position between the first and second magnetic bodies;

a third magnetic body that rotates according to the rotation of the second rotation axis;

a compensation coil that generates a flux in a magnetic path including the second and third magnetic bodies;

a compensation circuit that corrects the output of the torque detection circuit by using the output voltage of the compensation coil;

a first magnetic sensing element that detects a flux which changes according to the rotation of the third magnetic body; and a first angle detection part that detects the rotation angle of the third magnetic body from the output of the first magnetic sensing element according to the change in flux.

According to ninth aspect of the invention, an angle-torque sensor, comprises:

first and second rotation axes that are connected to a torsion bar to be twisted by a torque;

a first magnetic body that rotates with the first rotation axis;

a nonmagnetic body that rotates with the second rotation axis;

a torque detection coil that generates a flux in a magnetic path formed by the first magnetic body and being shielded by the nonmagnetic body;

a torque detection circuit that detects the output voltage of the torque detection coil which changes according to a relative position between the first magnetic body and the nonmagnetic body;

a second magnetic body that rotates with the first or second rotation axis;

a compensation coil that generates a flux to the second magnetic body;

a compensation circuit that corrects the output of the torque detection circuit by using the output voltage of the compensation coil;

a magnetic sensing element that detects a flux of the second magnetic body which changes according to the rotation of the first or second magnetic body; and an angle detection part that detects the rotation angle of the first or second magnetic body from the output of the magnetic sensing element according to the change in flux.

According to tenth aspect of the invention, an electric power steering unit, comprises:

a motor that drives a steering rotation axis;

a steering sensor that includes: a torque detection coil that is disposed on the rotation axis and detects a change in state quantity in a mechanism to detect a steering angle from a relative angle made between input axis and output axis of a torsion bar to be twisted by the steering torque; an angle detection coil that detects a change in state quantity in a mechanism to detect a steering angle from a rotation being transmitted from the input axis or output axis and being reduced by a reduction mechanism; a torque detection circuit that detects the steering torque by detecting the relative angle from the output of the torque detection coil; and an angle detection circuit that detects the steering angle from the output of the angle detection coil; and a controller that controls the motor based on the steering torque and steering angle to be detected by the steering sensor.

According to eleventh aspect of the invention, an electric power steering unit, comprises:

a steering sensor that includes: a first and second rotation axes that are connected to a torsion bar to be twisted by a steering torque; a first magnetic body that rotates with the first rotation axis; a second magnetic body that rotates with the second rotation axis; a torque detection coil that generates a flux in a magnetic path including the first and second magnetic bodies; a torque detection circuit that detects the output voltage of the torque detection coil which changes according to a relative position between the first and second magnetic bodies; a third magnetic body that rotates according to the rotation of the second rotation axis; a compensation coil that generates a flux in a magnetic path including the second and third magnetic bodies; a compensation circuit that corrects the output of the torque detection circuit by using the output voltage of the compensation coil; a first magnetic sensing element that detects a flux which changes according to the rotation of the third magnetic body; and a first angle detection part that detects the rotation angle of the third magnetic body from the output of the first magnetic sensing element according to the change in flux; and a motor that drives a steering rotation axis;

wherein the torque of the motor is controlled by using the steering torque and steering angle detected by the steering sensor.

BRIEF DESCRIPTION OF THE DRAWINGS

The preferred embodiments according to the invention will be explained below referring to the drawings, wherein:

FIG. 21 is a perspective view showing an angle-torque sensor in the sixth preferred embodiment according to the invention;

FIGS. 22A and 22B are illustrations showing the state of magnetic flux generated toward the angle detection part 160 in FIG. 21;

FIG. 26 is a table showing the operation of the magnetoresistance effect elements MR1 to MR4 in FIG. 23 when the compensation ring 134 rotates in the sixth embodiment;

FIGS. 32A to 32D are illustrations showing relative positions between the compensation ring 166 and an angle detection part 180 with magnetoresistance effect elements MR1 to MR4 in FIG. 31 when the compensation ring 166 rotates in the seventh embodiment;

FIG. 33 is a table showing the operation of the magnetoresistance effect elements MR1 to MR4 in FIG. 31 when the compensation ring 166 rotates in the seventh embodiment;

FIG. 39 is a broken view of the angle-torque sensor in FIG. 38; and

DETAILED DESCRIPTION OF THE PREFERRED EMBODIMENTS

Figure 1:
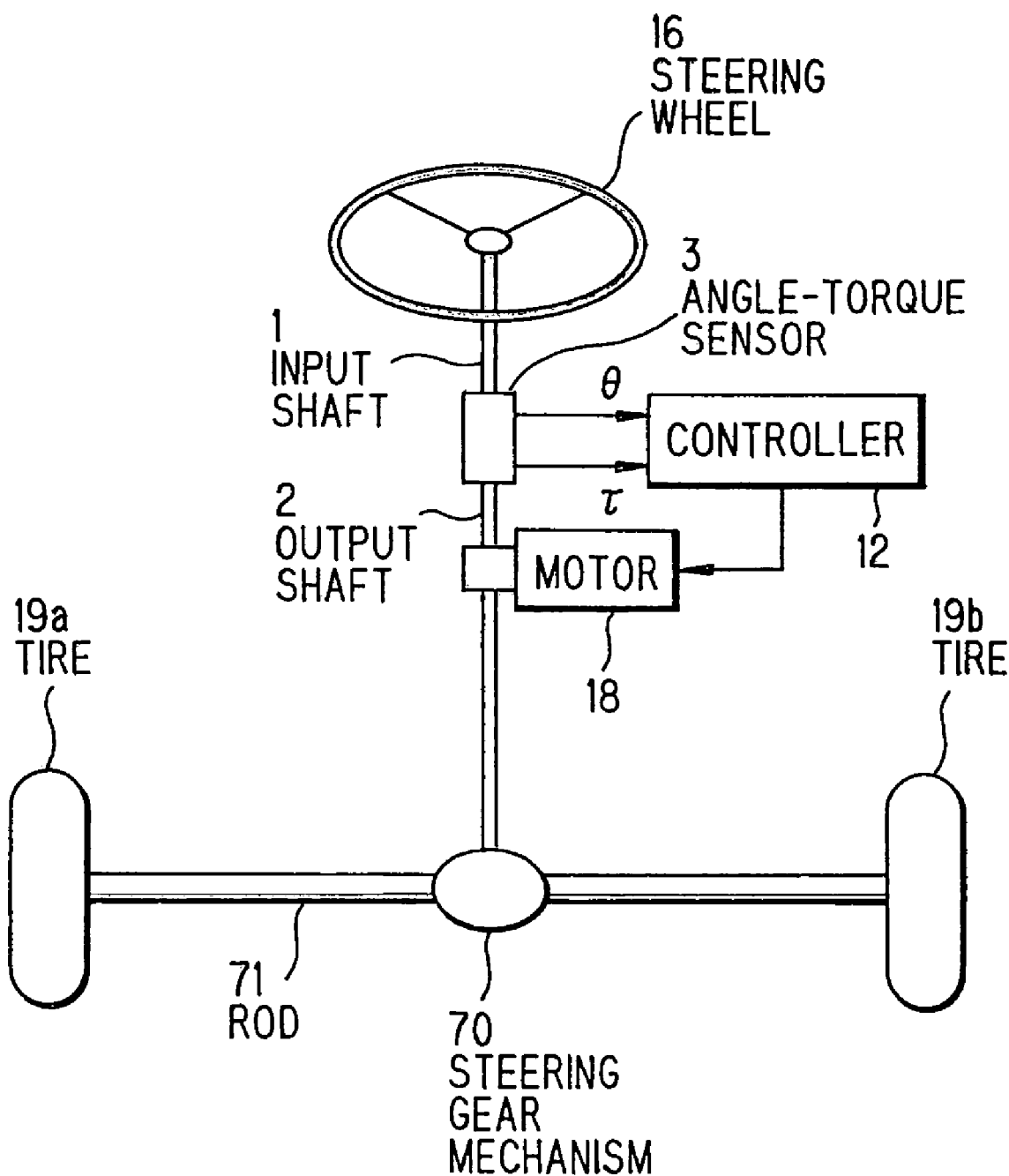
FIG. 1 shows the composition of an electric power steering unit in a preferred embodiment according to the invention.

FIG. 1 shows the composition of an electric power steering unit in the preferred embodiment according to the invention. The electric power steering unit can be installed in vehicles such as automobile such that a motor torque generates according to a steering torque by driver to assist the steering of tires. One end of an input shaft 1 is connected with a steering wheel 16 to transmit the steering torque by driver. The other end of the input shaft 1 is connected through a torsion bar (not shown) to one end of an output shaft 2. The other end of the output shaft 2 is connected through a steering mechanism 70 to a rod 71. Tires 19a, 19b are rotatably connected with one end of the rod 71. The input shaft 1 and the output shaft 2 rotate according to the steering torque to be transmitted through the steering wheel 16 from driver. The input shaft 1 and the output shaft 2 are herein collectively called a steering shaft (steering axis). The rotation of the steering shaft is converted to a linear motion in the longitudinal direction of the rod 71. Thus, the tires 19a, 19b can be steered to the left or right from the straight driving direction of car.

A steering direction is defined as a direction that the center line extending along the center of the outer width of the tire 19a or 19b in the direction of the rotation axis of the tire 19a or 19b is directed to the straight driving direction of car. A steering angle is defined as an angle that the steering direction takes to the straight driving direction of car around the intersecting point of the center line and the rotation axis line. When the steering direction of the tires 19a, 19b is in the same direction as the straight driving direction of car (i.e., a steering angle of zero), it is called steering center that defines the reference of steering angle. Provided that a reference position of the steering wheel 16 is defined as its rotation position taken when the steering direction of the tires 19a, 19b lies at the steering center, the direction that the steering wheel 16 rotates clockwise from the reference position is called a positive direction and the direction that the steering wheel 16 rotates counterclockwise from the reference position is called a negative direction. Further, in the operating of the steering wheel 16 by driver, a steering torque applied to the steering wheel 16 when the steering wheel 16 is steered (rotated) in the positive direction is called positive; steering torque and a steering torque applied to the steering wheel 16 when the steering wheel 16 is steered (rotated) in the negative direction is called negative steering torque. Meanwhile, when the steering wheel 16 lies in the reference position, the steering torque applied to the steering wheel 16 is zero. Furthermore, the direction same as that the axis line of the steering shaft extends is called a steering axis direction.

As shown in FIG. 1, there is provided an angle-torque sensor (or steering sensor) 3, between an input shaft 1 and an output shaft 2, that detects a steering torque transmitted from the driver through a steering wheel 16 to the steering shaft and a steering angle of tires 19a, 19b. The rotation shaft of a motor 18 is connected to the output shaft 2 such that the rotation torque of the motor 18 can be transmitted to the output shaft 2 as the assist torque. There is electrically connected a controller 17, between the angle-torque sensor 3 and the motor 18, that controls the motor 18 to be rotated according to the output (detection result) of the angle-torque sensor 3.

The controller 17 calculates an assist torque to be generated by the motor 18 based on the steering torque detected by the angle-torque sensor 3, and it controls the torque to be generated by the motor 18 based on the result of calculation. Thus, the electric power steering unit adds the assist torque generated by the motor 18 to the output shaft 2, so that the driver can steer the tires 19a, 19b with a smaller steering torque.

Also, the controller 17 controls the motor 18 to be rotated based on a steering angle that is fed backed while being detected by the angle-torque sensor 3. Thus, the electric power steering unit controls the motor 18 to add the torque generated by the motor 18 to the output shaft 2. Therefore, when the driver releases his hands from the steering wheel 16 while driving a car, the steering direction of the tires 19a, 19b can be returned to the steering center, i.e., a steering angle of zero as done by a car with no electric power steering unit installed.

In this embodiment, the angle-torque sensor 3 with an angle sensor and a torque sensor to detect the steering torque and angle is integrally provided on the steering shaft. Therefore, the controller 17 and the motor 18 can be made compact and the entire electric power steering unit can be miniaturized. Furthermore, the angle-torque sensor 3, the controller 17 and the motor 18 can be integrated, and the entire electric power steering unit can be further miniaturized.

Figure 2:
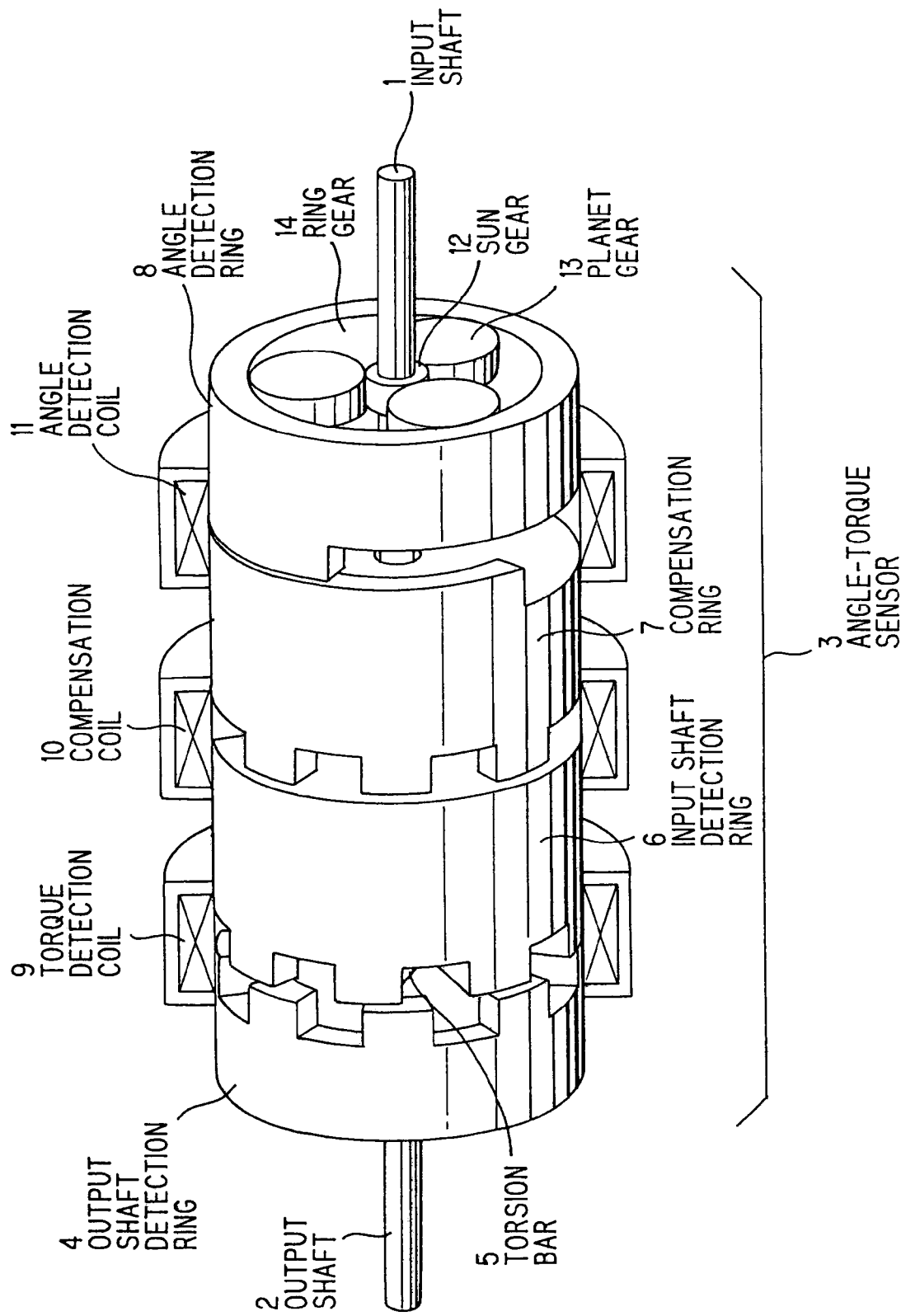
FIG. 2 is a perspective view showing an angle-torque sensor in a first preferred embodiment according to the invention.

FIG. 2 shows the structure of an angle-torque sensor in the first preferred embodiment according to the invention. The angle-torque sensor 3 is a noncontact steering sensor using a change in inductance caused by the rotation of steering shaft. It is structured such that a torque sensor for detecting the torsion angle, i.e., steering torque, of a torsion bar by sensing a change in inductance and an angle sensor for detecting the steering angle from a change in inductance are integrated to offer a compact unit.

As shown in FIG. 2, there is connected the torsion bar 5 between the input shaft 1 and the output shaft 2. The torsion bar 5 twists according to the steering torque. An input shaft detection ring 6 is disposed on the input shaft 1 side of the torsion bar 5. The input shaft detection ring 6 rotates together with the input shaft 1. An output shaft detection ring 4 is disposed on the output shaft 2 side of the torsion bar 5. The output shaft detection ring 4 rotates together with the output shaft 2. The input shaft detection ring 6 and the output shaft detection ring 4 are in the form of short-cylindrical (i.e., a cylinder with a length shorter than its diameter) magnetic member and are disposed opposed to each other on the steering shaft.

Figure 3:
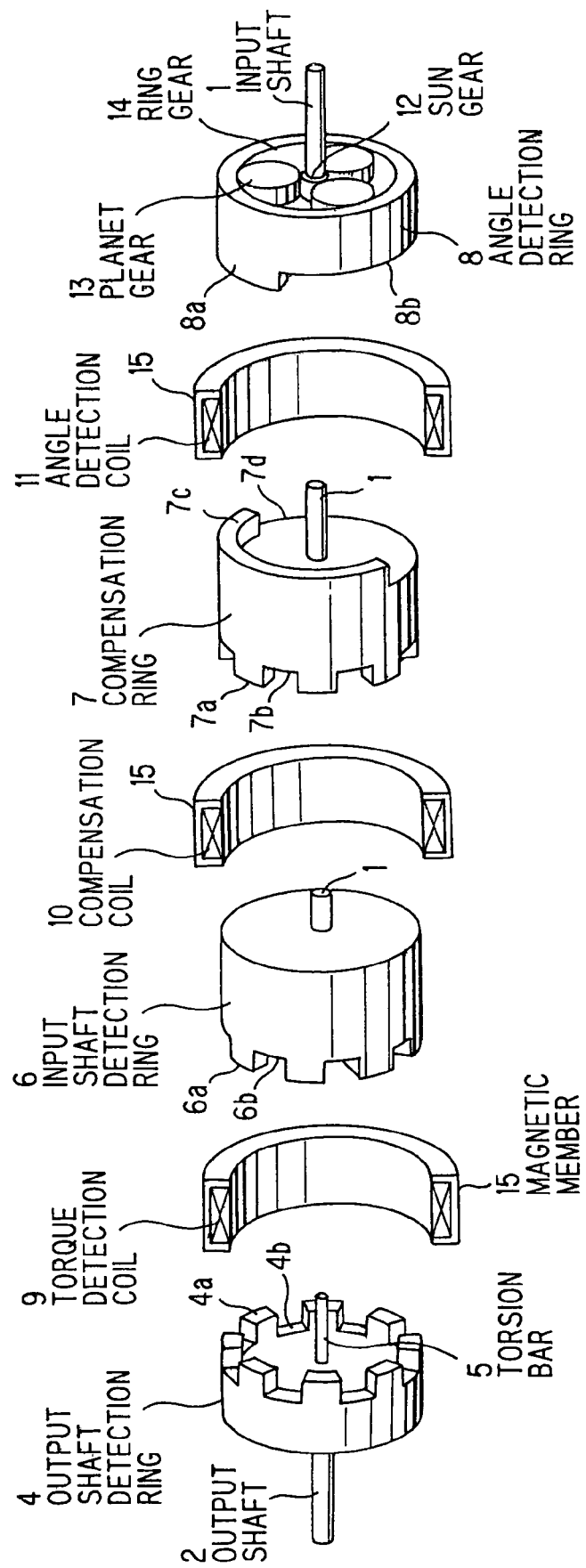
FIG. 3 is a broken view showing the angle-torque sensor in FIG. 2.

FIG. 3 is a broken view of the angle-torque sensor in FIG. 2. As shown, at one end (on the side of the output shaft detection ring 4) of the input shaft detection ring 6, there are alternately provided, on the circumference of the input shaft detection ring 6, a plurality of arc-shaped protrusions 6a protruding in the direction opposed to the output shaft detection ring 4 (in the steering axis direction) and a plurality of arc-shaped grooves 6b receding in the direction reverse to that opposed to the output shaft detection ring 4 to form a tooth portion. Also, at one end (on the side of the input shaft detection ring 6) of the output shaft detection ring 4, there are alternately provided, on the circumference of the output shaft detection ring 4, a plurality of arc-shaped protrusions 4a protruding in the direction opposed to the input shaft detection ring 6 (in the steering axis direction) and a plurality of arc-shaped grooves 4b receding in the direction reverse to that opposed to the input shaft detection ring 6 to form a tooth portion. The number, size and arrangement pitch on the circumference (distance between the centers of neighboring protrusions or grooves) of the protrusions 6a, 4a or grooves 6b, 4b are equal between the input shaft detection ring 6 and the output shaft detection ring 4.

As shown in FIG. 3, there is provided a torque detection coil 9, which is fixed to the car body, outside the input shaft detection ring 6 and the output shaft detection ring 4 while being closely opposed both to the outer surface of the tooth portion of the input shaft detection ring 6 and the outer surface of the tooth portion of the output shaft detection ring 4. The torque detection coil 9 is covered with a magnetic member 15 on its outer surface, except for its inner surface being opposed to the outer surface of the tooth portion of the input shaft detection ring 6 and the output shaft detection ring 4. The magnetic member 15, the input shaft detection ring 6 and the output shaft detection ring 4 are, composing a magnetic circuit that fluxes generated by the torque detection coil 9 pass through.

In operation, the driver operates the steering wheel 16, the steering torque by the driver is transmitted through the steering wheel 16 to the input shaft 1, the input shaft 1 rotates, and the torsion bar 5 is thereby twisted. Due to the twisting of the torsion 20 bar 5, there occurs a displacement in relative circumferential position between the tooth portion of the input shaft detection ring 6 and the opposing tooth portion of the output shaft detection ring 4. Therefore, the opposing area of the protrusion 6a in the tooth portion of the input shaft detection ring 6 and the protrusion 25, 4a in the tooth portion of the output shaft detection ring 4 is changed, the degree of magnetic coupling in the magnetic circuit composed of the magnetic member 15, the input shaft detection ring 6 and the output shaft detection ring 4 is changed, and the inductance of the torque detection coil 9 is thereby changed. Such a change in inductance can be detected through a voltage generated at the torque detection coil 9 while applying a high-frequency voltage to the torque detection coil 9. Thus, by detecting a change in inductance, a displacement in relative circumferential position (a relative angle) between the input shaft detection ring 6 and the output shaft detection ring 4 can be detected. As a result, the steering torque being applied to the input shaft 1 can be detected.

In the angle-torque sensor 3 of this embodiment, the relative circumferential position between the input shaft detection ring 6 and the output shaft detection ring 4 is set such that, when the steering torque is zero, the protrusion 6a in the tooth portion of the input shaft detection ring 6 opposes to the protrusion 4a in the tooth portion of the input shaft detection ring 6 while having a half opposing area to each other. Thus, in the angle-torque sensor 3 of this embodiment, a change in inductance can be detected that is approximately in the middle of the maximum change and the minimum change of inductance.

As shown in FIG. 3, a compensation ring 7 is disposed neighboring the input shaft detection ring 6 on the reverse side to the output shaft detection ring 4. The compensation ring 7 is in the form of hollow short-cylindrical magnetic member and is opposed to the input shaft detection ring 6 on the input shaft 1. Also, the compensation ring 7 is fixed separated from the input shaft 1 such that it is not rotated with the input shaft 1. In detail, the compensation ring 7 is disposed on the input shaft 1 such that the input shaft 1 penetrates through the hollow of the compensation ring 7 while having a predetermined clearance between the outer surface of the input shaft 1 and the inner surface of the hollow and the input shaft 1 lies concentrically with the compensation ring 7.

At one end (on the side of the input shaft detection ring 6) of the compensation ring 7, there are alternately provided, on the circumference of the compensation ring 7, a plurality of arc-shaped protrusions 7a protruding in the direction opposed to the input shaft detection ring 6 (in the steering axis direction) and a plurality of arc-shaped grooves 7b receding in the direction reverse to that opposed to the input shaft detection ring 6 to form a tooth portion. The number, size and arrangement pitch on the circumference (distance between the centers of neighboring protrusions or grooves) of the protrusions 6a, 7a or grooves 6b, 7b are equal between the input shaft detection ring 6 and the compensation ring 7.

As shown in FIG. 3, there is provided a compensation coil 10, which is fixed to the car body, outside the input shaft detection ring 6 and the compensation ring 7 while being closely opposed both to the outer surface of the tooth portion of the input shaft detection ring 6 and the outer surface of the tooth portion of the compensation ring 7. The compensation coil 10 detects an inductance that is determined by the input shaft detection ring 6 rotating together with the input shaft 1 and the compensation ring 7 being fixed. When the torque detection coil 9 detects a change in inductance, the output value may vary depending on temperature. The compensation coil 10 serves to compensate such a variation in the output value of the torque detection coil 9 depending on temperature.

The compensation coil 10 is covered with a magnetic member 15 on its outer surface, except for its inner surface being opposed to the outer surface of the tooth portion of the compensation ring 7 and the outer surface of one end of the input shaft detection ring 6 on the side of the compensation ring 7. The magnetic member 15, the compensation ring 7 and the input shaft detection ring 6 are composing a magnetic circuit that fluxes generated by the compensation coil 10 pass through.

In operation, the driver operates the steering wheel 16, the steering torque by the driver is transmitted through the steering wheel 16 to the input shaft 1, the input shaft 1 rotates, and, thereby, there occurs a displacement in relative circumferential position between the input shaft detection ring 6 and the compensation ring 7. At that time, as described earlier, the compensation ring 7 is fixed and therefore does not rotate, and the input shaft detection ring 6 has no tooth portion on the side of the compensation ring 7. Therefore, the degree of magnetic coupling in the magnetic circuit composed of the magnetic member 15, the input shaft detection ring 6 and the compensation ring 7 is constant. The inductance of the compensation coil 10 does not vary according to the displacement in relative circumferential position between the input shaft detection ring 6 and the compensation ring 7, and it varies depending on only environmental conditions such as temperature. Such a change in inductance of the compensation coil 10, which depends on only the environmental conditions, can be detected through a voltage generated at the compensation coil 10 while applying a high-frequency voltage to the compensation coil 10. Thus, by subtracting the output value of the compensation coil 10 from the output value of the torque detection coil 9, the output of the torque detection coil 9, which may vary depending on the environmental conditions such as temperature, can be compensated.

In this embodiment, by providing the compensating means composed of the compensation ring 7 and the compensation coil 10, even when the environmental temperature varies, influences on the coil resistance and output property of the torque detection coil 9 can be compensated. Therefore, the detection of torque can be conducted with high precision while offering a simple composition. Also, a change in inductance is determined by the sum of opposing areas of the protrusion 6a in the tooth portion of the input shaft detection ring 6 and the protrusion 4a in the tooth portion of the output shaft detection ring 4. This reduces a degree that the precision in processing the tooth portions of the input shaft detection ring 6 and the output shaft detection ring 4 influences on the inductance. Accordingly, in this embodiment, a stable performance of torque sensor can be obtained while offering a simple composition.

As shown in FIG. 3, an angle detection ring 8 is disposed neighboring the compensation ring 7 on the reverse side to the input shaft detection ring 6. The angle detection ring 8 is opposed to the compensation ring 7 on the input shaft 1. The angle detection ring 8 is a planetary gear unit that is composed of a sun gear 12 fixed onto the input shaft 1, a plurality of planet gears 13 disposed outside the sun gear 12 to engage with the sun gear 12, and a ring gear 14 disposed surrounding the plurality of planet gears 13 to engage with the planet gears 13. The angle detection ring 8 is composed such that the rotation of the input shaft 1 is transmitted to the ring gear 14 (reduction gear) while reducing the rotation. The ring gear 14 is of a magnetic material. In this embodiment, by using the planetary gear unit as reducing mechanism, the rotation of the input shaft 1 can be reduced while offering a compact size to the unit.

At one end (on the side of the compensation ring 7) of the angle detection ring 8, there are provided, on the circumference (which corresponds to the ring gear 14) of the angle detection ring 8, an arc-shaped protrusion 8a protruding in the direction opposed to the compensation ring 7 (in the steering axis direction) and an arc-shaped groove 8b receding in the direction reverse to that opposed to the compensation ring 7 to form a tooth portion. Also, at one end (on the side of the angle detection ring 8) of the compensation ring 7, there are provided, on the circumference of the compensation ring 7, an arc-shaped protrusion 7c protruding in the direction opposed to the angle detection ring 8 (in the steering axis direction) and an arc-shaped groove 7d receding in the direction reverse to that opposed to the angle detection ring 8 to form a tooth portion. The protrusion 8a and the groove 8b have a length half of the circumference of the angle detection ring 8, and the protrusion 7c and the groove 7d have a length half of the circumference of the compensation ring 7. The size of the protrusions 8a, 7c or grooves 8b, 7d is equal between the angle detection ring 8 and the compensation ring 7.

As shown in FIG. 3, there is provided an angle detection coil 11, which is fixed to the car body, outside the compensation ring 7 and the angle detection ring 8 while being closely opposed both to the outer surface of the tooth portion of the compensation ring 7 and the outer surface of the tooth portion of the angle detection ring 8. The angle detection coil 11 is covered with a magnetic member 15 on its outer surface, except for its inner surface being opposed to the outer surface of the tooth portion of the compensation ring 7 and the outer surface of the angle detection ring 8. The magnetic member 15, the compensation ring 7 and the angle detection ring 8 (ring gear 14) are composing a magnetic circuit that fluxes generated by the angle detection coil 11 pass through.

The steering wheel 16 rotates two turns each in the positive and negative directions from the reference position. Namely, it rotates totally 1440° in absolute angle. In this embodiment, the rotation of the input shaft 1 is reduced to a reduction ratio of 1/8 by using the planetary gear unit, and the angle detection ring 8 (ring gear 14) is thus rotated 180° at the maximum. In such a rotation, a change in inductance is detected by the angle detection coil 11, and then the steering angle is detected from the output value of the angle detection coil 11. Although in this embodiment a reduction ratio of 1/8 is described about, it may be 1/4 to 1/10.

In operation, the driver operates the steering wheel 16, the steering torque by the driver is transmitted through the steering wheel 16 to the input shaft 1, and the input shaft 1 rotates. The rotation of the input shaft 1 is transmitted to the sun gear 12 and then transmitted through the planet gears 13 to the ring gear 14 while being reduced. Due to this, there occurs a displacement in relative circumferential position between the tooth portion of the compensation ring 7 and the opposing tooth portion of the angle detection ring 8. Therefore, the opposing area of the protrusion 7c in the tooth portion of the compensation ring 7 and the protrusion 8a in the tooth portion of the angle detection ring 8 is changed, the degree of magnetic coupling in the magnetic circuit composed of the magnetic member 15, the compensation ring 7 and the angle detection ring 8 is changed, and the inductance of the angle detection coil 11 is thereby changed. Such a change in inductance can be detected through a voltage generated at the angle detection coil 11 while applying a high-frequency voltage to the angle detection coil 11. Thus, by detecting a change in inductance, a displacement in relative circumferential position (a relative angle) between the angle detection ring 8 and the angle detection coil 11 can be detected. As a result, the rotation angle of the input shaft 1, i.e., steering angle can be detected.

When the steering angle becomes maximum in the positive direction of the steering wheel 16, the opposing area of the protrusion 7c in the tooth portion of the compensation ring 7 and the protrusion 8a in the tooth portion of the angle detection ring 8 becomes maximum. On the other hand, when the steering angle becomes maximum in the negative direction of the steering wheel 16, the opposing area of the protrusion 7c in the tooth portion of the compensation ring 7 and the protrusion 8a in the tooth portion of the angle detection ring 8 becomes minimum. When the steering angle is zero, the opposing area of the protrusion 7c in the tooth portion of the compensation ring 7 and the protrusion 8a in the tooth portion of the angle detection ring 8 is at the average of the maximum area and the minimum area. In this embodiment, the steering angle is made zero when at the average.

The input shaft detection ring 6, the output shaft detection ring 4, the compensation ring 7 and the angle detection ring 8 have the same diameter and are coaxially disposed on the steering shaft. The torque detection coil 9, the compensation coil 10 and the angle detection coil 11 are in the form of a ring and are disposed coaxially with the horizontally-aligned unit including the input shaft detection ring 6, the output shaft detection ring 4, the compensation ring 7 and the angle detection ring 8. Meanwhile, in FIGS. 2 and 3, the coils 9, 10 and 11 are shown in the form of a half ring for convenience of explanation.

Figure 4:
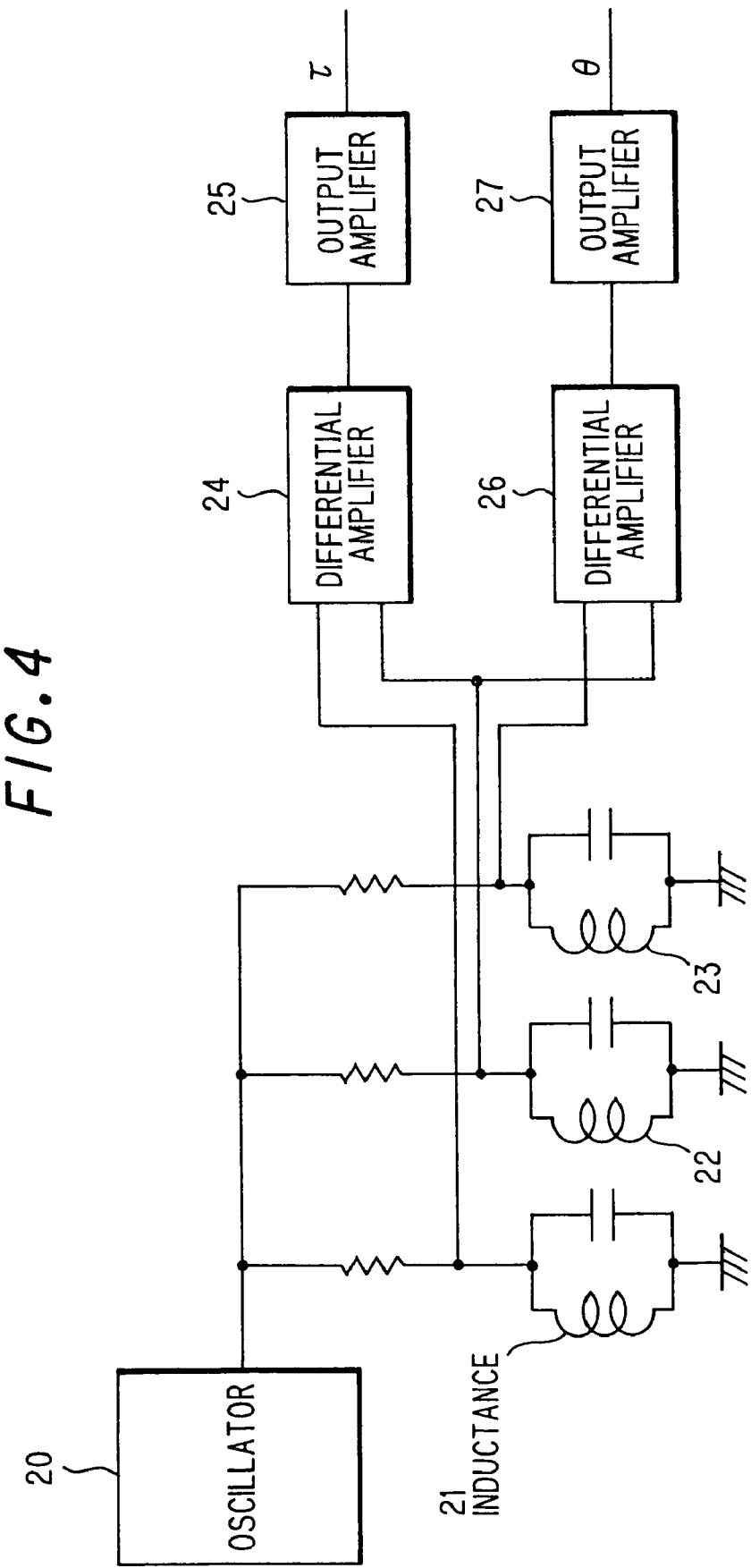
FIG. 4 is a circuit diagram of the angle-torque sensor in the first embodiment.

FIG. 4 shows a circuit for detecting the steering torque and steering angle in the angle-torque sensor 3 of the embodiment. An oscillator 20 generates a high-frequency signal for detecting the inductance. The inductances of the torque detection coil 9, the compensation coil 10 and the angle detection coil 11 are represented by inductances 21, 22 and 23, respectively. When the outputs (voltages) of the torque detection coil 9 and the compensation coil 10 are inputted to a differential amplifier 24, the output of the differential amplifier 24 varies according to the difference therebetween. When the steering torque is zero, the output of the differential amplifier 24 is zero. When the steering torque is maximum in the positive direction of the steering wheel 16 or the steering torque is maximum in the negative direction of the steering wheel 16, the output of the differential amplifier 24 becomes maximum in the torque range. The influence of environmental conditions such as temperature can be removed. The output of the differential amplifier 24 is amplified by an output amplifier 25 and then outputted as a steering torque signal r to the controller 17.

As described earlier, when the steering angle is zero, a change of inductance to be detected by the angle detection coil 11 is at the average of the maximum and minimum values of change in inductance. In this embodiment, a change in inductance to be detected by the angle detection coil 11 is made identical with an inductance to be detected by the compensation coil 10. Thus, when the steering angle is zero, the output of a differential amplifier 26 becomes zero according to difference between the output of the angle detection coil 11 and the output of the compensation coil 10. When the steering angle is +720°, the inductance chance of the angle detection coil 11 becomes maximum and the output of the differential amplifier 26 also becomes maximum. When the steering angle is −720°, the inductance chance of the angle detection coil 11 becomes minimum and the output of the differential amplifier 26 also becomes minimum. The output of the differential amplifier 26 is amplified by an output amplifier 27 and then outputted as a steering angle signal θ to the controller 17.

In this embodiment described above, the compensation coil 10 to compensate a variation in environmental conditions such as temperature is used for the compensation of the two sensors, the torque sensor and the angle sensor. Therefore, the angle-torque sensor 3 can have an inexpensive composition and high performance. Also, in this embodiment, the angle sensor is composed using the same principle of detection, which is based on a change in inductance, as the torque sensor. Therefore, they can use the detection coils having the same shape and can be disposed compact on the same axis. Furthermore, in this embodiment, the angle sensor has the planetary gear unit and, therefore, the range of rotation angle up to an absolute angle of 1440° can be detected. Thus, the angle-torque sensor 3 can detect a wide range of angle with high precision.

Figure 5:
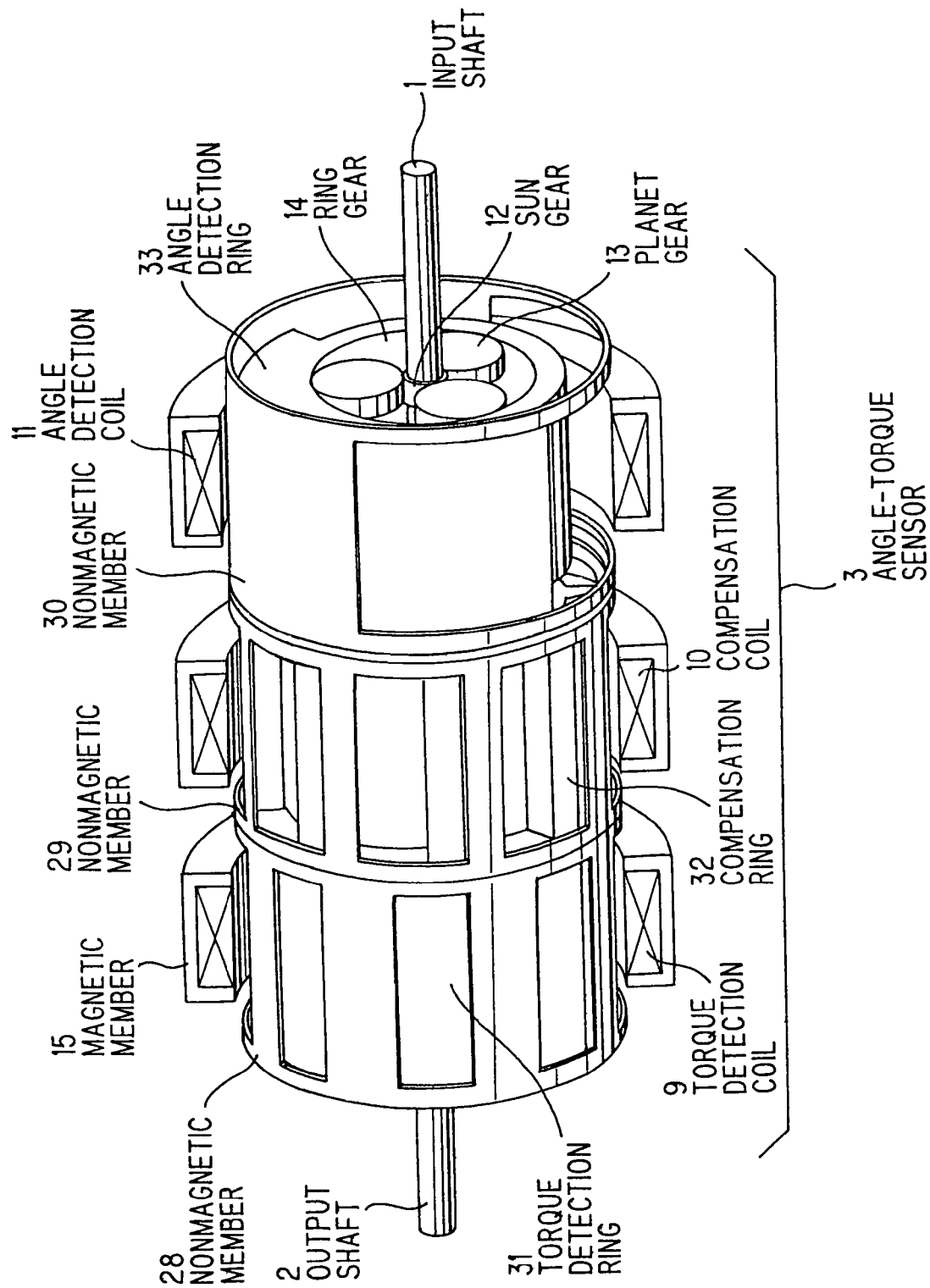
FIG. 5 is a perspective view-showing an angle-torque sensor in a second preferred embodiment according to the invention.
Figure 6:
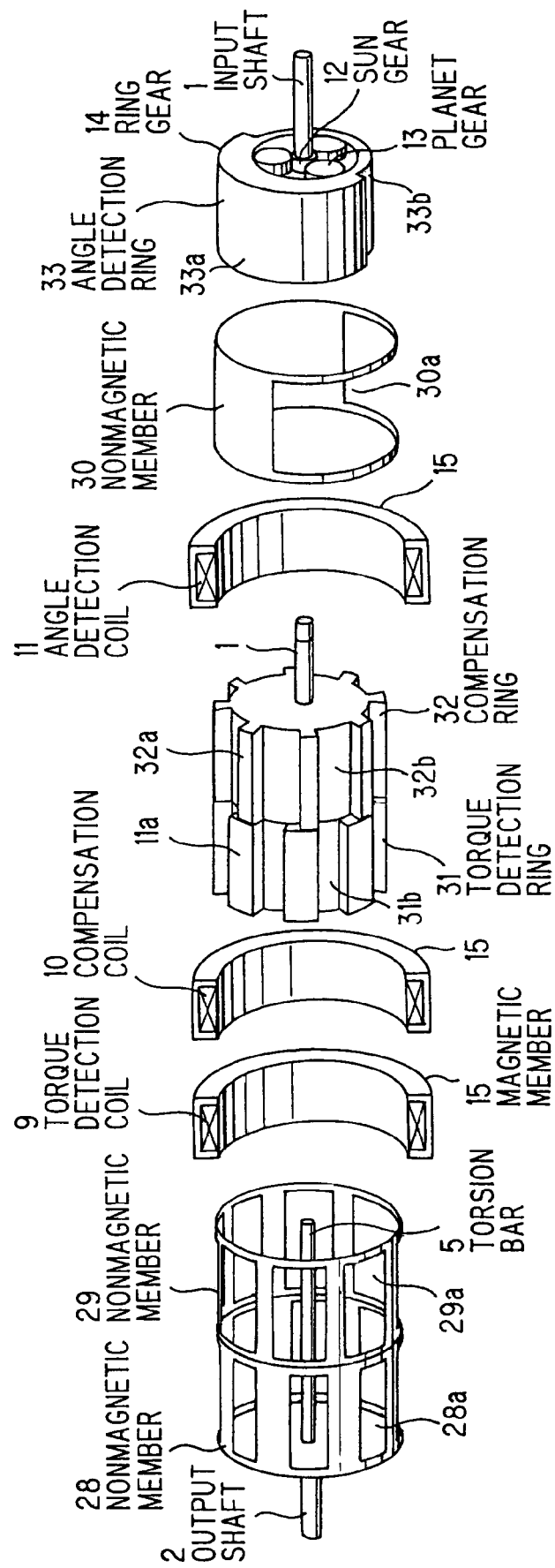
FIG. 6 is a broken view showing the angle-torque sensor in FIG. 5.

FIG. 5 shows an angle-torque sensor 3 in the second preferred embodiment according to the invention. FIG. 6 is a broken view showing the angle-torque sensor 3 in this embodiment. The way of detecting a change in inductance in this embodiment is different from that in the first embodiment. In this embodiment, as shown in FIG. 6, a gearwheel-shaped torque detection ring 31 of magnetic material and a gearwheel-shaped compensation ring 32 of magnetic material are integrally formed and rotated together with the input shaft 1.

As shown in FIG. 6, there are alternately provided, on the circumference of the torque detection ring 31, a plurality of arc-shaped protrusions 31a extending continuously in the steering axis direction and a plurality of arc-shaped grooves 31b extending continuously in the steering axis direction to form a tooth portion. Also, there are alternately provided, on the circumference of the compensation ring 32, a plurality of arc-shaped protrusions 32a extending continuously in the steering axis direction and a plurality of arc-shaped grooves 32b extending continuously in the steering axis direction to form a tooth portion. The number of the protrusions 31a, 32a or the grooves 31b, 32b is equal between the torque detection ring 31 and compensation ring 32. However, the size and arrangement pitch on the circumference (distance between the centers of neighboring protrusions or grooves) of the protrusions 31a, 32a or the grooves 31b, 32b is not equal between the torque detection ring 31 and compensation ring 32. Namely, in this embodiment, the length on the circumference of the protrusion 32a of the compensation ring 32 is half that of the protrusion 31a of the torque detection ring 31. Because of this, the length on the circumference of the groove 32b of the compensation ring 32 is twice that of the groove 31b of the torque detection ring 31.

As shown in FIG. 6, there is provided a cylindrical nonmagnetic member 28 outside the torque detection ring 31 while being closely opposed to the outer surface of the torque detection ring 31 to cover there. Also, there is provided a cylindrical nonmagnetic member 29 outside the compensation ring 32 while being closely opposed to the outer surface of the compensation ring 32 to cover there. The nonmagnetic member 28 and the nonmagnetic member 29 are integrally formed and rotated with the output shaft 2 while being fixed to the output shaft 2. There are provided, on the circumference of the nonmagnetic member 28, a plurality of rectangular apertures 28a corresponding to the plurality of grooves 31b of the torque detection ring 31. Also, there are provided, on the circumference of the nonmagnetic member 29, a plurality of rectangular apertures 29a corresponding to the plurality of grooves 32b of the compensation ring 32. The torsion bar 5 connects the input shaft 1 with the output shaft 2 while penetrating the torque detection ring 31 and the compensation ring 32.

As shown in FIG. 5, there is provided a ring-shaped torque detection coil 9 outside the nonmagnetic member 28 while being closely opposed to the outer surface of the nonmagnetic member 28. The torque detection coil 9 is covered with a magnetic member 15 on its outer surface, except for its inner surface being opposed to the outer surface of the nonmagnetic member 28. The magnetic member 15 and the torque detection ring 31 are composing a magnetic circuit that fluxes generated by the torque detection coil 9 pass through. The compensation coil 10 is covered with a magnetic member 15 on its outer surface, except for its inner surface being opposed to the outer surface of the nonmagnetic member 29. The magnetic member 15 and the compensation ring 32 are composing a magnetic circuit that fluxes generated by the compensation coil 10 pass through.

In operation, the driver operates the steering wheel 16, the steering torque by the driver is transmitted through the steering wheel 16 to the input shaft 1, the input shaft 1 rotates, and the torsion bar 5 is thereby twisted. Due to the twisting of the torsion bar 5, there occurs a displacement in relative circumferential position between the torque detection ring 31 and the nonmagnetic member 28. Therefore, the surface area of the protrusion 31a in the tooth portion of the torque detection ring 31 being exposed in the aperture 28a of the nonmagnetic member 28 is changed. The degree of magnetic coupling in the magnetic circuit composed of the magnetic member 15 and the torque detection ring 31 is changed, and the inductance of the torque detection coil 9 is thereby changed. Such a change in inductance can be detected through a voltage generated at the torque detection coil 9 while applying a high-frequency voltage to the torque detection coil 9. Thus, by detecting a change in inductance, a displacement in relative circumferential position (a relative angle) between the torque detection ring 31 and the nonmagnetic member 28 can be detected. As a result, the steering torque being applied to the input shaft 1 can be detected.

When the steering torque is zero, the surface area of the protrusion 31a in the tooth portion of the torque detection ring 31 being exposed in the aperture 28a of the nonmagnetic member 28 is half the aperture area. In this case, a change of inductance is at the average of the maximum and minimum values of change in inductance. When the positive steering torque increases, the surface area of the protrusion 31a in the tooth portion of the torque detection ring 31 being exposed in the aperture 28a of the nonmagnetic member 28 increases. In this case, fluxes generated by the torque detection coil 9 become easy to pass through the magnetic circuit composed of the magnetic member 15 and the protrusion 31a in the tooth portion of the torque detection ring 31. According to this, the change in inductance increases. In contrast, when the negative steering torque increases, the surface area of the protrusion 31a in the tooth portion of the torque detection ring 31 being exposed in the aperture 28a of the nonmagnetic member 28 decreases. Thus, the change in inductance decreases.

The opening area of the aperture 29a of the nonmagnetic member 29 is greater than that of the aperture 28a of the nonmagnetic member 28. Therefore, even when the relative circumferential position is displaced between the compensation coil 10 and the compensation ring 32, the inductance value of the compensation coil 10 is kept constant. It is desirable that the inductance value of the compensation coil 10 is designed to be identical with an inductance value of the torque detection coil 9 taken when the steering torque is zero.

In this embodiment, similarly to the first embodiment, a change in inductance based on the intensity of steering torque applied to the input shaft 1 is detected by the torque detection coil 9, and a change in inductance due to the environmental conditions such as temperature is simultaneously detected by the compensation coil 10. Then, based on the result of the detections, a detection circuit similar to that in the first embodiment detects a steering torque applied to the input shaft 1 while conducting the temperature compensation. Therefore, in this embodiment, the detection of steering torque can be conducted with high precision like the first embodiment.

As shown in FIG. 6, there is provided an angle detection ring 33 on the input shaft 1, like the first embodiment. The angle detection ring 33 is a planetary gear unit that is, like the first embodiment, composed of a sun gear 12, a plurality of planet gears 13 and a ring gear 14. There are provided, on the circumference of the angle detection ring 33 (ring gear 14), an arc-shaped protrusion 33a extending continuously in the steering axis direction and an arc-shaped groove 33b extending continuously in the steering axis direction to form a tooth portion. The protrusion 33a and the groove 33b each have a length of half the circumference of the angle detection ring 33.

Furthermore, as shown in FIG. 6, there is provided a cylindrical nonmagnetic member 30 outside the torque detection ring 33 while being closely opposed to the outer surface of the torque detection ring 33 to cover there. The nonmagnetic member 30 is fixed to the car body and does not rotate. There is provided, on the circumference of the nonmagnetic member 30, a rectangular aperture 30a corresponding to the groove 33b of the torque detection ring 33. Also, there is provided an angle detection coil 11 outside the nonmagnetic member 30 while being closely opposed to the outer surface of the nonmagnetic member 30. The angle detection coil 11 is covered with a magnetic member 15 on its outer surface, except for its inner surface being opposed to the outer surface of the nonmagnetic member 30. The magnetic member 15 and the angle detection ring 33 are composing a magnetic circuit that fluxes generated by the angle detection coil 11 pass through. Although in this embodiment a reduction ratio of 1/8 is used like the first embodiment, it may be 1/4 to 1/10.

In operation, the driver operates the steering wheel 16, the steering torque by the driver is transmitted through the steering wheel 16 to the input shaft 1, and the input shaft 1 rotates. The rotation of the input shaft 1 is transmitted to the sun gear 12 and then transmitted through the planet gears 13 to the ring gear 14 while being reduced. Due to this, there occurs a displacement in relative circumferential position between the angle detection ring 33 and the nonmagnetic member 30. Therefore, the surface area of the protrusion 33a of the angle detection ring 33 being exposed in the aperture 30a of the nonmagnetic member 30 is changed, the degree of magnetic coupling in the magnetic circuit composed of the magnetic member 15 and the angle detection ring 33 is changed, and the inductance of the angle detection coil 11 is thereby changed. Such a change in inductance can be detected through a voltage generated at the angle detection coil 11 while applying a high-frequency voltage to the angle detection coil 11. Thus, by detecting a change in inductance, a displacement in relative circumferential position (a relative angle) between the angle detection ring 33 and the nonmagnetic member 30 can be detected. As a result, the rotation angle (absolute rotation angle range of 1440°) of the input shaft 1, i.e., steering angle can be detected.

In this embodiment, similarly to the first embodiment, a change in inductance based on the rotation angle of the input shaft 1 is detected by the angle detection coil 11, and a change in inductance due to the environmental conditions such as temperature is simultaneously detected by the compensation coil 10. Then, based on the result of the detections, a detection circuit similar to that in the first embodiment detects a rotation angle (steering angle) of the input shaft 1 while conducting the temperature compensation. Therefore, in this embodiment, the detection of steering angle can be conducted with high precision like the first embodiment.

The torque detection ring 31, the compensation ring 32 and the angle detection ring 33 have the same diameter and are coaxially disposed on the steering shaft. The nonmagnetic member 28, the nonmagnetic member 29 and the nonmagnetic member 30 have the same diameter and are disposed coaxially with the horizontally-aligned unit including the torque detection ring 31, the compensation ring 32 and the angle detection ring 33. The torque detection coil 9, the compensation coil 10 and the angle detection coil 11 are in the form of a ring and are disposed coaxially with the horizontally-aligned unit including the nonmagnetic member 28, the nonmagnetic member 29 and the nonmagnetic member 30.

Figure 7:
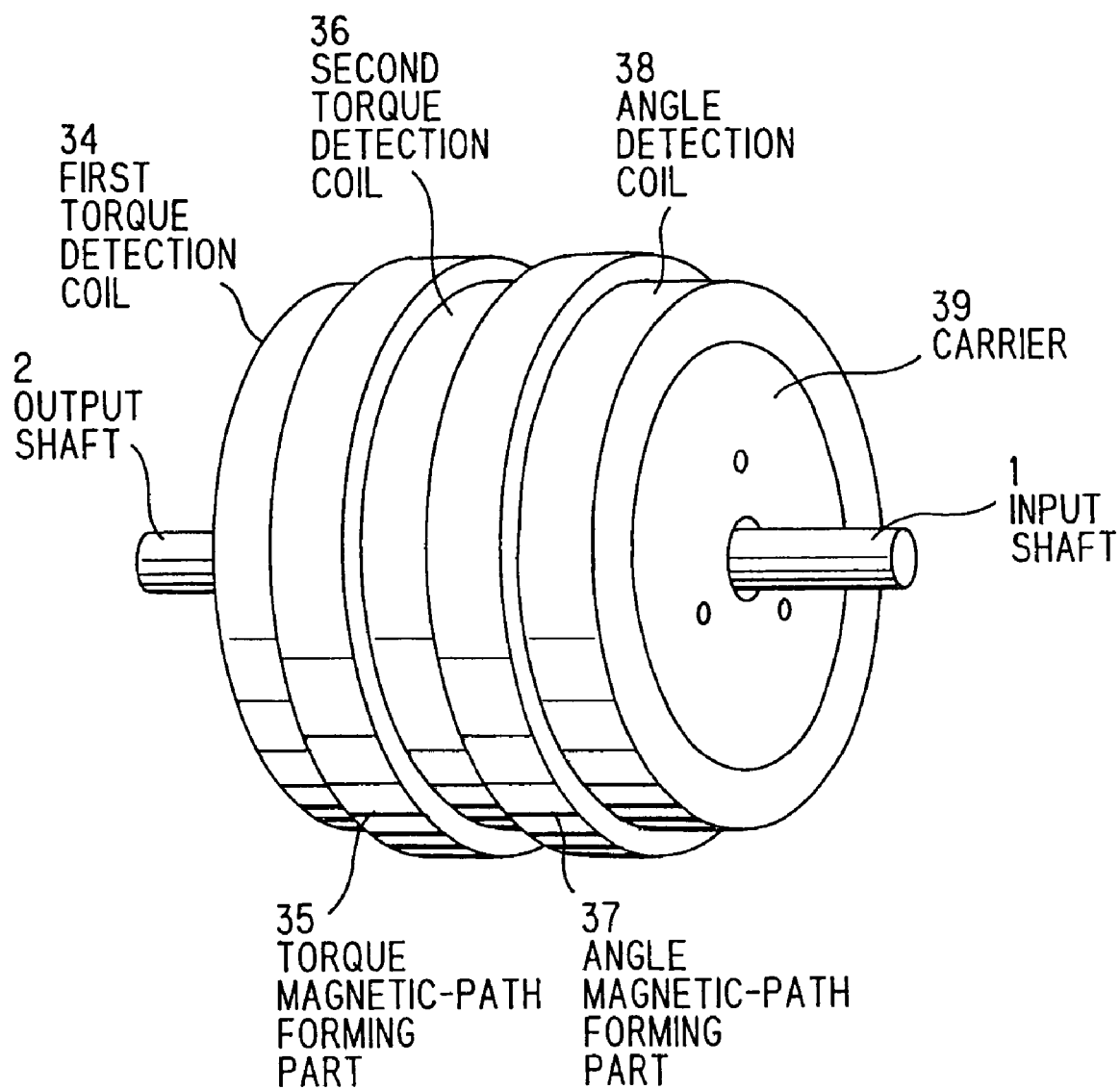
FIG. 7 is a perspective view showing an angle-torque sensor in a third preferred embodiment according to the invention.
Figure 8:
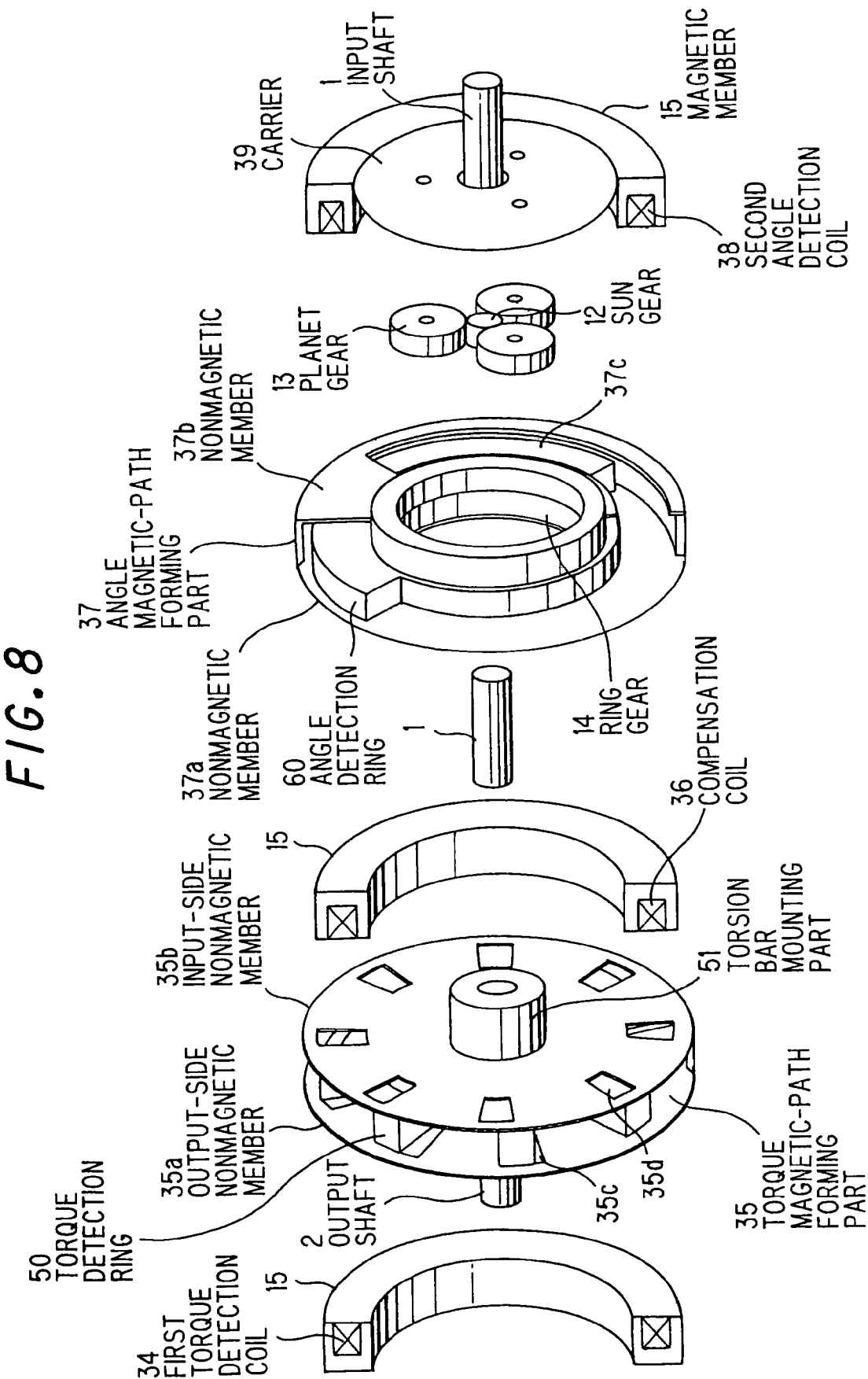
FIG. 8 is a broken view showing the angle-torque sensor in FIG. 7.

FIG. 7 shows an angle-torque sensor 3 in the third preferred embodiment according to the invention. FIG. 8 is a broken view showing the angle-torque sensor 3 in this embodiment. In the third embodiment, the length of the angle-torque sensor 3 in the steering axis direction is reduced.

As shown in FIG. 7, a first torque detection coil 34, a torque magnetic-path forming part 35, a second torque detection coil, 36, an angle magnetic-path forming part 37 and an angle detection coil 38 are, between the input shaft 1 and the output shaft 2, closely disposed on the steering shaft in the steering axis direction.

As shown in FIG. 8, the first torque detection coil 34 and the second torque detection coil 36 each are covered with a magnetic member 15 on its outer surface, except for its side surface being opposed to the torque magnetic-path forming part 35. The magnetic members 15 and the torque magnetic-path forming part 35 are composing a magnetic circuit, whose change in inductance is detected by the first torque detection coil 34 and the second torque detection coil 36 that are in the form of a ring.

The torque magnetic-path forming part 35 is composed of a disk-shaped output-side nonmagnetic member 35a, a disk-shaped input-side nonmagnetic member 35b, a gearwheel-shaped torque detection ring 50 and a hollow short-cylindrical torsion bar mounting part 51. The torque detection ring 50 is of magnetic material and has a plurality of protrusions and grooves formed alternately on the circumference. The torque detection ring 50 is disposed between the output-side nonmagnetic member 35a and the input-side nonmagnetic member 35b that are opposed to each other in the steering axis direction and is fixed to the output shaft 2, thereby rotating with the output shaft 2. The output-side nonmagnetic member 35a, the input-side nonmagnetic member 35b and the torsion bar mounting part 51 are fixed to the input shaft 1, thereby rotating with the input shaft 1. The input shaft 1 and the output shaft 2 are connected through a torsion bar (not shown) disposed inside the torsion bar mounting part 51. Because of this, there occurs a difference in relative rotation angle between the input shaft 1 and the output shaft 2 according to intensity of steering torque. There are provided a plurality of rectangular apertures 35c radially on the edge of the output-side nonmagnetic member 35a corresponding to the protrusions of the torque detection ring 50. Also, there are provided a plurality of rectangular apertures 35d radially on the edge of the input-side nonmagnetic member 35b corresponding to the protrusions of the torque detection ring 50.

In the second embodiment, when the steering torque is zero, the output-side nonmagnetic member 35a and the input-side nonmagnetic member 35b are in relative circumferential position displaced to each other such that the protrusion of the torque detection ring 50 is exposed half the side area each in the aperture 35c of the output-side nonmagnetic member 35a and the aperture 35d of the input-side nonmagnetic member 35b. In other words, when the steering torque is zero, viewing in the steering axis direction, a circumferential distance between the center axis of the aperture 35c of the output-side nonmagnetic member 35a and the center axis of the aperture 35d of the input-side nonmagnetic member 35b is, on the same radius, equal to the circumferential length of the protrusion of the torque detection ring 50. Thus, when the steering torque is zero, the exposed area of the torque detection ring 50 defining the magnetic circuit of the first torque detection coil 34 is equal to the exposed area of the torque detection ring 50 defining the magnetic circuit of the second torque detection coil 36. Therefore, the first torque detection coil 34 has the same inductance as the second torque detection coil 36.

In operation, when applying a positive steering torque, the area of protrusion of the torque detection ring 50 increases that is seen through the aperture 35c of the output-side nonmagnetic member 35a from the first torque detection coil 34. In contrast, the area of protrusion of the torque detection ring 50 decreases that is seen through the aperture 35d of the input-side nonmagnetic member 35b from the second torque detection coil 36. At that time, the inductance of the first torque detection coil 34 increases, and the inductance of the second torque detection coil 36 decreases. When the steering torque increases to such a level that the entire side area of the protrusion of the torque detection ring 50 is seen through the aperture 35c of the output-side nonmagnetic member 35a, the inductance of the first torque detection coil 34 becomes maximum. In contrast, the area of protrusion of the torque detection ring 50 becomes minimum or zero that is seen through the aperture 35d of the input-side nonmagnetic member 35b. Namely, the inductance of the second torque detection coil 36 becomes minimum. When applying a negative steering torque, reversely to the case of positive steering torque, the inductance of the first torque detection coil 34 decreases and the inductance of the second torque detection coil 36 increases: Thus, by calculating the difference between outputs of the first torque detection coil 34 and the second torque detection coil 36, the steering torque can be detected.

In the third embodiment, steering angle can be detected by the angle magnetic-path forming part 37 and the angle detection coil 38. As shown in FIG. 8, the angle magnetic-path forming part 37 is composed of a disk-shaped nonmagnetic member 37a having no aperture, a ring-shaped nonmagnetic member 37b having an arc-shaped aperture 37c, a ring-shaped angle detection ring 60 with a larger-radius semicircle magnetic member (protrusion) and a smaller-radius semicircle magnetic member (groove) combined, and a planetary gear unit that has a sun gear 12, planet gears 13 and a ring gear 14 and is disposed inside of the angle detection ring 60.

The nonmagnetic member 37b is fixed and does not rotate. The angle detection ring 60 is structured such that the rotation of the input shaft 1 is reduced to 1/8 by the planetary gear unit. In the planetary gear unit, the sun gear 12 is connected with the input shaft 1, the planet gears 13 transmit the rotation of the input shaft 1 to the ring gear 14 and the ring gear 14 is integrated with the angle detection ring 60. The rotation axis of the planet gears 13 is connected to a carrier 39 being fixed, as shown in FIG. 8. Meanwhile, the planetary gear unit in the first and second embodiments has also such a carrier being fixed. Thus, the planetary gear unit severs as a reduction mechanism.

In operation, the input shaft 1 rotates, the angle detection ring 60 rotates while being reduced, and the area of the protrusion (magnetic semicircle portion) of the angle detection ring 60 changes that is seen through the aperture 37c of the nonmagnetic member 37*b*. Thereby, the inductance of the angle detection coil 38 changes and, therefore, the steering angle of the steering wheel 16 can be detected.

Figure 9:
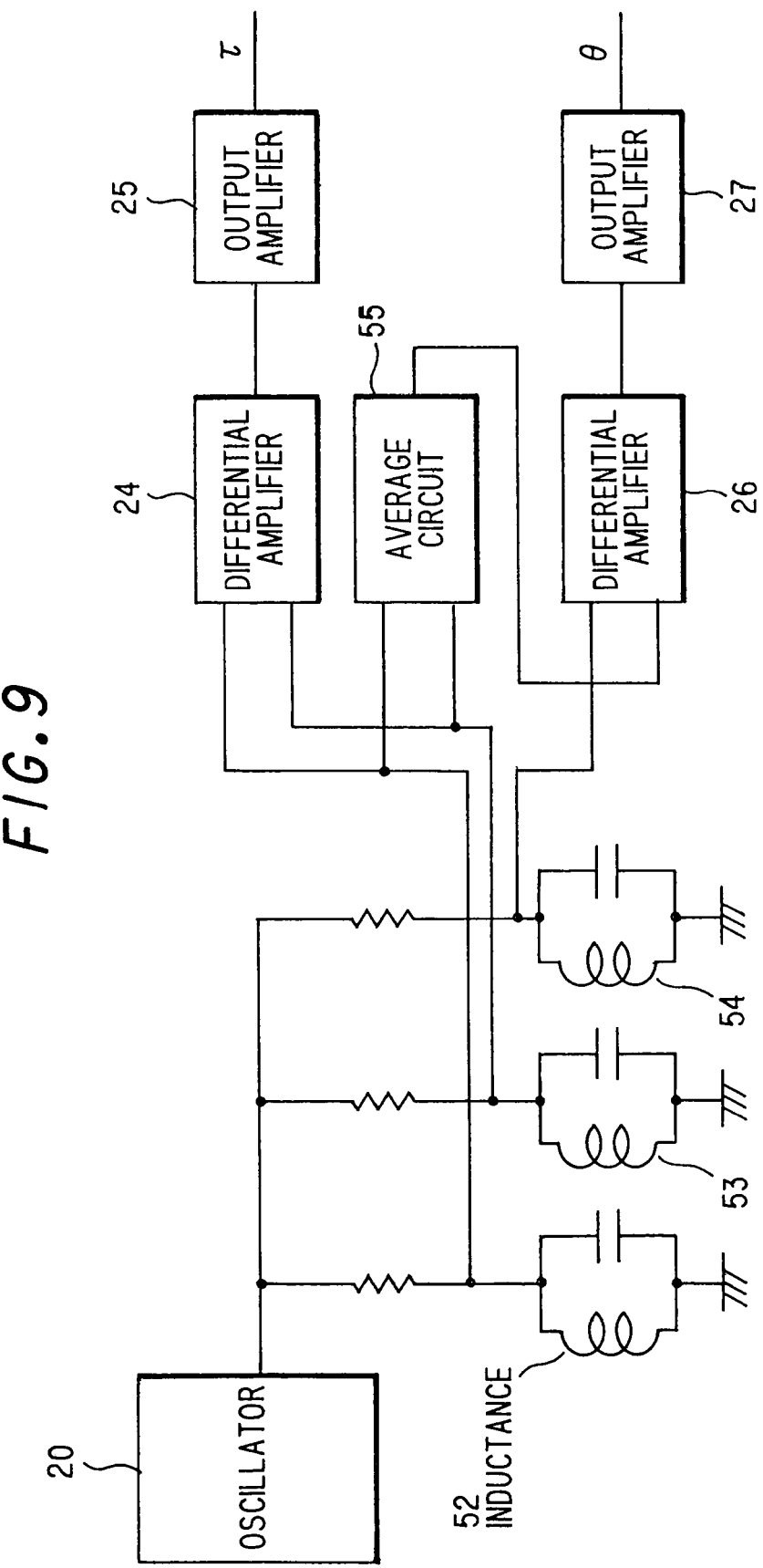
FIG. 9 is a circuit diagram of the angle-torque sensor in the third embodiment.

FIG. 9 shows a detection circuit in the angle-torque sensor 3 in the third embodiment. The oscillator 20 applies a high-frequency voltage to the coils as explained earlier referring to FIG. 4. The inductances of the first torque detection coil 34 and the second torque detection coil 36 are represented by inductances 52 and 53, respectively. The output signals (voltage signals) of the first torque detection coil 34 and the second torque detection coil 36 are inputted to the differential amplifier 24. The differential amplifier 24 detects a steering torque from the difference between the output signals of the first torque detection coil 34 and the second torque detection coil 36 and then outputs a corresponding output signal. Then, the output signal of the differential amplifier 24 is amplified by the output amplifier 25, outputted as steering torque τ to the motor controller. In this embodiment, the steering torque is detected from the output difference between the first torque detection coil 34 and the second torque detection coil 36 and, thereby, the influence due to environmental conditions such as temperature can be removed.

Furthermore, an average circuit 55 is provided so as to average the outputs of the inductances 52, 53 of the first and second torque detection coils 34, 36 while inputting these outputs to the average circuit 55. As described earlier, when the steering torque changes, one inductance increases, and the other inductance decreases. Thus, the average value is always the same value and the output signal is influenced by only change of environmental conditions. In this embodiment, the output of the average circuit 55 is inputted as a compensation signal to a differential amplifier 26. The differential amplifier 26 detects a steering angle based on the output signal of the inductance 54 of the angle detection coil 38 and the compensation signal, then outputting a corresponding signal. The output signal of the differential amplifier 26 is amplified by an output amplifier 27 and then outputted as a steering angle θ to the motor controller.

As described above, in this embodiment, the temperature compensation can be conducted without using a specific compensation coil. Therefore, the angle-torque sensor 3 in this embodiment can be provided with lower cost and smaller size than that in the first and second embodiments. Especially, it is suitable for an electric power steering unit to be installed in the cabin space of car.

Figure 10:
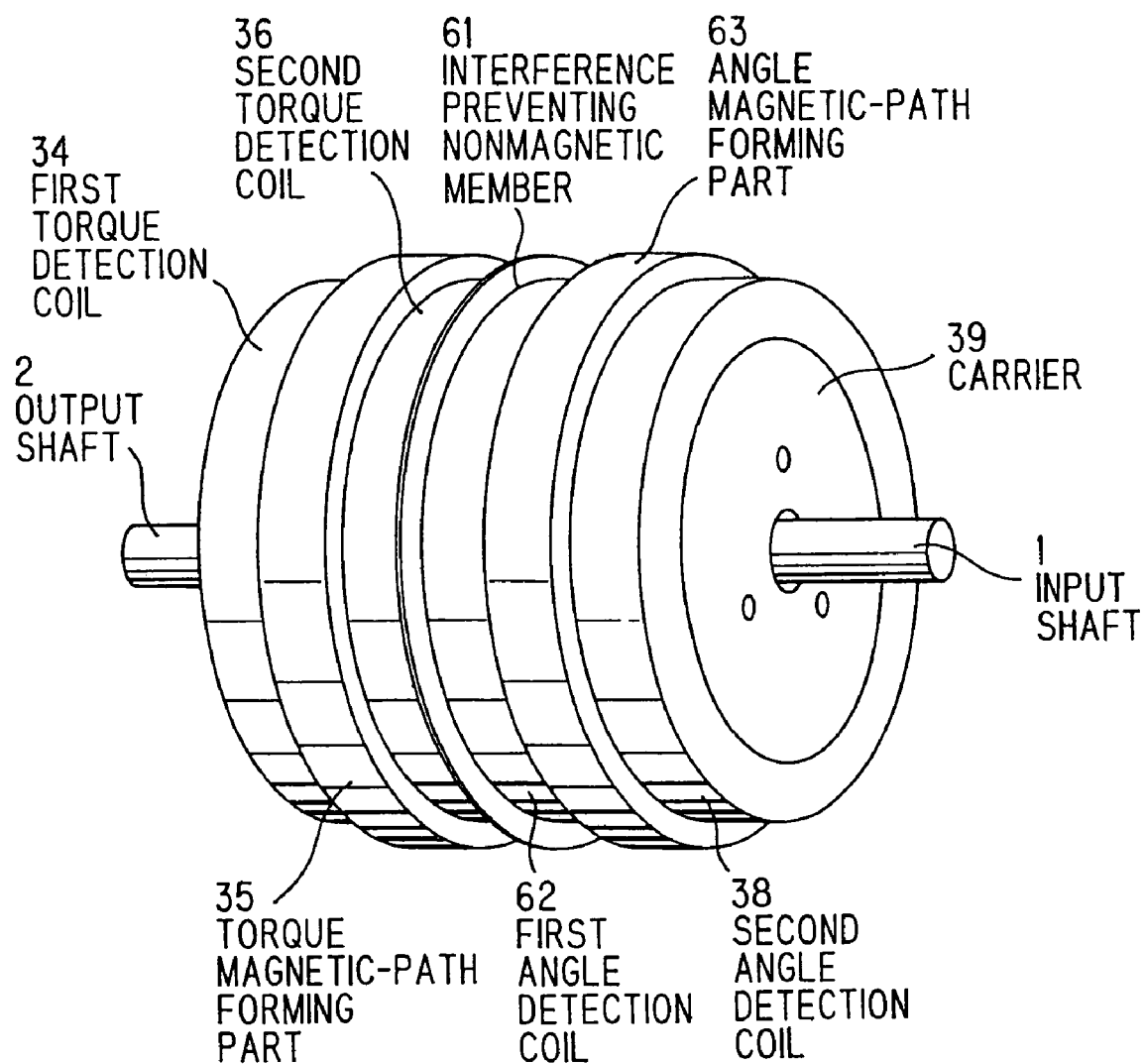
FIG. 10 is a perspective view showing an angle-torque sensor in a fourth preferred embodiment according to the invention.
Figure 11:
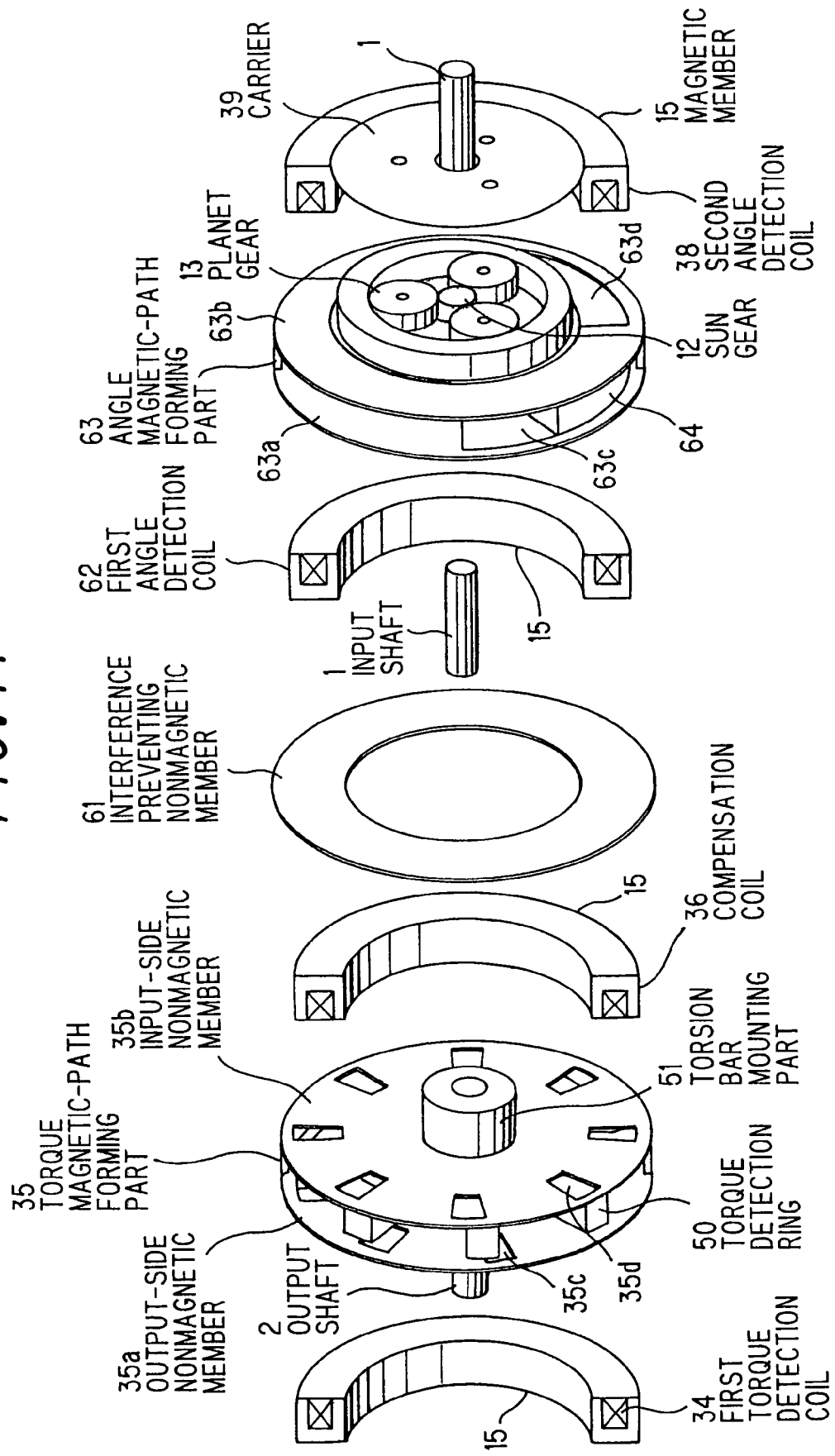
FIG. 11 is a broken view showing the angle-torque sensor in FIG. 10.

FIG. 10 shows an angle-torque sensor 3 in the fourth preferred embodiment according to the invention. FIG. 11 is a broken view, showing the angle-torque sensor 3 in this embodiment. In the fourth embodiment, a precision of angle detection near the steering center in the angle-torque sensor 3 is enhanced. The differences from the second embodiment in FIG. 7 are that there are provided a first angle detection coil 62, a second angle detection coil 38 and an angle magnetic-path forming part 63 to detect the steering angle, and that an interference preventing nonmagnetic member 61 to prevent the interference between torque sensor and angle sensor. Although the second angle detection coil 38 is the same component as the angle detection coil 38 in the second embodiment shown in FIG. 7, the way of outputting angle detection signal is different from that. The second torque detection coil 36 and the first angle detection sensor 62 each have a magnetic member 15 on its circumference to compose a magnetic circuit. Therefore, the magnetic interference is prevented by providing the interference preventing nonmagnetic member 61 therebetween.

The angle magnetic-path forming part 63 is composed of an angle detection ring 64 that reduces the rotation transmitted from the input shaft 1 to 1/6 by using the planetary gear reduction unit, a first nonmagnetic member 63*a* being fixed and a second nonmagnetic member 63*b* being fixed.

Figure 12:
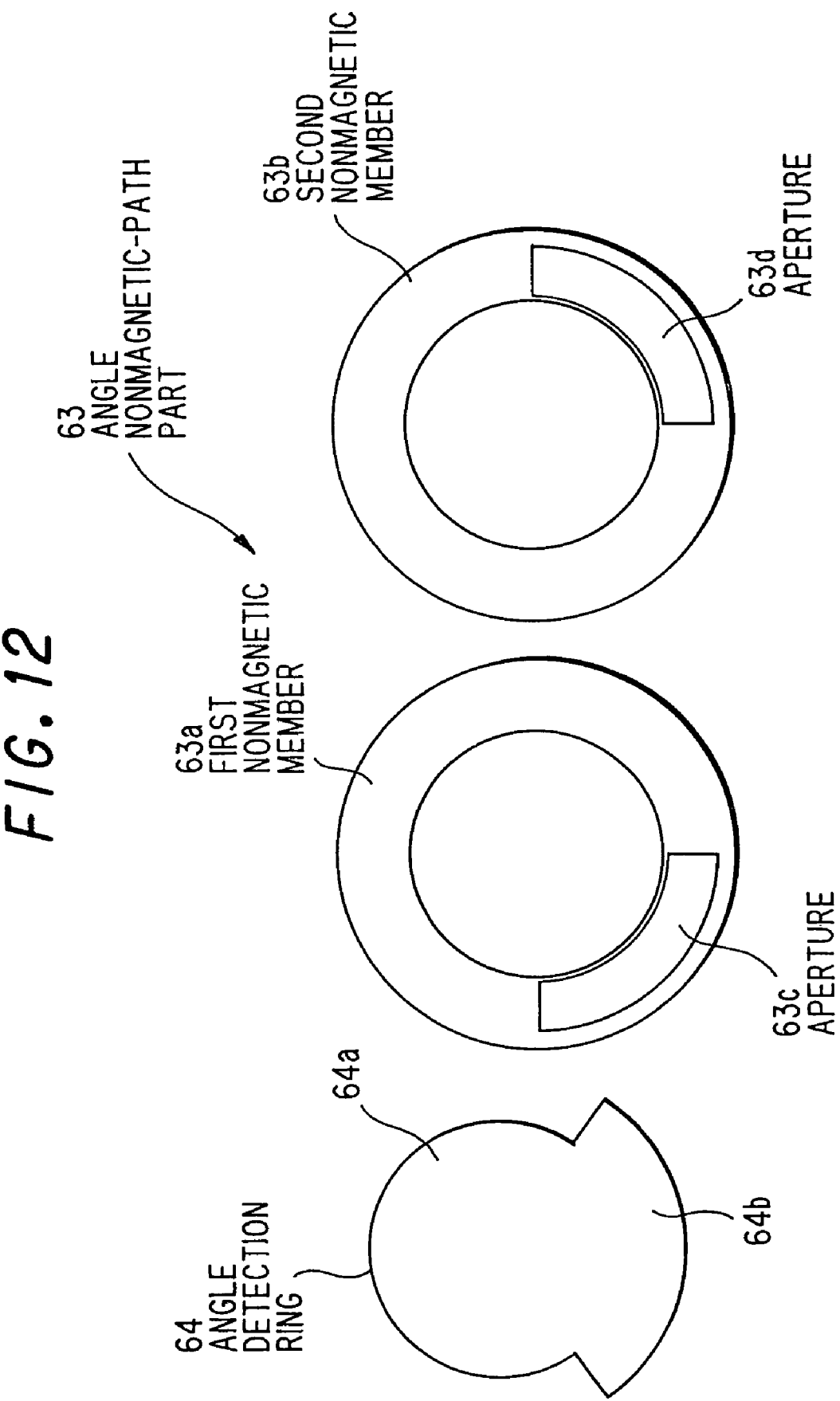
FIG. 12 is a broken plain view showing the components of an angle magnetic-path forming part 63 in FIG. 11.

FIG. 12 is a plain view showing the components of the angle magnetic-path forming part 63 in the steering axis direction. As shown, the angle detection ring 64 has a cylindrical portion 64*a* with a smaller radius and an arc portion 64*b* with a larger radius and angle of 110°. In the angle detection ring 64, the arc portion 64*b* outer than the cylindrical portion 64*a* is of magnetic material.

The first nonmagnetic member 63*a* has an arc-shaped aperture 63*c* with an angle of 90°. The second nonmagnetic member 63*b* has an arc-shaped aperture 63*d* with an angle of 90°. As the angle detection ring 64 rotates according to the rotation of the input shaft 1, there occurs a difference between the area of the arc portion 64*b* to be seen through the aperture 63*c* of the first nonmagnetic member 63*a* and the area of the arc portion 64*b* to be seen through the aperture 63*d* of the second nonmagnetic member 63*b*.

Figure 13:
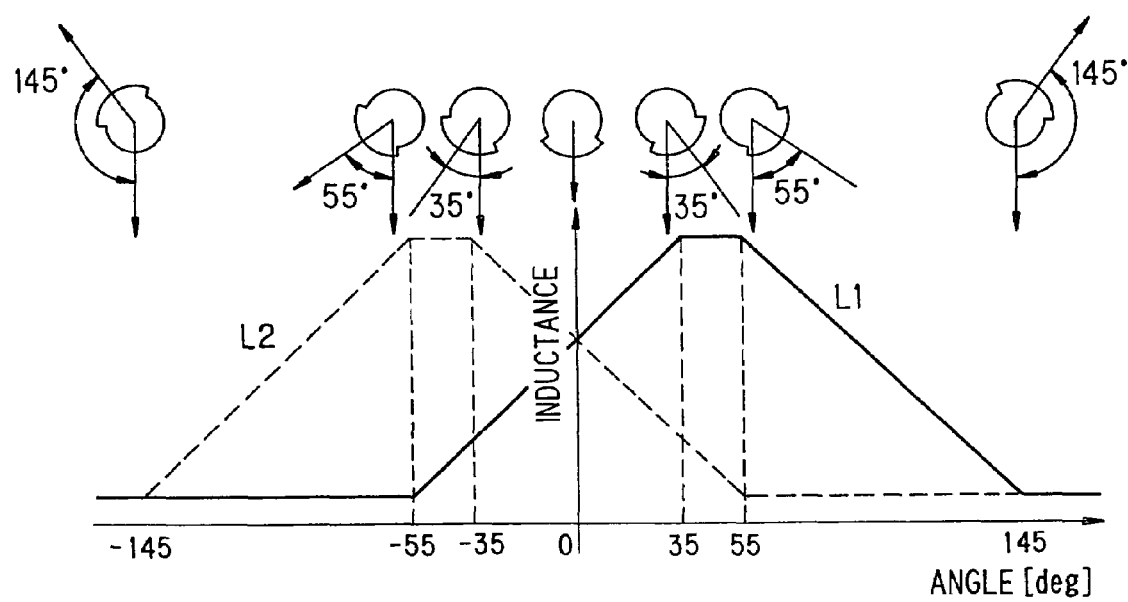
FIG. 13 is a characteristics diagram showing the relationship between steering angle (horizontal) and amount of inductance (vertical) in the fourth embodiment.

FIG. 13 is a characteristics diagram showing the relationship between steering angle (horizontal) and amount of inductance (vertical). The explanation below is based on the condition that inductance becomes maximum when the area of the arc portion 64*b* to be seen through the aperture is maximum and inductance becomes minimum when the area of the arc portion 64*b* to be seen through the aperture is minimum.

When the rotation angle of the angle detection ring 64 is zero, the area of arc portion 64*b* to be seen through the aperture 63*c* the first nonmagnetic member 63*a* is the same as the area of the arc portion 64*b* to be seen through the aperture 63*d* of the second nonmagnetic member 63*b*. The areas give both an area ratio of 55/90, which is calculated by area of arc portion 64*b* to be seen through the aperture/entire area of aperture 63*c* or 63*d*. Thus, the inductance of the first angle detection coil 62 is the same as that of the second angle detection coil 38.

As the rotation angle of the angle detection ring 64 increases stating from 0° in the positive direction (clockwise), the area of arc portion 64*b* to be seen through the aperture 63*d* of the second nonmagnetic member 63*b* increases and the area of arc portion 64*b* to be seen through the aperture 63*c* of the first nonmagnetic member 63*a* decreases. When the rotation angle of the angle detection ring 64 reaches 35°, the entire area of arc portion 64*b* is seen through the aperture 63*d* of the second nonmagnetic member 63*b*. It gives an area ratio of 90/90(100%). Thus, the inductance of the second angle detection coil 38 becomes maximum. At that time, the area of arc portion 64*b* to be seen through the aperture 63*c* of the first nonmagnetic member 63*a* gives 20/90.

Next, when the rotation angle of the angle detection ring 64 reaches 55°, the area of arc portion 64*b* to be seen through the aperture 63*d* of the second nonmagnetic member 63*b* gives an area ratio of 100%, and the area of arc portion 64*b* to be seen through the aperture 63*c* of the first nonmagnetic member 63*a* gives an area ratio of 0%. At that time, the inductance of the second angle detection coil 38 is maximum, and the inductance of first angle detection coil 62 becomes minimum. When the rotation angle of the angle detection ring 64 further increases exceeding 55°, the inductance of first angle detection coil 62 is kept minimum and the inductance of the second angle detection coil 38 decreases gradually. Finally, when the rotation angle of the angle detection ring 64 reaches 145°, the arc portion 64*b* is not seen through any of the aperture 63c of the first nonmagnetic member 63a and the aperture 63s of the second nonmagnetic member 63b. At that time, the inductances of the first angle detection coil 62 and second angle detection coil 38 become both minimum.

When the rotation angle of the angle detection ring 64 changes in the negative direction (counterclockwise), the inductance of the first angle detection coil 62 and second angle detection coil 38 changes in like manner. Meanwhile, when the rotation angle of the angle detection ring 64 is +145° or −145°, the steering angle is six times that, i.e., +870° or −870°. The angles in FIG. 13 are in such a relationship with real steering angle.

An output signal in angle detection is obtained by the difference between the outputs of the second angle detection coil 38 and the first angle detection coil 62. Therefore, it corresponds to a difference (L2–L1) between inductances L2 and L1 as shown in FIG. 13. As seen from FIG. 13, if the steering angle is positive, then the difference (L2–L1) in inductance is always positive. Also, as the angle detection ring 64 rotates up to 55°, the difference (L2–L1) in inductance increases monotonically and at 55° it becomes maximum. As the angle detection ring 64 rotates exceeding 55, the difference (L2–L1) in inductance decreases gradually and the inductance L1 of the first angle detection coil 62 is kept minimum. This indicates that the rotation angle of the angle detection ring 64 exceeds 55°. When the steering angle is negative, the inductance changes in like manner. Accordingly, the steering angle can be detected in the range of 1740° in absolute angle.

Also, as seen from FIG. 13, the change in difference (L2–L1) to the rotation angle of the angle detection ring 64 is steepest in the range of ±35°. Thus, the change in angle detection signal is steepest near the steering center, where the resolution is enhanced. It is necessary for the electric power steering unit to control the tires to turn to the steering center direction when the driver releases his hands from the steering-wheel 16 while driving the car. This embodiment has an advantage that the precision of angle detection near the steering center is thus enhanced. The coils for torque detection and angle detection used in this embodiment have the same shape and, therefore, the type of parts can be reduced to lower the manufacturing cost.

In the first to third embodiments, the angle-torque sensors for electric power steering unit where an angle sensor and a torque sensor are combined are explained. Although in these embodiments the analogue electronic circuit is used for the processing that the compensation coil is shared by the torque sensor and the angle sensor, the processing may be conducted by software of microcomputer. The first to third embodiments may be properly combined to enhance the reliability of the sensor. Furthermore, the sensors in the first to third embodiments may be used as a general angle sensor, other than for electric power steering units, that measures absolute angle in a device that makes several turns.

Figure 14:
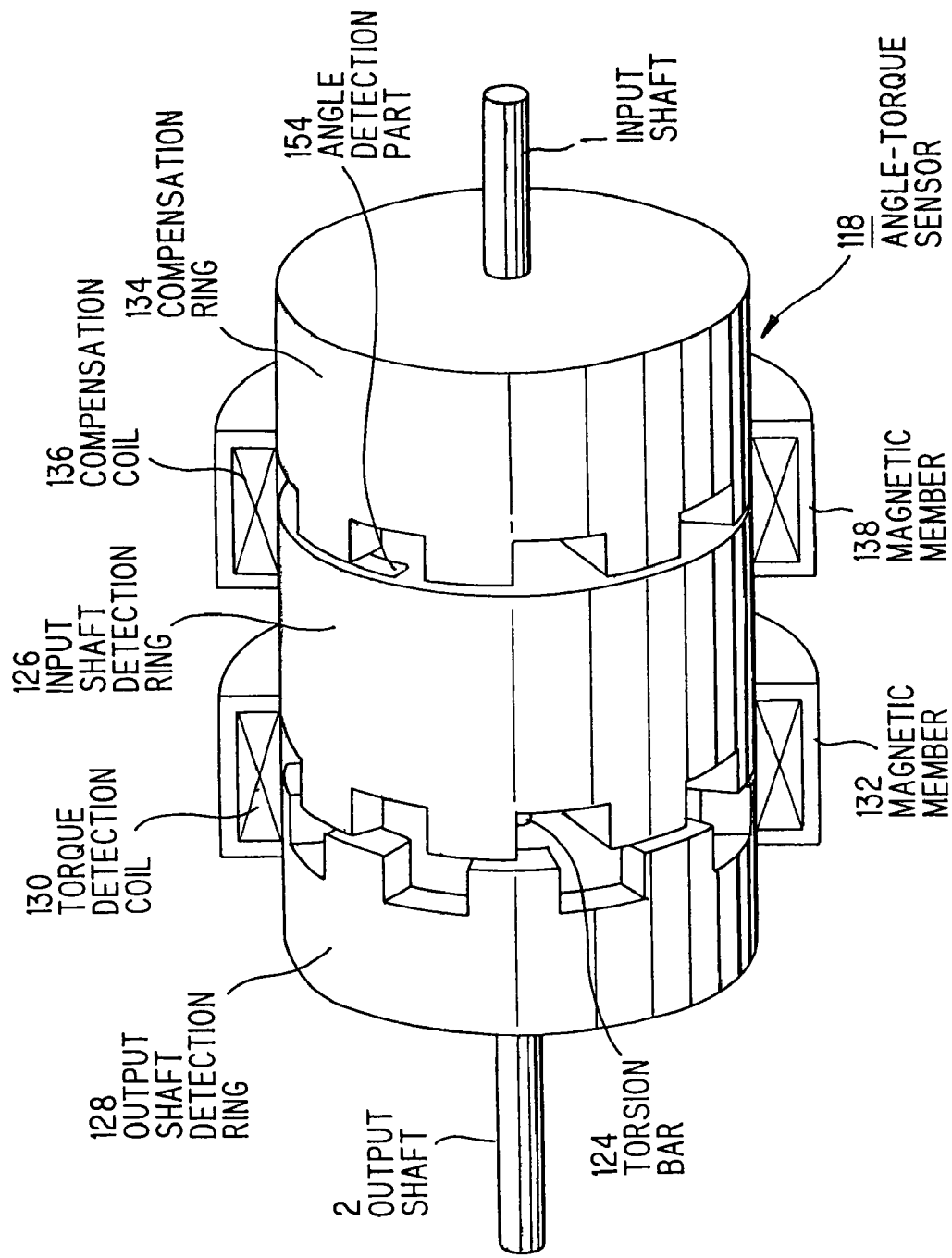
FIG. 14 is a perspective view showing an angle-torque sensor in a fifth preferred embodiment according to the invention.

FIG. 14 shows an angle-torque sensor 118 in the fifth preferred embodiment according to the invention.

The angle-torque sensor 118 includes a torsion bar 124 that is connected between the input shaft 1 and the output shaft 2 and is twisted according to a steering torque τ. Also, there are provided an input shaft detection ring 126 and an output shaft detection ring 128 on the input shaft side and output shaft side, respectively, of the torsion bar 124.

The input shaft detection ring 126 and output shaft detection ring 128 have a magnetic material tooth portion that is rotated with the input shaft 1 or output shaft 2. The tooth portion of the input shaft detection ring 126 and the output shaft detection ring 128 is in the form of alternating protrusions and grooves and is provided on the edge thereof. The tooth portions of the input shaft detection ring 126 and output shaft detection ring 128 are opposed to each other. There is provided a torque detection coil 130, which is fixed to the car body, while being opposed to the circumference of the input shaft detection ring 126 and the output shaft detection ring 128.

Figure 15:
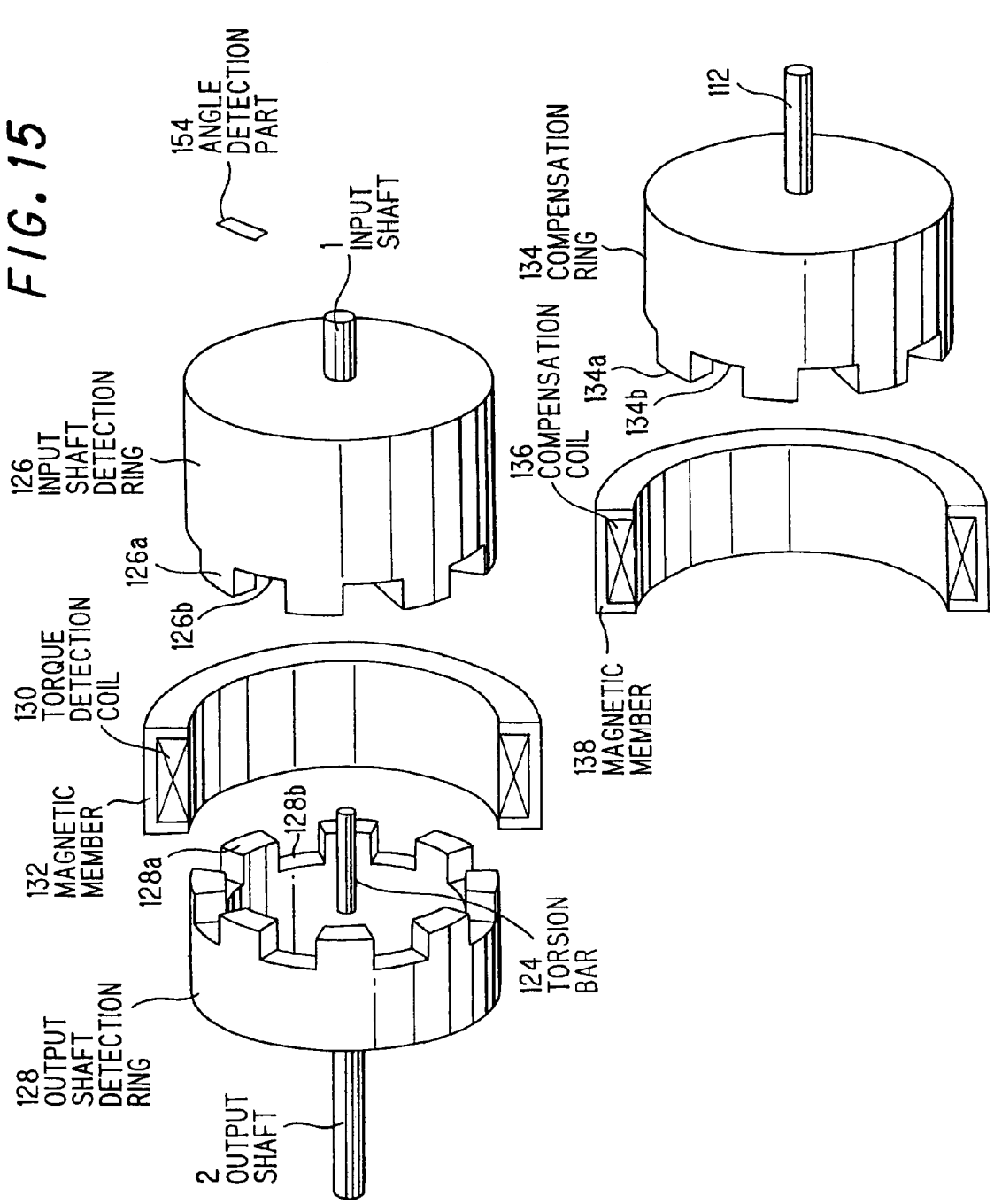
FIG. 15 is a broken view showing the angle-torque sensor in FIG. 14.

FIG. 15 is a broken view showing the angle-torque sensor 118 in FIG. 14. A magnetic member 132 is provided on the outer surface of the torque detection coil 130. The magnetic member 132, the input shaft detection ring 126 and the output shaft detection ring 128 are composing a magnetic circuit that fluxes generated by the torque detection coil 130 pass through.

Figure 16:
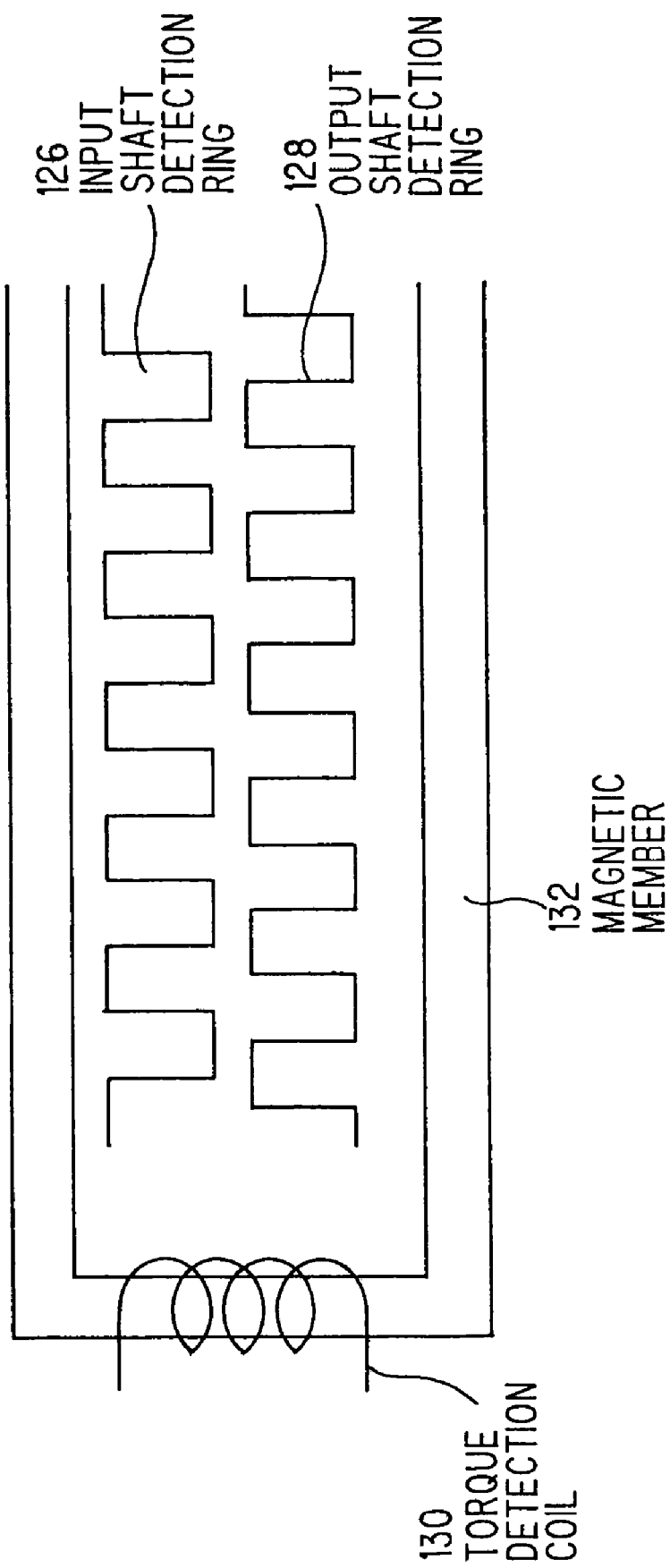
FIG. 16 is an illustration showing a displacement in relative circumferential position occurred between the tooth portion of an input shaft detection ring 126 and an opposing tooth portion of the output shaft detection ring 128 due to the twisting of torsion bar 124.

In operation, the driver operates the steering wheel 16 (FIG. 1), the steering torque by the driver is transmitted through the steering wheel 16 to the input shaft 1, the input shaft 1 rotates, and the torsion bar 124 is thereby twisted. Due to the twisting of the torsion bar 124, there occurs a displacement in relative circumferential position, as shown in FIG. 16, between the tooth portion of the input shaft detection ring 126 and the opposing tooth portion of the output shaft detection ring 128. Therefore, the inductance of the torque detection coil 130 is changed.

A steering torque τ can be obtained by detecting the inductance of the torque detection coil 130 while applying a high-frequency voltage to the torque detection coil 130. When the steering torque τ is zero, the tooth portions of the input shaft detection ring 126 and the output shaft detection ring 128 are, as shown in FIG. 16, opposed 1/2 of the top area of protrusion to each other, so that the middle value of inductance of the torque detection coil 130 can be detected.

When detecting the inductance, there may be a change in output value due to temperature. To compensate this, there are provided a compensation ring 134 and a compensation coil 136. The compensation ring 134 rotates together with the input shaft 1. The compensation coil 136 is surrounded by a magnetic member 138 on its outer surface, the magnetic body of input shaft detection ring 126, and the compensation ring 134 with a tooth portion. The tooth portion on the edge of the compensation ring 134 has also alternating protrusions and grooves like those in the input shaft detection ring 126 and output shaft detection ring 128.

The inductance to be detected by the compensation coil 136 is always constant and is set to be the same as that to be detected by the torque detection coil 130 when the steering torque is zero. The difference between the output of the torque detection coil 130 and the output of the compensation coil 136 is detected as a steering torque τ.

Figure 18:
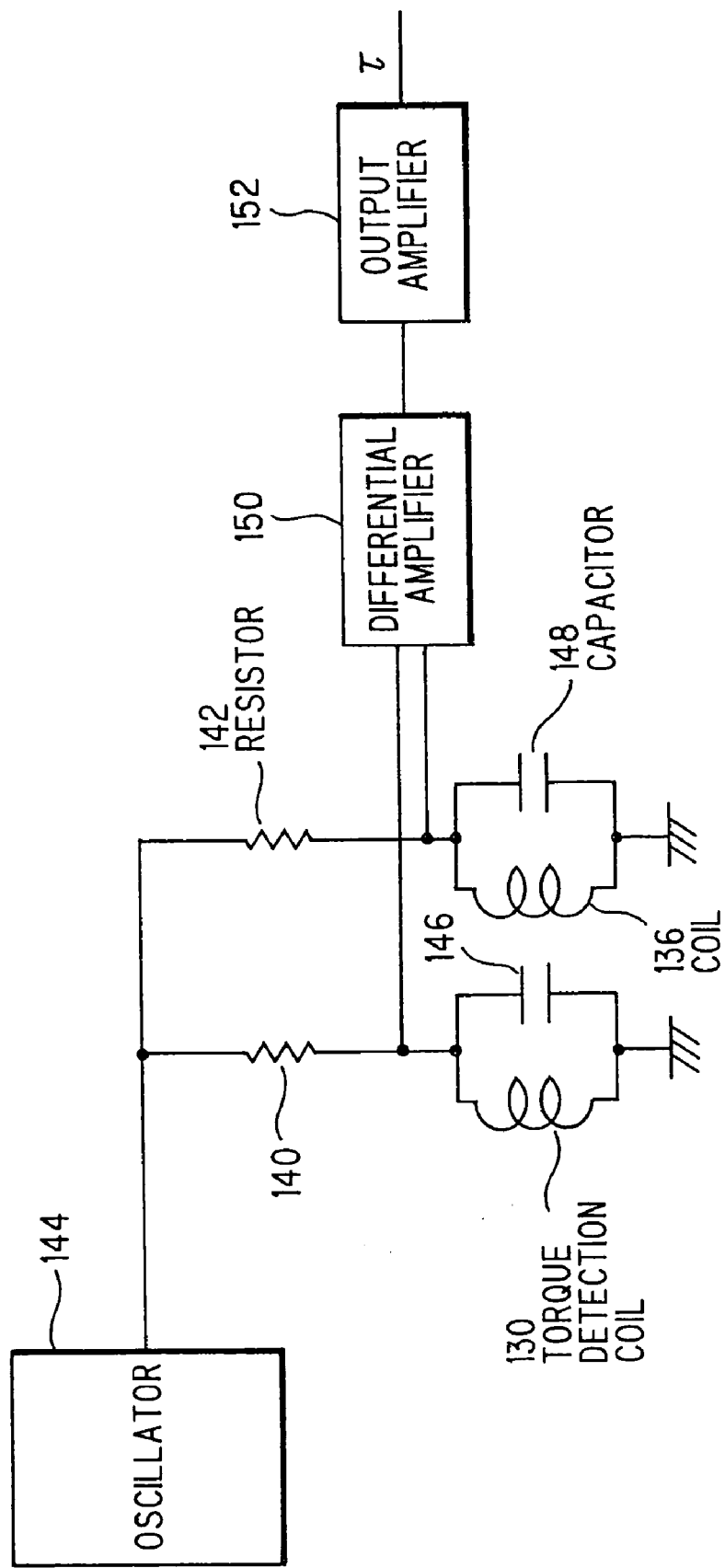
FIG. 18 is a circuit diagram of the angle-torque sensor in the fifth embodiment.

As shown in FIG. 18, the torque detection coil 130 and the compensation coil 136 each are connected through resistors 140, 142 to an oscillator 144. The torque detection coil 130 and the compensation coil 136 each have capacitors 146, 148 being connected in parallel with the coil.

The oscillator 144 outputs a high-frequency signal for detecting the inductance of the coils 130, 136. When this signal is applied to, the outputs of the torque detection coil 130 and the compensation coil 136 change according to the inductance.

The outputs of the torque detection coil 130 and the compensation coil 136 is inputted to a differential amplifier 150, which outputs a difference therebetween. This output value is in proportion to the steering torque τ and then amplified by an output amplifier 152 to give a steering torque τ.

In the fifth embodiment thus composed, the change in coil resistance or in output characteristics can be compensated. Therefore, the angle-torque sensor 118 in this embodiment can detect the torque with high precision while having a simple structure.

Also, a change in inductance is determined by the sum of opposing areas of the protrusion in tooth portion of the input shaft detection ring 126 and the output shaft detection ring 128. This reduces a degree that the precision in processing the tooth portions influences on the inductance. Accordingly, the angle-torque sensor 118 in this embodiment can offer stable characteristics while having a simple structure.

In the fifth embodiment, the torque sensor and angle sensor are integrated to make the entire unit compact. Thus, in the angle-torque sensor 118, the torque sensor that detects a torque from the twisted angle of torsion bar by using a change in inductance with rotation is integrated with the angle sensor that detects a steering angle to change with the rotation of input shaft 1.

Further in this embodiment, different from the conventional units, there is provided an angle detection part 154 that includes a hall element, one of magnetic filed sensing element. The angle detection part 154 is inserted between the input shaft detection ring 126 and the compensation ring 134. The angle detection part 154 is fixed to the car body with the compensation coil 136 and therefore does not rotate.

Figure 17:
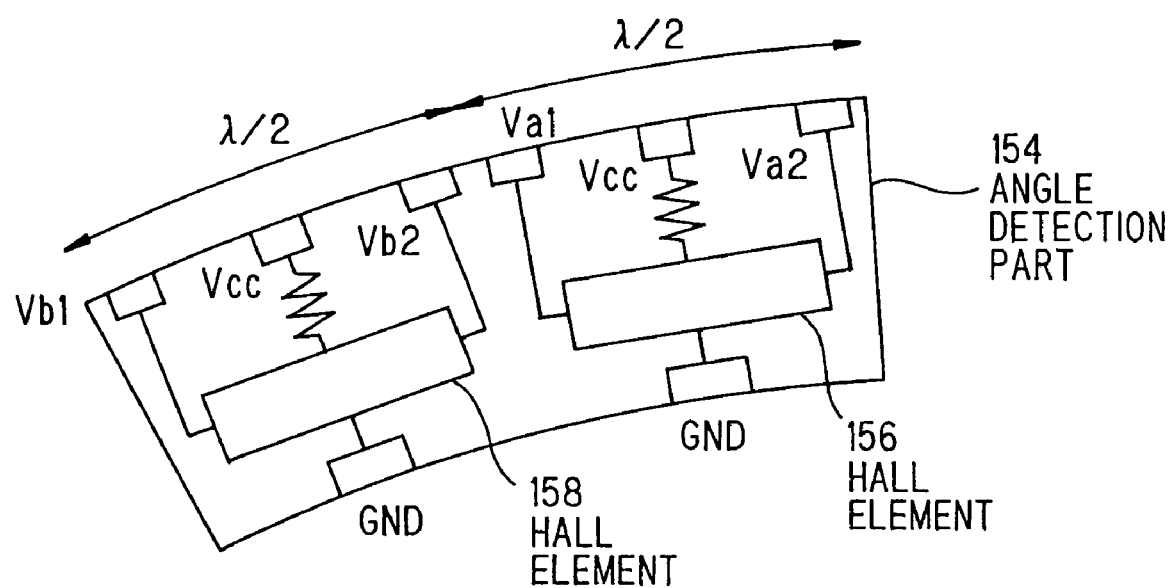
FIG. 17 is an illustration showing the composition of an angle detection part 154 with two hall elements 156, 158 in FIG. 14.

FIG. 17 shows the composition of the angle detection part 154 with two hall elements 156, 158.

The compensation ring 134 has the protrusions in which a width of protrusion and a distance of two neighboring protrusions is both λ. In the angle detection part 154, the hall elements 156, 158 have a length of about λ/2 while being disposed adjacent to each other. For the hall elements 156, 158, a voltage is applied between Vcc and GND, thereby supplying input current.

When a magnetic flux density B is applied in the vertical direction of the hall element 56, output voltage Va is proportionally generated between output terminals Va1 and Va2. In like manner, output voltage Vb is, in proportion to a magnetic flux density, generated between output terminals Vb1 and Vb2.

FIGS. 19A to 19D show relative positions between the compensation ring 134 and the angle detection part 154 when the compensation ring 134 rotates. FIGS. 19A, 19B, 19C and 19D show the position of the compensation ring 134 with electrical angles of 0°, 90°, 180° and 270°, respectively. From FIG. 19a toward FIG. 19D, a tooth top surface 134a and a tooth bottom surface 134b rotate in the positive direction.

Meanwhile, an electrical angle of 360° corresponds to a real mechanical angle of 45°. The rotation angle of the input shaft 1, i.e., steering angle is calculated from the electrical angle. FIG. 20 shows the characteristics of output voltages Va, Vb of the hall elements 156, 158 when the compensation ring 134 rotates. In FIG. 20, the horizontal axis represents the electrical angle shown in FIGS. 19A to 19D.

Figure 19:
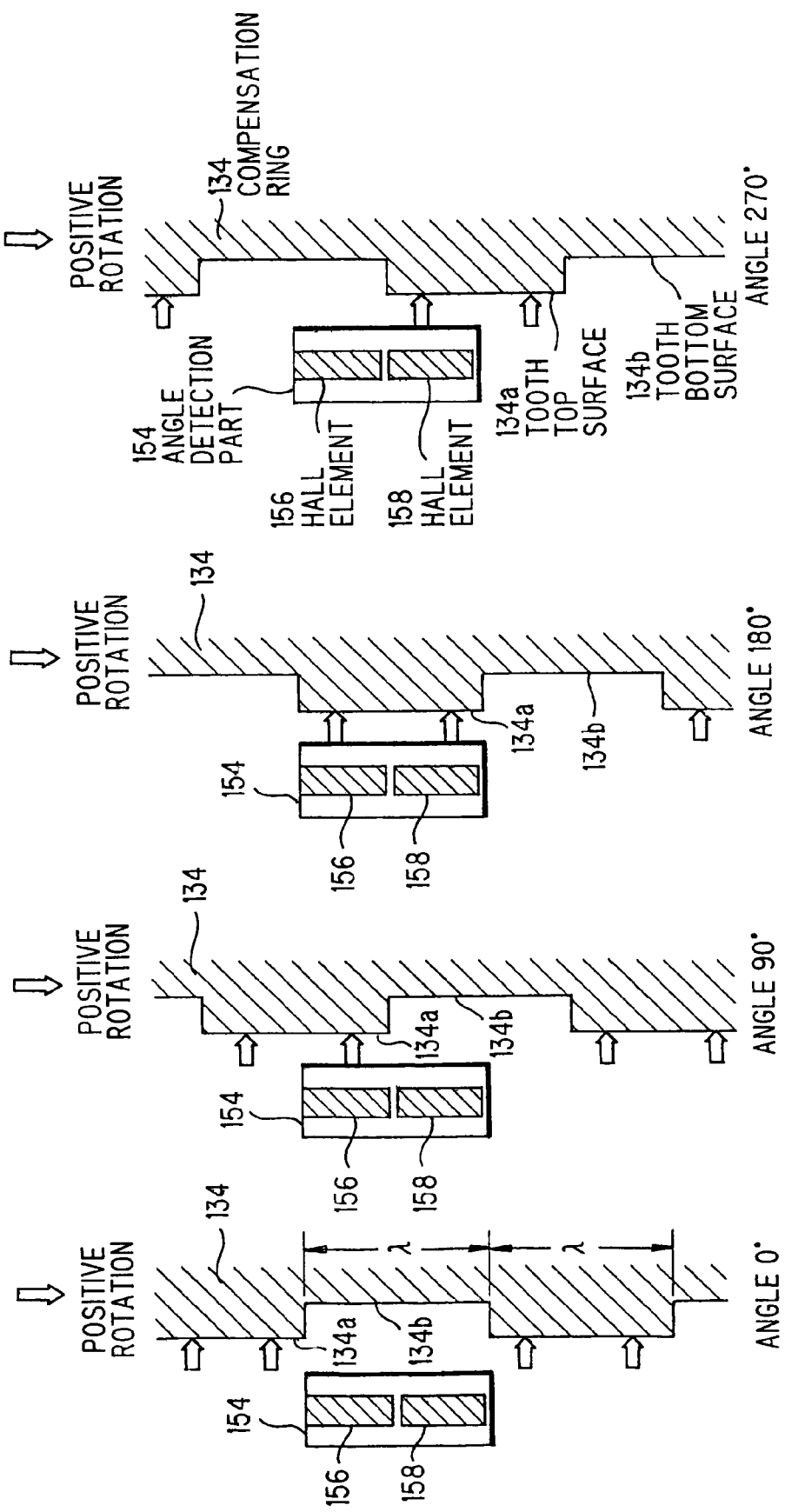
FIGS. 19A to 19D are illustrations showing relative positions between a compensation ring 134 and an angle detection part 154 when the compensation ring 134 rotates in the fifth embodiment.
Figure 20:
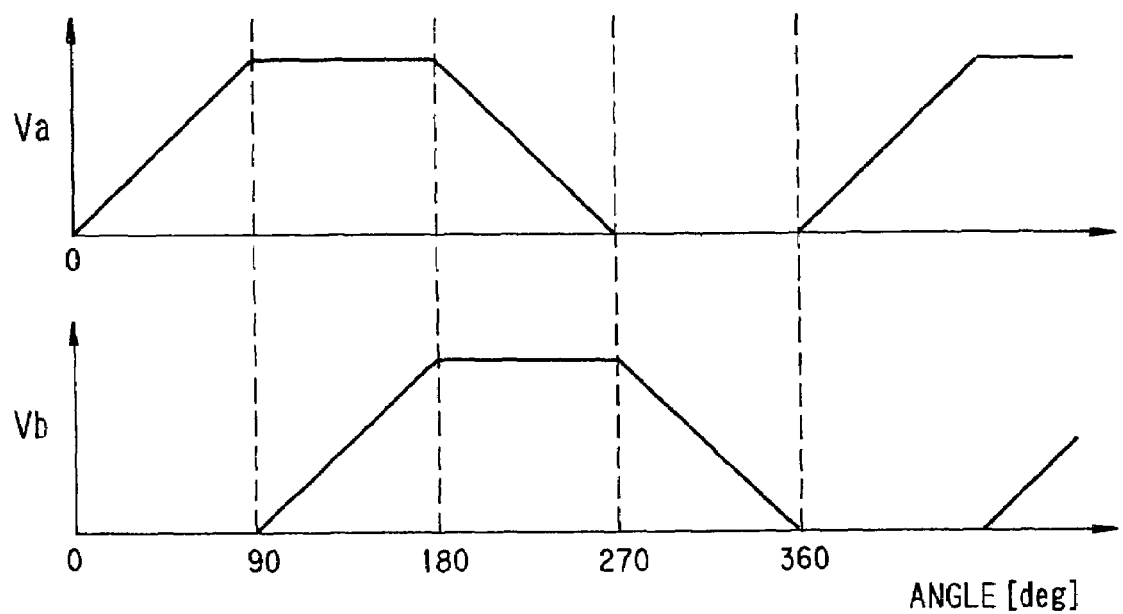
FIG. 20 is a diagram showing the characteristics of output voltages Va, Vb of the hall elements 156, 158 when the compensation ring 134 rotates.

As shown in FIG. 19A, when the electrical angle is 0°, the magnetic flux density is about zero and the output voltages Va, Vb of the hall elements 156, 158 are zero. As the compensation ring 134 rotates from here in the positive direction (clockwise), the magnetic flux density of the hall element 156 increases and the output voltage Va also increases.

As shown in FIG. 19B, when the electrical angle is 90°, the magnetic flux density becomes maximum. At that time, the magnetic flux density being applied to the hall element 158 is about zero. Further, as the compensation ring 134 rotates 90° to 180°, the magnetic flux density applied to the hall element 158 increases and the output voltage Vb changes zero to the maximum value. During this period, the magnetic flux density of the hall element 156 changes little and the output voltage Va is kept maximum.

As shown in FIG. 19C, when the electrical angle is 180°, the magnetic flux densities of the hall elements 156, 158 both become maximum and the output voltages Va, Vb are maximum.

When the compensation ring 134 rotates 180° to 360°, the magnetic flux densities applied to the hall elements 156, 158 change similarly according to the electrical angle. During this period, the output voltages Va, Vb are as shown in FIG. 20. These outputs are thus detected according to the rotation angle of the input shaft 1 and, therefore, the steering angle can be calculated from output voltages Va, Vb of the angle detection part 154.

In the fifth embodiment, there is employed the hall element for the torque sensor. Therefore, the steering angle can be calculated by detecting a change in flux density in the torque sensor. Thus, the torque sensor and angle sensor can be integrated without increasing the entire volume of angle-torque sensor.

FIG. 21 shows the structure of an angle-torque sensor 118 in the sixth preferred embodiment according to the invention.

In the sixth embodiment, a magnetoresistance effect element is used instead of the hall element in the fifth embodiment. Namely, in the sixth embodiment, there is provided an angle detection part 160 with magnetoresistance effect element between the compensation coil 136 and the magnetic member 138.

FIGS. 22A and 22B show the state of magnetic flux generated toward the angle detection part 160. In FIGS. 22A and 22B, cross sections of the compensation ring 134, the magnetic member 138 and the angle detection part 160 are shown that are cut along the steering axis.

As shown in FIG. 22A, when the position of compensation ring 134 is in cross section with a tooth (protrusion), fluxes from the input side detection ring flow through the tooth top surface 134a to the magnetic member 138 while being concentrated. In this case, as shown in FIG. 22A, part of fluxes flowing through the tooth top surface 134a enters to the magnetic member 138 while crossing diagonally the surface of the angle detection part 160.

In contrast, as shown in FIG. 22B, when the position of compensation ring 134 is in cross section without tooth (protrusion), fluxes entering through the tooth bottom surface 134b are a little and fluxes entering through the tooth portion flow radially to the magnetic member 138.

Thus, the fluxes flowing through the angle detection part 160 in FIG. 22B are less than those in FIG. 22A. Therefore, the intensity of magnetic field generated on the surface of the angle detection part 160 is changed depending on the existence of tooth portion of the compensation ring 134, i.e., depending on the rotation position of the compensation ring 134.

The magnetoresistance effect element has such a characteristic that electrical resistivity decreases according as the intensity of magnetic field generated on element surface increases. Therefore, the angle detection part 160 employs the magnetoresistance effect element in order to detect the intensity of magnetic field generated on element surface.

Figure 23:
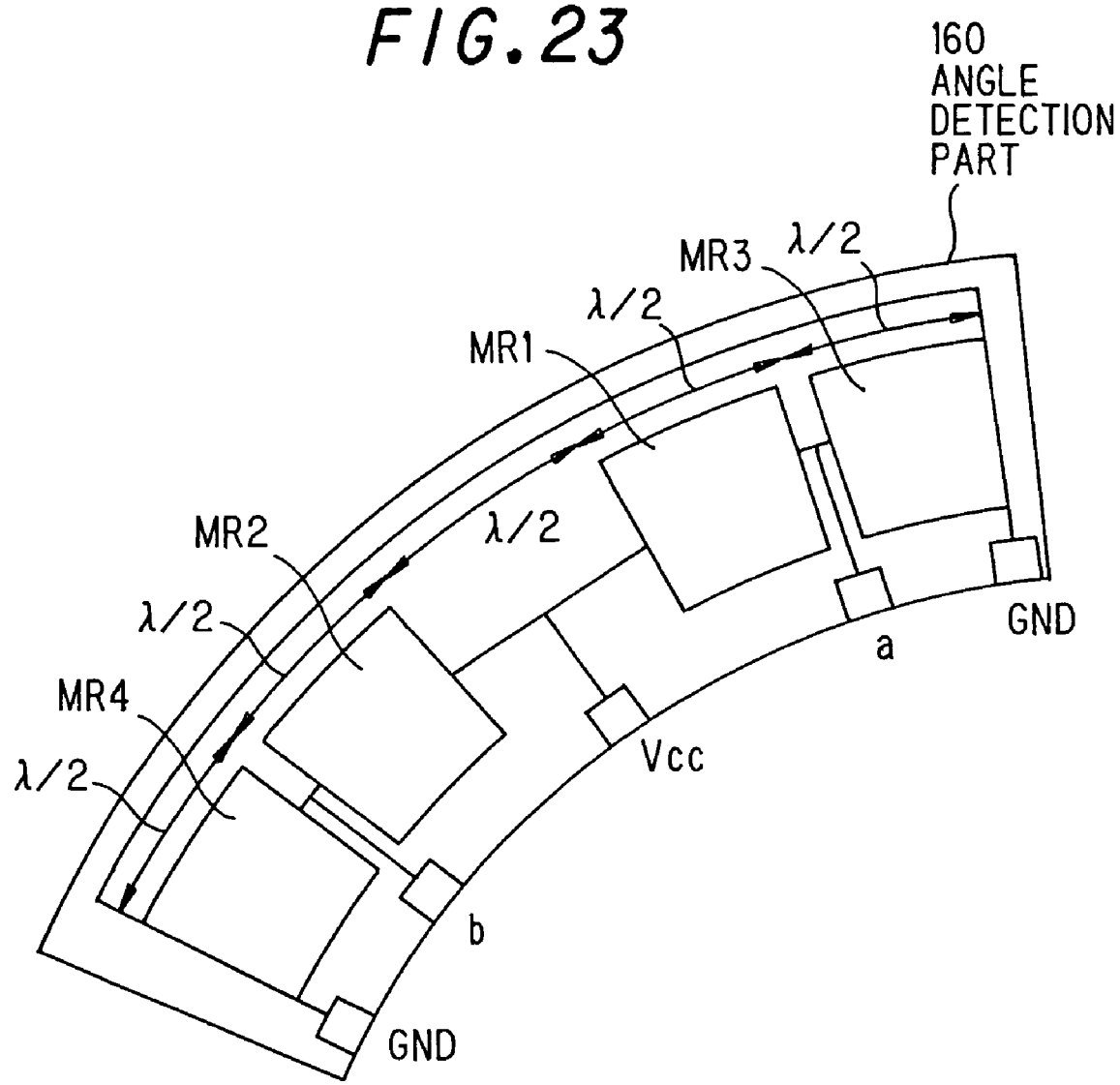
FIG. 23 is an illustration showing a detailed composition of the angle detection part 160 in FIG. 21.

FIG. 23 shows the detailed composition of the angle detection part 160. As shown in FIG. 23, there are provided four magnetoresistance effect elements MR1, MR2, MR3 and MR4 in the angle detection part 160. MR3 and MR1 with a length of about λ/2 each are disposed λ/2 apart from MR2 and MR4 with the same length each. There is an output terminal a between MR1 and MR3 that are connected in series between power source terminal Vcc and ground terminal. GND. Also, there is an output terminal b between MR2 and MR4 that are connected in series between power source terminal Vcc and ground terminal GND.

Figure 24:
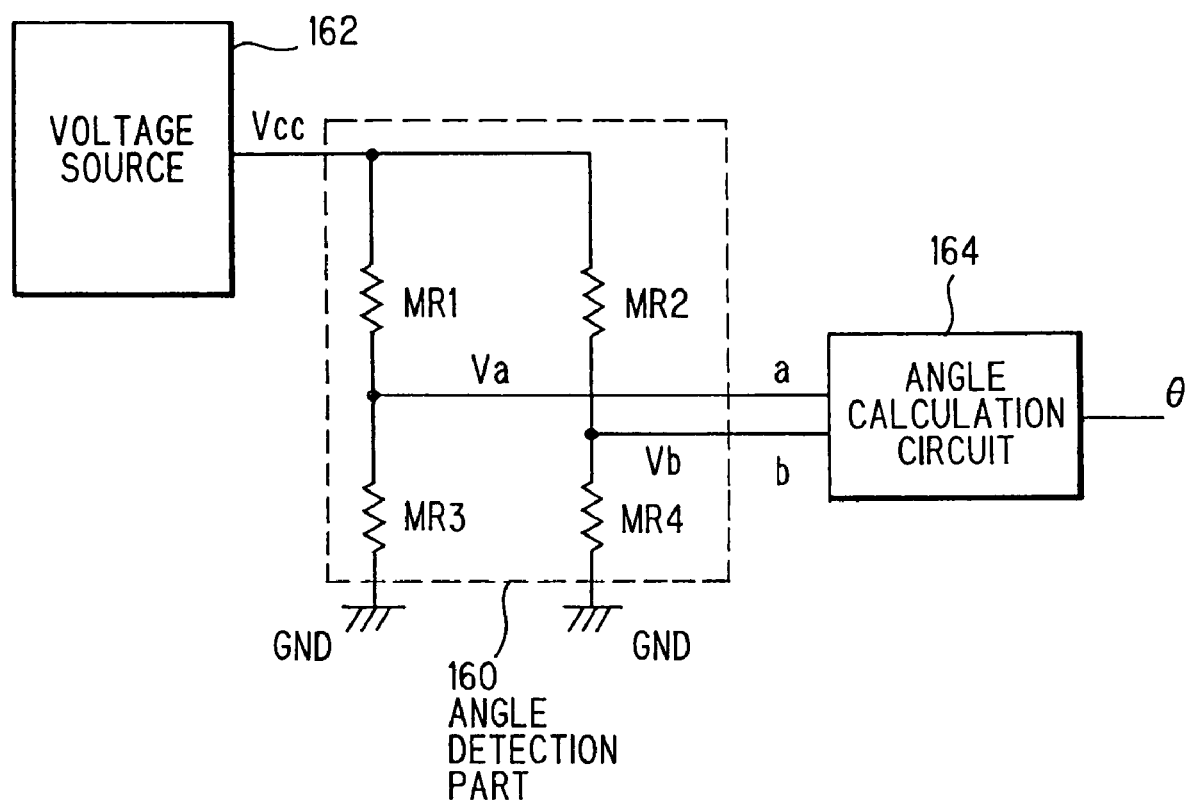
FIG. 24 is a circuit diagram of the angle-torque sensor in the sixth embodiment.

FIG. 24 shows the circuit diagram of the angle detection part 160. Vcc in the angle detection part 160 is connected to a voltage source 162. According to the rotation angle of the input shaft 1, sine-curve two-phase voltages Va, Vb with a phase difference of 90° in electrical angle are generated. An angle calculation circuit 164 calculates steering angle θ based on voltages Va, Vb to be inputted from the angle detection part 160. The calculation formula is as follows.

$$\theta = \tan^{-1}[(Vb-Vo)/(Va-Vo)] \quad (1)$$

where Vo is an offset voltage.

FIGS. 25A to 25D and FIG. 26 show the operation of the magnetoresistance effect element.

FIGS. 25A, 25B, 25C and 25D show the positions of the compensation ring 134 that rotates 0°, 90°, 180° and 270°, respectively in electrical angle to the angle detection part 160 being fixed.

Figure 25:
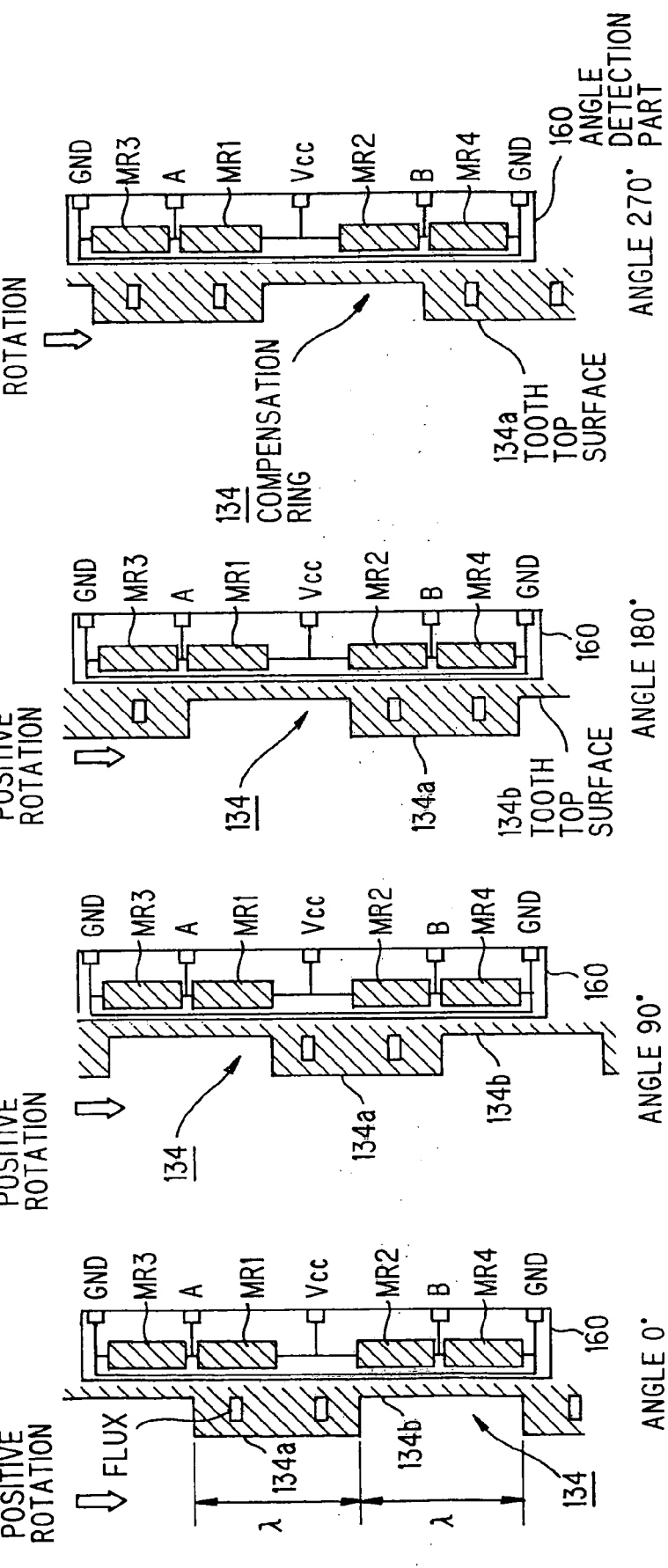
FIGS. 25A to 25D are illustrations showing relative positions between a compensation ring 134 and an angle detection part 160 with magnetoresistance effect elements MR1 to MR4 in FIG. 23 when the compensation ring 134 rotates in the sixth embodiment.

FIG. 25A shows a state that the flux is maximum generated on the surface of the magnetoresistance effect element MR1 and the flux is zero on the surface of the magnetoresistance effect elements MR2, MR3 and MR4. At that time, the resistivity of the magnetoresistance effect element MR1 is minimum and the resistivities of the magnetoresistance effect elements MR1, MR3 and MR4 are maximum. The voltage Va of output terminal a is maximum, which is Vs greater than the offset voltage Vo that is the center value of voltage. The voltage Vb of output terminal b is the offset voltage Vo since the resistivites of the magnetoresistance effect elements MR2 and MR4 are the same value.

Next, when the compensation ring 134 rotates from the state in FIG. 25A in the positive direction, the flux generated on the surface of the magnetoresistance effect element MR1 decreases gradually and the flux on the surface of the magnetoresistance effect element MR2 increases. Therefore, the resistivity of the magnetoresistance effect element MR1 increases and the resistivity of the magnetoresistance effect element MR2 decreases.

As shown in FIG. 25B, when the rotation angle of the compensation ring 134 becomes 90°, only MR2 has the maximum flux and MR1, MR3 and MR4 has a flux of zero. Therefore, the resistivity of the magnetoresistance effect element MR2 is minimum and the resistivities of the magnetoresistance effect elements MR1, MR3 and MR4 are maximum.

The voltage Va lowers from the maximum voltage (Vo+Vs) to the offset voltage Vo when rotated FIG. 25A to FIG. 25B. The voltage Vb increases from the offset voltage Vo to the maximum voltage (Vo+Vs) due to the change in resistivity of the magnetoresistance effect element MR2.

When the compensation ring 134 rotates 90° to 180° (from FIG. 25B to FIG. 25C), the flux generated on the magnetoresistance effect elements MR3 and MR4 increases and the resistivities thereof lower. Therefore, the voltage Va lowers from the offset voltage Vo to the minimum voltage (Vo−Vs) and the voltage Vb lowers from the maximum voltage (Vo+Vs) to the offset voltage Vo.

In like manner, when the compensation ring 134 rotates from 180° to 270° and from 270° to 360°(0°), the flux generated on the respective magnetoresistance effect elements change and therefore the voltages Va, Vb change. These changes are shown in FIG. 26.

As described above, when rotating 0° to 360° in electrical angle, Va and Vb become sine-curve voltages with a phase of 90°. Therefore, the angle calculation circuit 164 in FIG. 24 can calculate the rotation angle of the input shaft 1 by conducting the arctangent operation represented by the formula (1).

The sixth embodiment also has an advantage that the torque detection function can be added without increasing the manufacturing cost because of using the change of flux in conventional output compensation ring except for the angle detection part 160.

Figure 27:
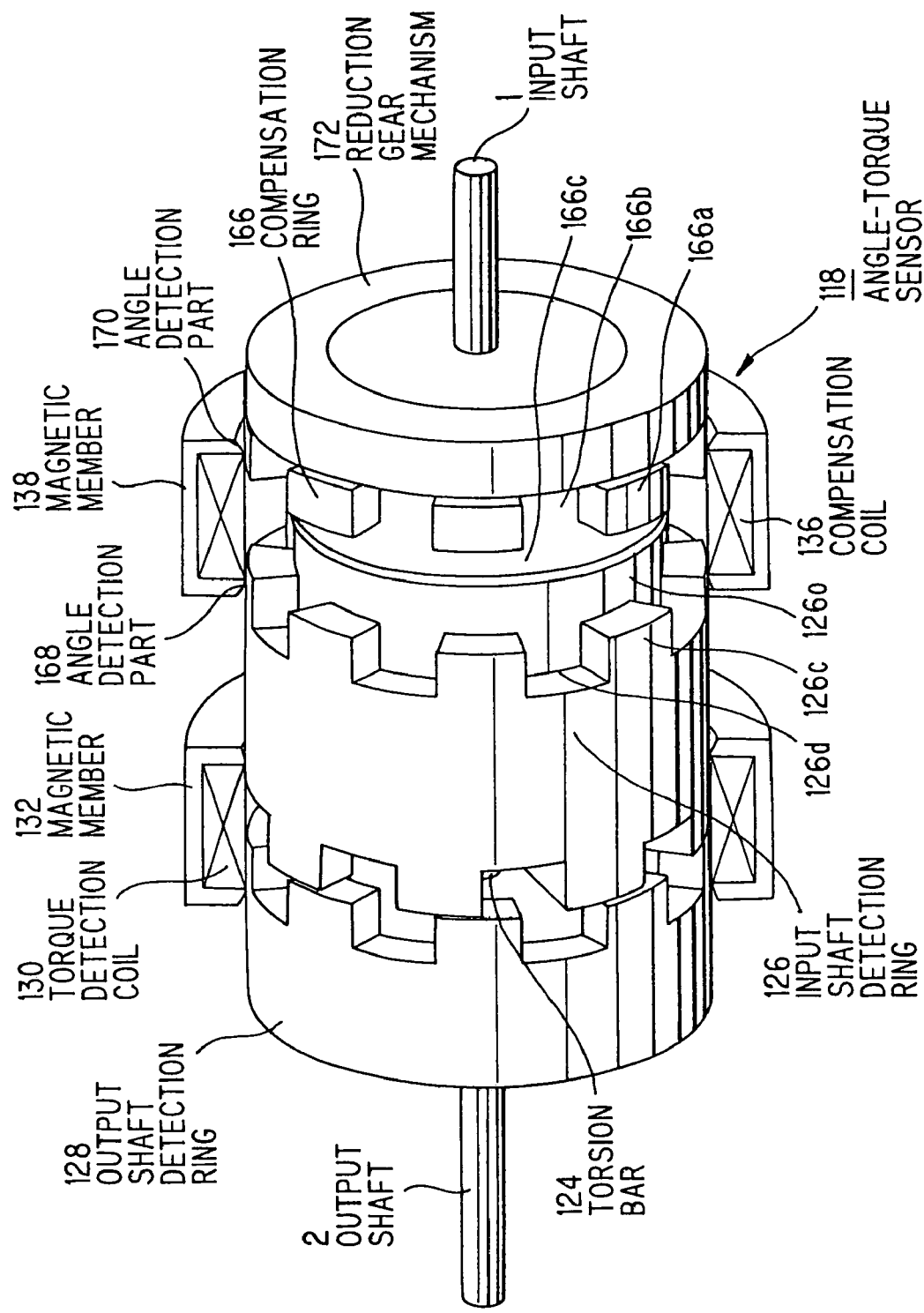
FIG. 27 is a perspective view showing an angle-torque sensor in a seventh preferred embodiment according to the invention.

FIG. 27 shows the structure of an angle-torque sensor 118 in the seventh preferred embodiment according to the invention.

In the seventh embodiment, the angle-torque sensor 118 is capable of detecting the absolute angle of the steering wheel 16 that rotates three to four turns.

The differences between FIG. 27 and FIGS. 14, 21 are the shape of the input shaft detection ring 126 and the compensation ring 166, the shape of the magnetic member 138 on the outer surface of the compensation coil 136, that there are provided angle detection parts 168 and 170 with magnetoresistance effect element, and that there is provided a reduction gear unit 172 to reduce the rotation of the compensation ring 166.

Figure 28:
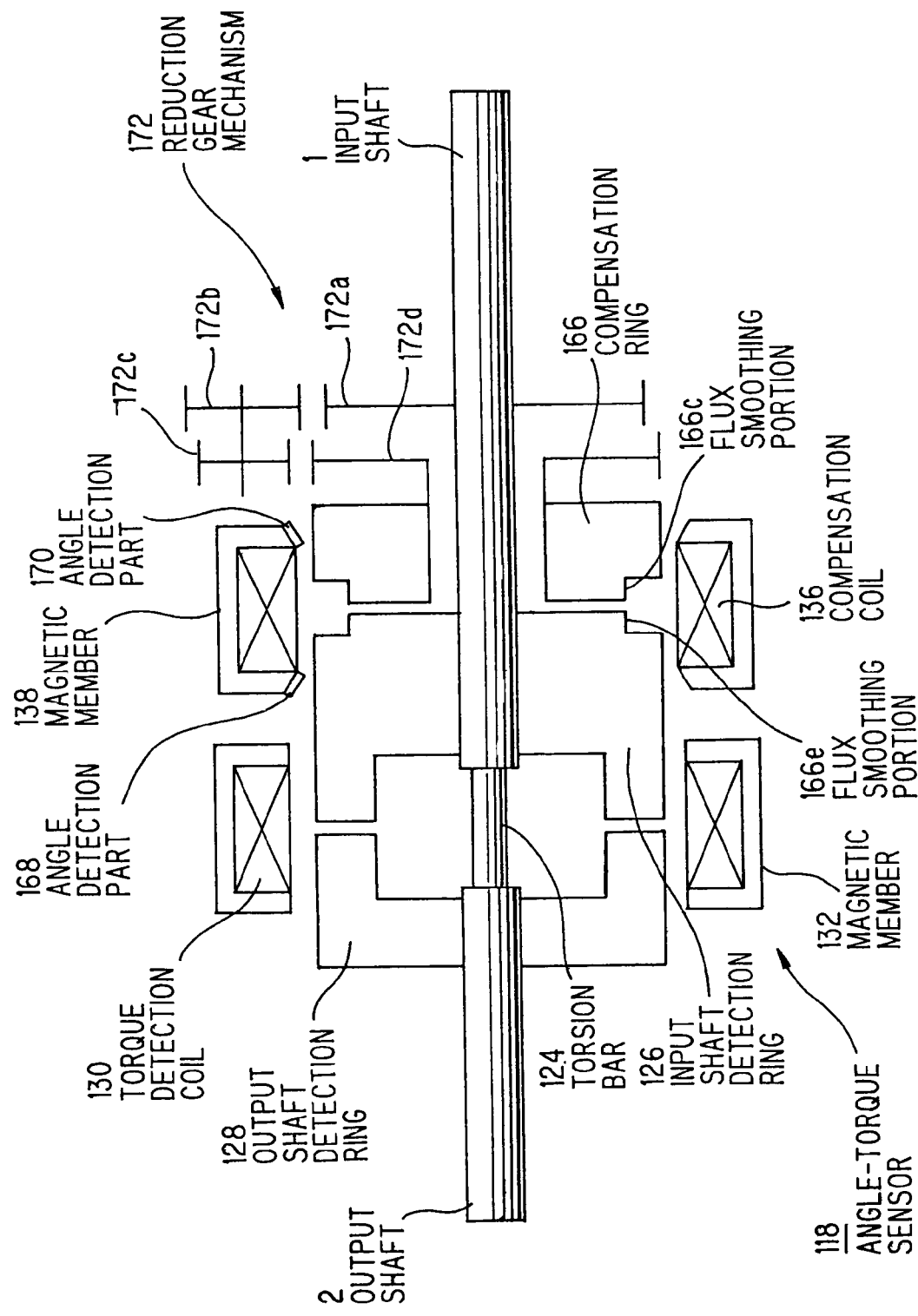
FIG. 28 is a cross sectional view of the angle-torque sensor in FIG. 27.

FIG. 28 is a cross sectional view of the angle-torque sensor 118 in FIG. 27.

The input shaft detection ring 126 and a first gear 172a of the reduction gear unit 172 are connected to the input shaft 1 and rotate with the input shaft 1.

The reduction gear unit 172 is composed of the first gear 172a, a second gear 172b, a third gear 172c and a fourth gear 172d. The second gear 172b engaging with the first gear 172a rotates with the third gear 172c. The third gear 172c engages with the fourth gear 172d connected with the compensation ring 166.

The number of teeth is designed such that, when the input shaft 1 rotates one turn, the compensation ring 166 rotates $31/32$ turn.

By designing thus, when the steering wheel 16 rotates four turns, the input shaft detection ring 126 also rotates four turns and the compensation ring 166 rotates three and ⅞ turns. At that time, the difference in relative rotation angle between the input shaft detection ring 126 and the compensation ring 166 is 45° (⅛ turn) in mechanical angle.

The angle detection part 168 is disposed slantwise on the input shaft detection ring 126 side of the magnetic member 138 to detect the electrical angle of the input shaft detection ring 126, and the angle detection part 170 is disposed slantwise on the compensation ring 166 side of the magnetic member 138 to detect the electrical angle of the compensation ring 166.

The angle detection parts 168 and 170 are slanted to the input shaft 1 since the resistivity changes according to the intensity of magnetic field component parallel to the magnetoresistance effect elements MR1, MR2, MR3 and MR4 provided therein.

Thus, the resistivity of the magnetoresistance effect element in the angle detection part 168 is minimum when the magnetoresistance effect element is positioned at the tooth top portion 126c of the input shaft detection ring 126, and it is maximum when at the tooth bottom portion 126d.

Figure 29A:
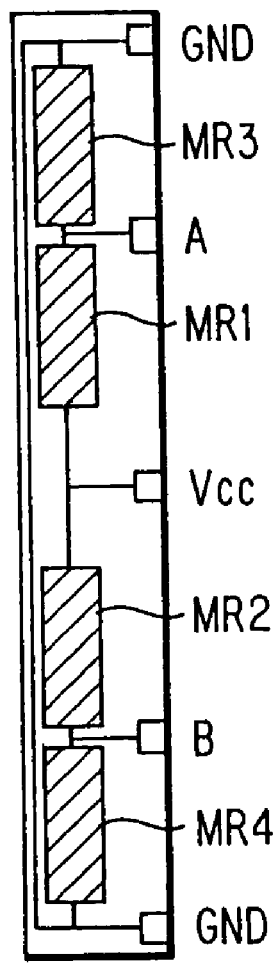
FIGS. 29A and 29B are illustrations showing the composition of an angle detection part 170 in FIG. 27.
Figure 30:
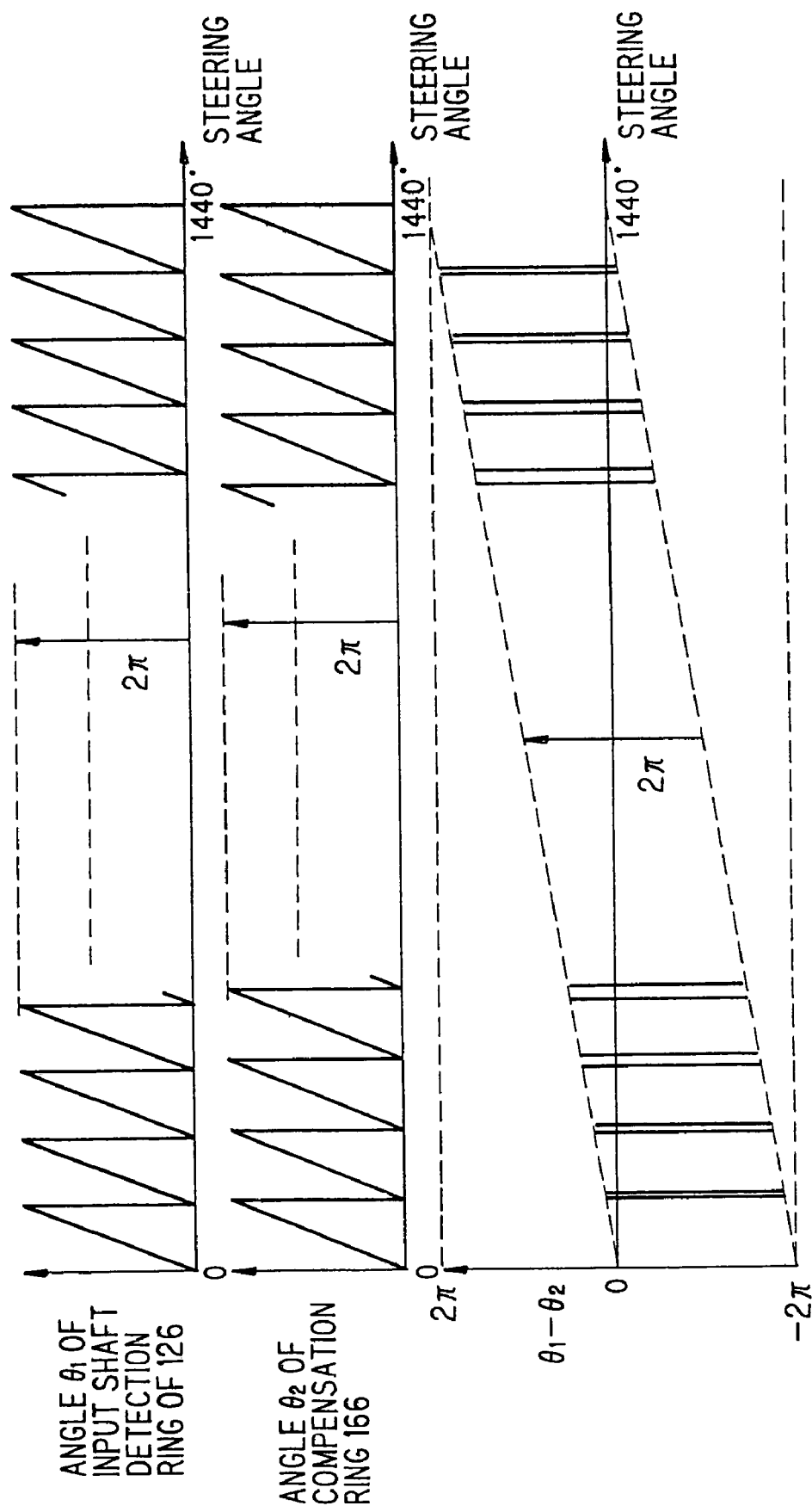
FIG. 30 is a diagram showing angle (electrical angle) θ1 of an input shaft detection ring 126 detected by an angle detection part 168 and angle (electrical angle) θ2 of a compensation ring 166 detected by an angle detection part 170 in the seventh embodiment.

As shown in FIG. 29A, in the angle detection part 168, the arrangement and interconnection of the magnetoresistance effect elements MR1 to MR4 are the same as shown in FIG. 23. FIG. 30 shows angle (electrical angle) θ1 of the input shaft detection ring 126 detected by the angle detection part 168.

Figure 29B:
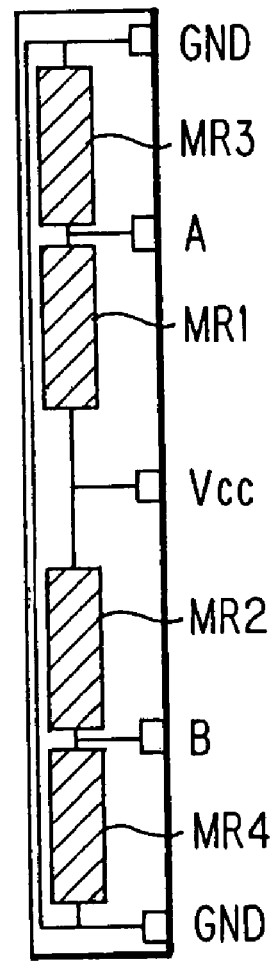

In like manner, the magnetoresistance effect elements MR1 to MR4 of the angle detection part 170 shown in FIG. 29B detect the state of magnetic field at the tooth top portion 166a and tooth bottom portion 166b. FIG. 30 shows angle (electrical angle) θ2 of the compensation ring 166 detected by the angle detection part 170. In this embodiment, 360° in electrical angle is 45° in mechanical angle.

As described earlier, there occurs a difference in relative rotation angle between the input shaft detection ring 126 and the compensation ring 166 depending on the rotation position of the steering wheel 16. FIG. 30 shows the angle difference (θ1-θ2) between the angle θ1 of input shaft detection ring 126 and the angle θ2 of compensation ring 1-66.

Therefore, by detecting the angle difference (θ1–θ2), it can be uniquely determined where the rotation angle of the steering wheel 16 is in the range of 0° to 1440° (=four turns).

As described above, the absolute steering angle can be detected. Moreover, a rotation angel with high resolution can be obtained from angle θ1 of the input shaft detection ring 126 and both angles detected can offer the detection of steering angle with high resolution.

Even when the relative angle between the input shaft detection ring 126 and the compensation ring 166 changes, the magnetic resistance of the magnetic circuit for the compensation coil 136 being composed of the compensation ring 166 and the magnetic member 138 changes little due to flux smoothing portions 126c and 166c shown in FIG. 28. Thus, the magnetic circuit for the compensation coil 136 also has a conventional function that gives a compensation signal of torque sensor.

Figure 31:
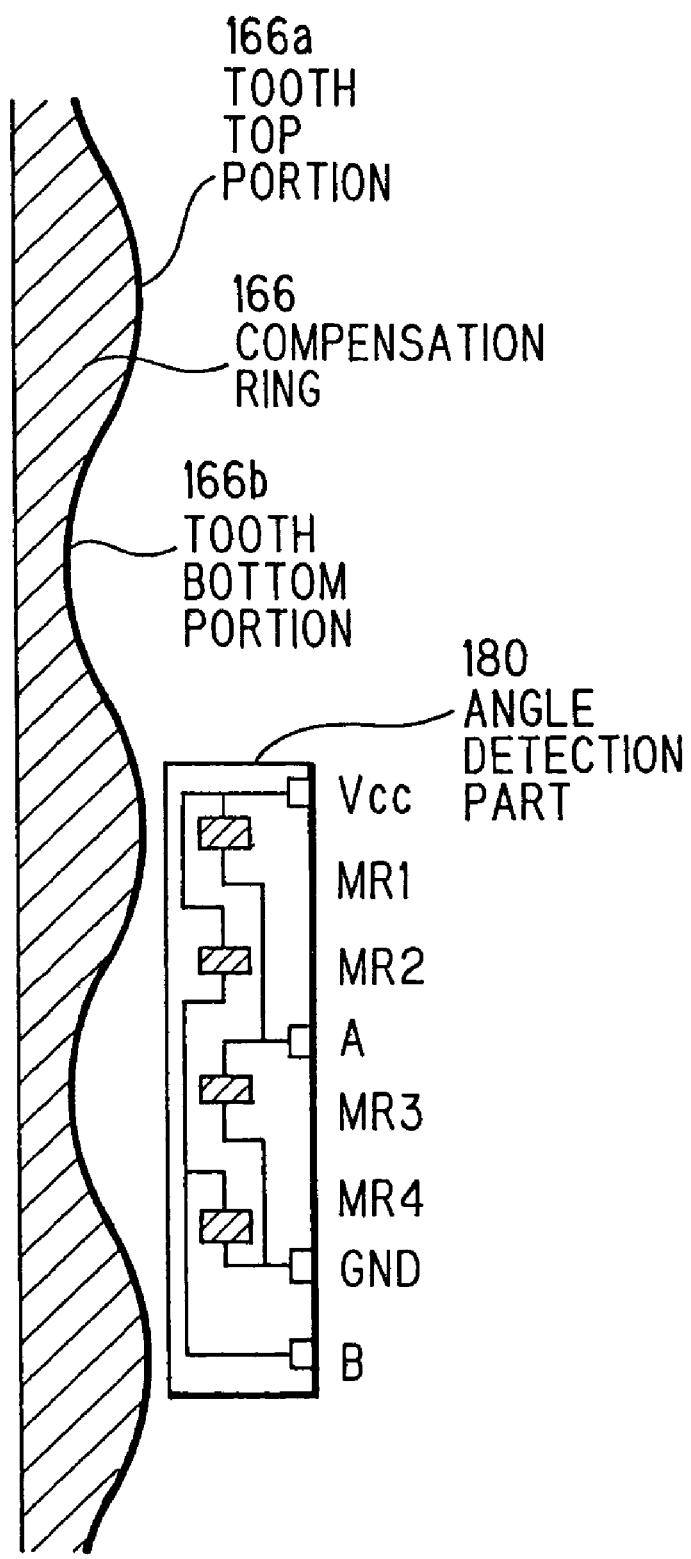
FIG. 31 is an illustration showing a modified shape of the tooth potion of the compensation ring 166 in FIG. 27.

FIG. 31 shows a modified shape of the tooth potion in the compensation ring 166 in FIG. 27. As shown, the shape is changed from rectangular to sine-curved. Thus, the tooth top portion 166a and tooth bottom portion 166b is not flat and is in the form of the peak and bottom of sine curve.

In this case, the intensity of magnetic field is also in the form of sine curve. Therefore, the size of the magnetoresistance effect elements MR1 to MR4 can be reduced as shown in FIG. 31. Namely, the resistivity of the magnetoresistance effect elements MR1 to MR4 changes according to a locally intensive of magnetic field.

FIGS. 32A to 32D show the relationship between the position of magnetoresistance effect element and the intensity of magnetic field. The tooth top portion 166a of the compensation ring 166 is closest to the magnetic member 138 on the compensation coil 136 and therefore the flux concentrates thereon, offering the maximum intensity of magnetic field.

As shown in FIG. 32A, when the rotation angle of the compensation ring 166 is 0° in electrical angle, the magnetoresistance effect element MR1 is at the tooth top portion 166a and therefore the resistivity of the magnetoresistance effect element MR1 becomes minimum. At that time, the magnetoresistance effect element MR3 is at the tooth bottom portion 166b where the intensity of magnetic field is minimum and the resistivity of the magnetoresistance effect element MR3 becomes maximum.

On the other hand, the magnetoresistance effect elements MR2 and MR4 are at a position where the intensity of magnetic field is middle and therefore the resistivities of the magnetoresistance effect elements MR2 and MR4 become the middle value. In this case, the voltage of terminal A is Vs greater than the offset voltage Vo that is the center voltage, and the voltage of terminal B is the offset voltage Vb.

As shown in FIG. 32B, when the compensation ring 166 rotates 90° in electrical angle in the positive position, the magnetoresistance effect elements MR2 and MR4 are at the tooth top portion 166a and the tooth bottom portion 166b, respectively. Therefore, the resistivities of the magnetoresistance effect elements MR2 and MR4 become minimum and maximum, respectively. The resistivities of the magnetoresistance effect elements MR1 and MR3 are both middle value. In this case, the voltage of terminal A is the offset voltage Vo and the voltage of terminal B is Vs greater than the offset voltage Vo.

Further, when the compensation ring 166 rotates 180°, 270° as shown in FIGS. 32C and 32D, the voltage of terminal A and terminal B is determined in like manner.

FIG. 33 shows the change of voltage at terminal A and terminal B as well as the relationship between the position of the compensation ring 166 and the resistivity of the magnetoresistance effect elements MR1 to MR4. As seen from FIG. 33, when the compensation ring 166 rotates 360° in electrical angle, the voltage changes at terminal A and terminal B are in the form of two-phase sine curves that are displaced 90° to each other. Thus, as described earlier, the angle of the compensation ring 166 can be calculated by using these two-phase sine curves.

The feature of the seventh embodiment is that the area of magnetoresistance effect element is reduced and therefore the manufacturing cost can be lowered. This feature can be also applied to the angle detection by the input shaft detection ring 126 although in the seventh embodiment it is applied to the compensation ring 166 in FIG. 27.

Figure 34:
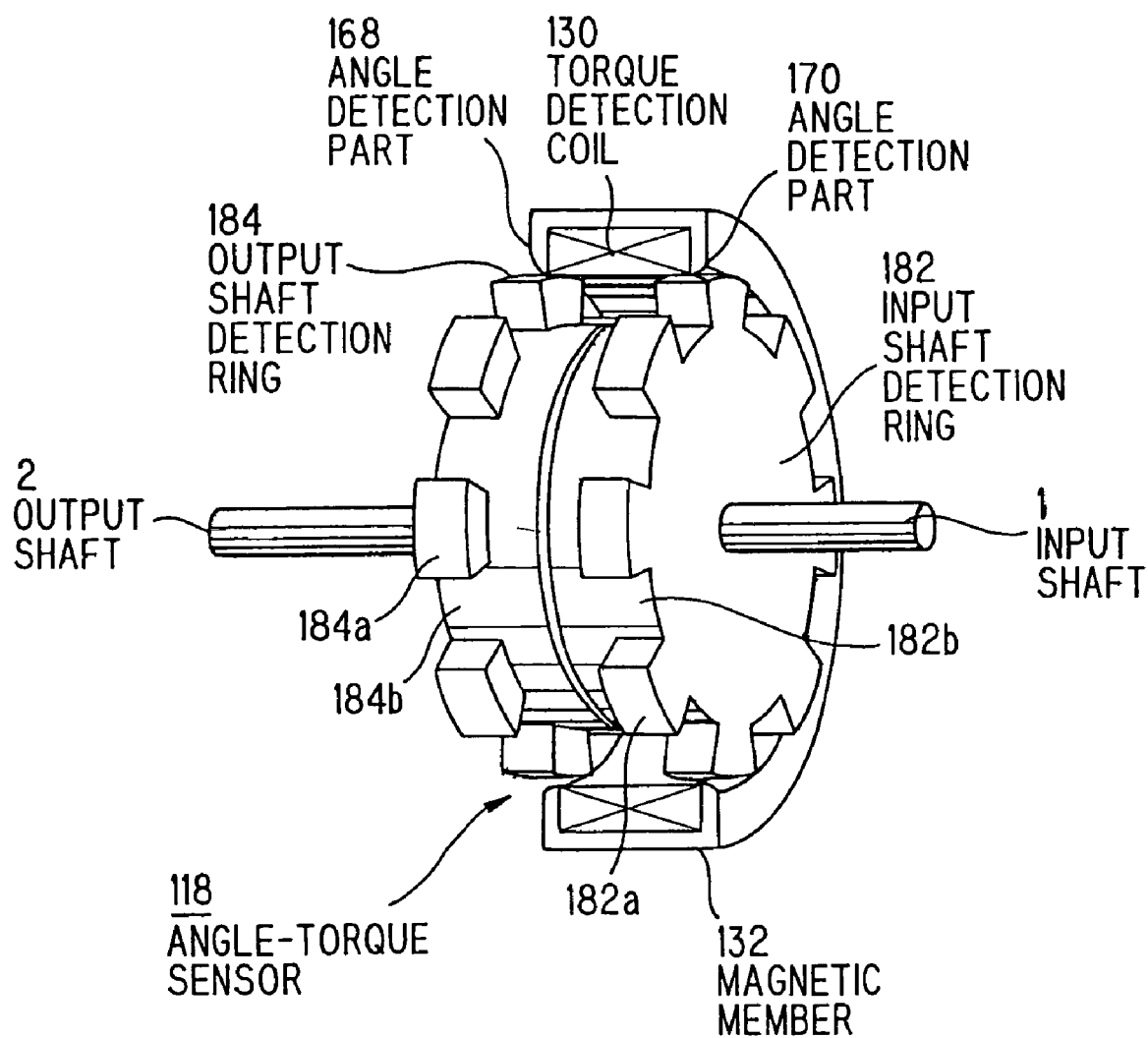
FIG. 34 is a perspective view showing an angle-torque sensor in an eighth preferred embodiment according to the invention.

FIG. 34 shows the structure of an angle-torque sensor 118 in the eighth preferred embodiment according to the invention. In this embodiment, the magnetoresistance effect element is also applied to the detection of torque. The angle-torque sensor 118 is structured such that the compensation coil 136, magnetic member 138, input shaft detection ring 126, compensation ring 170 in FIG. 27 are removed.

Figure 35:
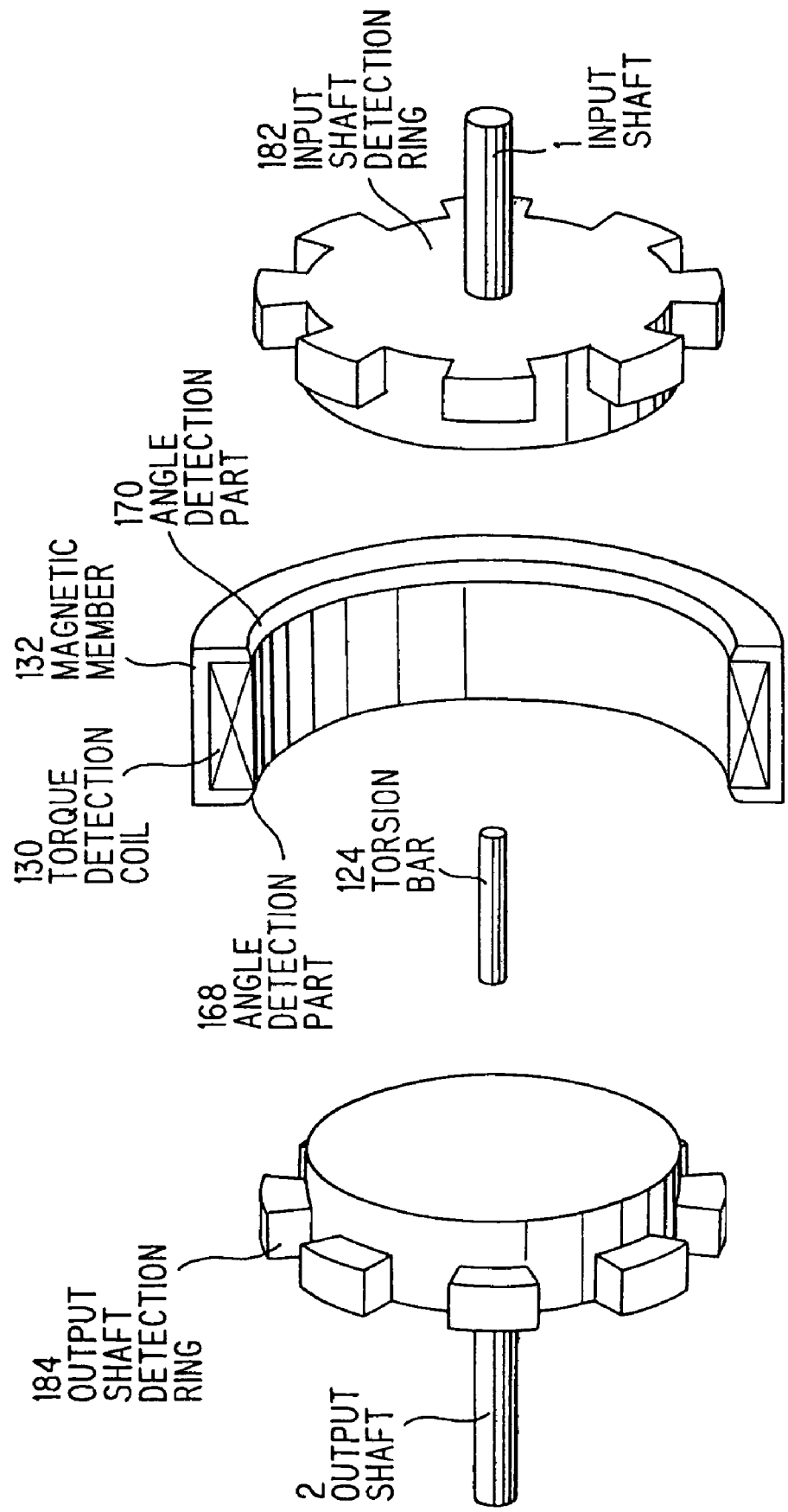
FIG. 35 is a broken view showing the angle-torque sensor in FIG. 34.

FIG. 35 is a broken view of the angle-torque sensor 118 in FIG. 34.

The angle-torque sensor 18 is composed of an input shaft detection ring 182 connected to the input shaft 1, an output shaft detection ring 184 connected to the output shaft 2, the torsion bar 124 connecting between the input shaft 1 and the output shaft 2, the magnetic member 132 composing a magnetic circuit with the input shaft detection ring 182 and the output shaft detection ring 184, the torque detection coil 130 to generates fluxes to the magnetic circuit, and the angle detection parts 168, 170 to detect the angle of the input shaft 1 and output shaft 2.

In operation, the driver operates the steering wheel 16, the steering torque by the driver is transmitted through the steering wheel 16 to the input shaft 1, the input shaft 1 rotates with a steering torque τ, and the torsion bar 124 is twisted in proportion to the steering torque τ.

According to the rotation angle of the input shaft detection ring 182, the intensity of magnetic field changes and the resistivities of magnetoresistance effect elements MR 11, MR12, MR13 and MR14 provided in the angle detection part 170 changes. Also, the resistivities of magnetoresistance effect elements MR 21, MR22, MR23 and MR24 provided in the angle detection part 168 are determined by the intensity of magnetic field that changes according to the rotation angle of the output shaft detection ring 184.

Figure 36:
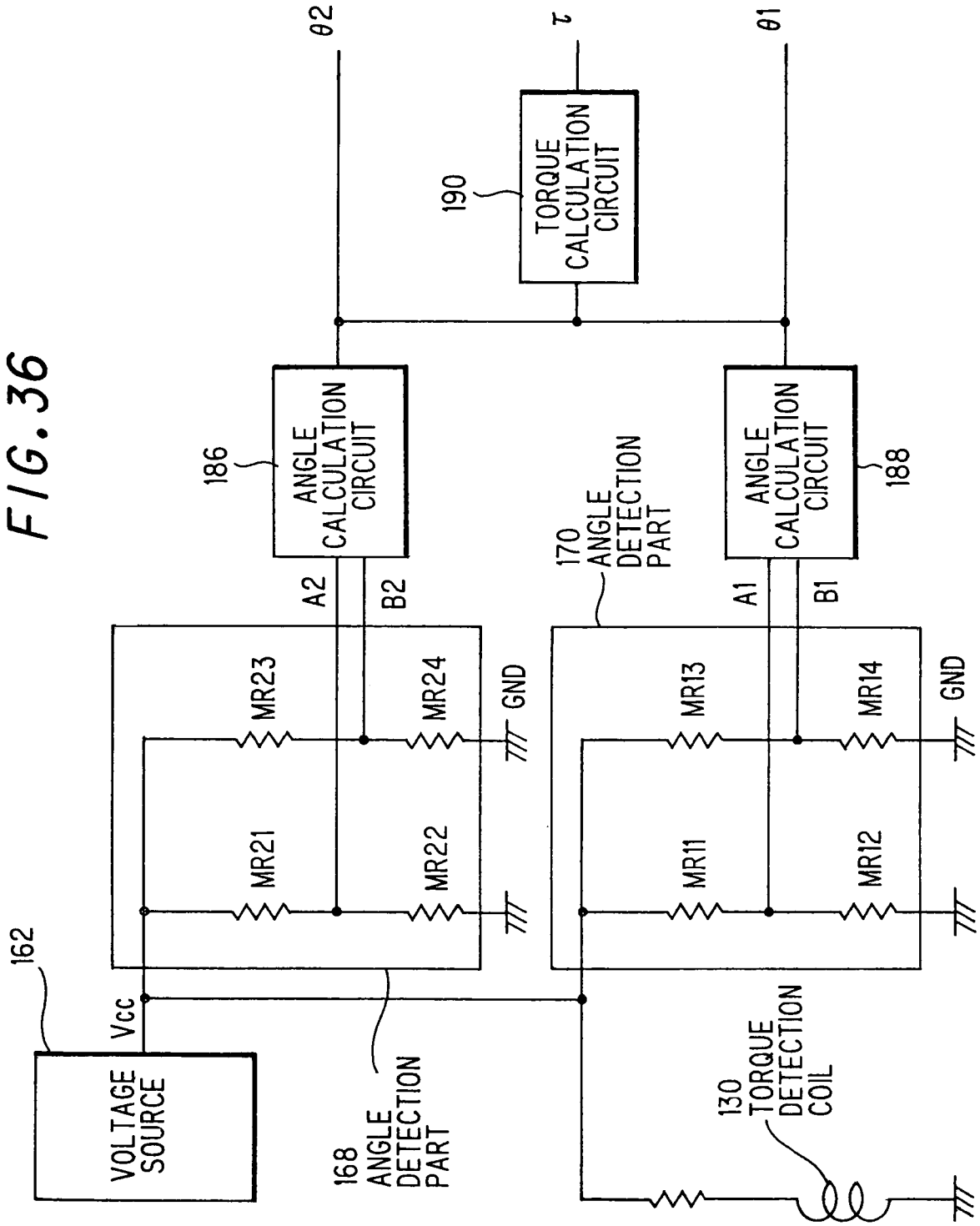
FIG. 36 is a circuit diagram of the angle-torque sensor in FIG. 34.

FIG. 36 show the circuit diagram of the angle-torque sensor 118 in this embodiment. As shown, the torque detection coil 130 is connected to a voltage source 162 that allows constant current to flow into the torque detection coil 130. Thereby, the flux generated flows through the magnetic member 132, output shaft detection ring 184 and input shaft detection ring 182, and the resistivity of magnetoresistance effect element changes as described above.

The magnetoresistance effect elements MR21 and MR22, and magnetoresistance effect elements MR23 and MR24 in the angle detection part 168 are each connected in series to the voltage source 162, and the voltages A2 and B2 are inputted to an angle calculation circuit 186. The calculation to be conducted by the angle calculation circuit 186 is the same as that by the angle calculation circuit 164 in FIG. 24. Thus, angle θ2 of the output shaft 2 can be detected.

In like manner, the magnetoresistance effect elements MR11 and MR12, and magnetoresistance effect elements MR13 and MR14 in the angle detection part 170 are each connected in series to the voltage source 162, and the voltages A1 and B1 are inputted to an angle calculation circuit 188. The angle calculation circuit 188 calculates angle θ1 of the input shaft 1, and the torque τ of the input shaft 1 is calculated from a difference (θ1–θ2) by a torque calculation circuit 190.

In the eighth embodiment, the steering angle of steering wheel 16 is detected as well as the steering torque thereof. Thus, this embodiment can offer a compact angle-torque sensor 118.

Figure 37:
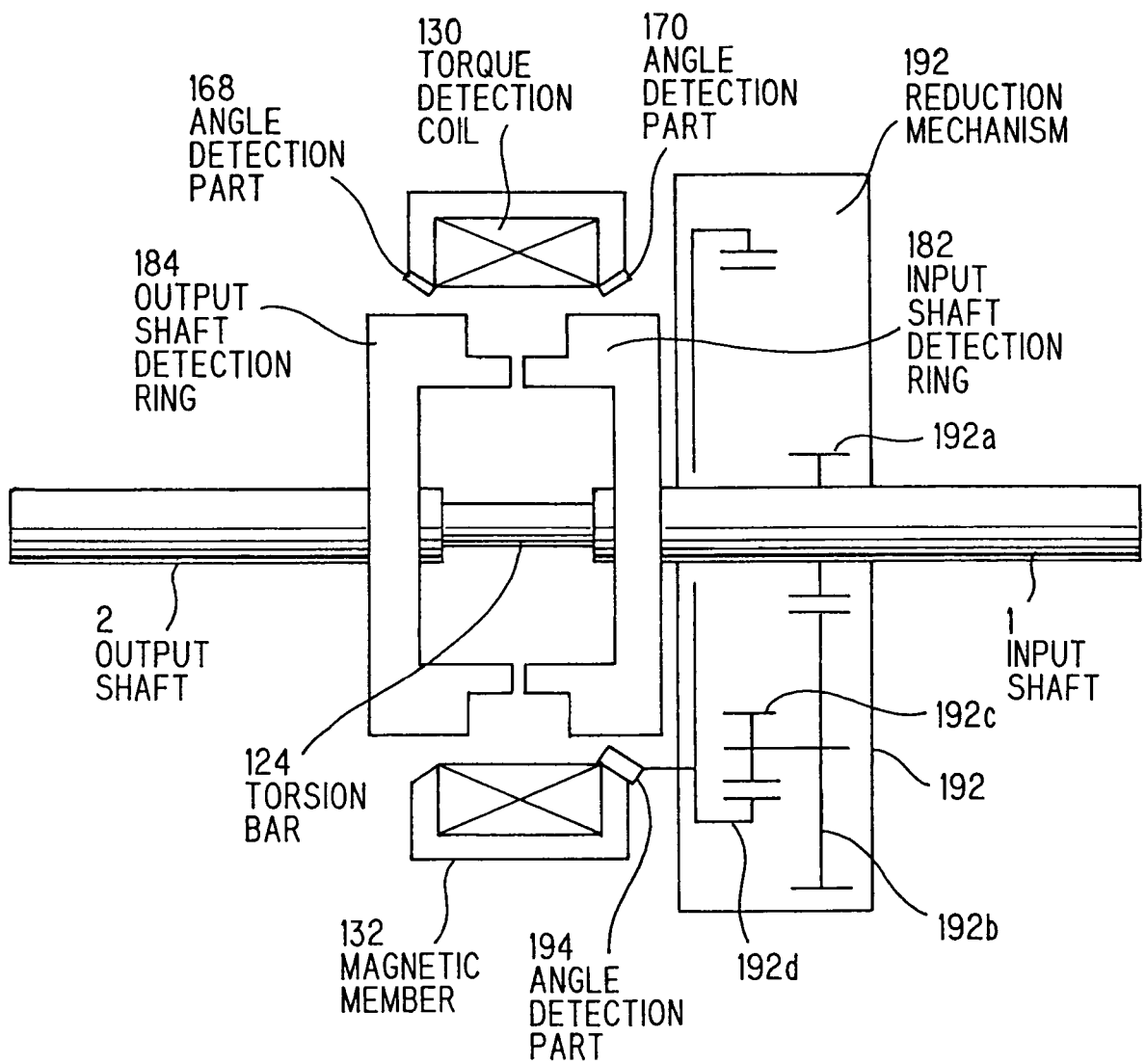
FIG. 37 is a cross sectional view showing an angle-torque sensor in a ninth preferred embodiment according to the invention.

FIG. 37 is a cross sectional view showing the structure of an angle-torque sensor 118 in the ninth preferred embodiment according to the invention. In this embodiment, by only two detection rings, input shaft detection ring 182 and output shaft detection ring 184, the steering torque and absolute steering angle can be detected simultaneously. Namely, the angle-torque sensor 118 in FIG. 34 is further modified. The differences between FIG. 37 and FIG. 34 are a reduction unit 192 to reduce the rotation of the input shaft 1, and an angle detection part 194 disposed for the reduced rotation axis to detect the angle.

The reduction unit 192 is composed of a first gear 192a connected to the input shaft 1, a second gear 192b to rotate being reduced by the first gear 192a, a third gear 192c to rotate on the same axis as the second gear 192b and a fourth gear 192d to further reduce the rotation of the third gear 192c.

The fourth gear 192d rotates around the same rotation axis as the input shaft 1 and rotates 45 in mechanical angle (⅛ turn) while the input shaft 1 rotates four turns.

Thus, according to the rotation angle of the steering wheel 16, angle θ3 obtained by the angle detection part 194 that rotates with the fourth gear 192c changes relatively to θ3 of the input shaft 1 obtained by the angle detection part 170. From the difference between angle θ1 and θ3, the steering angle can be calculated.

In the ninth embodiment, by using only the two detection rings, the steering torque, absolute steering angle and relative steering angle with high resolution can be obtained.

Figure 38:
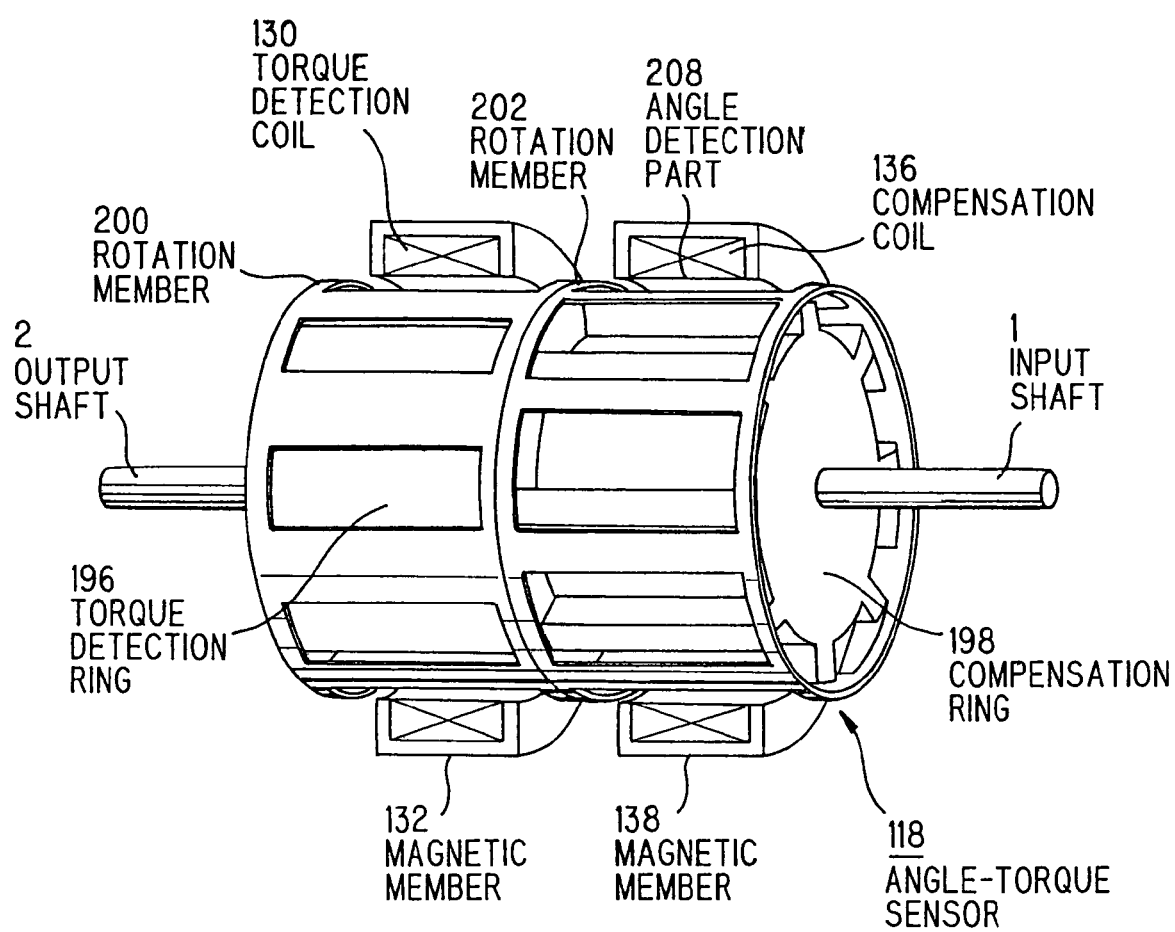
FIG. 38 is a perspective view showing an angle-torque sensor in a tenth-preferred embodiment according to the invention.

FIG. 38 shows the structure of an angle-torque sensor 118 in the tenth preferred embodiment according to the invention. In this embodiment, nonmagnetic rotation members 200 and 202 are used.

FIG. 39 is a broken view of the angle-torque sensor 118 in FIG. 38.

In FIG. 39, a torque detection ring 196 and a compensation ring 198 that rotate with the input shaft 1 are of magnetic material. In contrast, the rotation members 200 and 202 that are connected to the output shaft 2 and rotate with it are of nonmagnetic material. The torsion bar 124 connects between the input shaft 1 and the output shaft 2 and is twisted by a steering torque C applied to the input shaft 1.

The torque detection coil 130 detects the inductance of a magnetic circuit that is composed of the torque detection, ring 196 and the magnetic member 132. The area of magnetic path that the flux passes through changes according to the relative position between a flux-passing aperture provided in the nonmagnetic rotation member 200 and the tooth portion of the torque detection ring 196.

Namely, according to the intensity of steering torque, the area of magnetic path changes and thereby the inductance to be detected by the torque detection coil 130 changes. Thus, by detecting the inductance, the steering torque τ can be calculated.

On the other hand, the nonmagnetic rotation member 202 has a bigger aperture and, therefore, the inductance of a magnetic circuit composed of the compensation ring 198 and the magnetic member 138 is kept constant regardless of the intensity of the twisting of torsion bar. Also, the tooth bottom portion 198b of the compensation ring 198 is designed to have an angle width three times that of the tooth top portion 198a, so that, an inductance obtained when the steering torque is zero is always kept. Therefore, the compensation coil 36 always detects an output voltage corresponding to the inductance obtained when the steering torque is zero. By this voltage, the output of the torque detection coil 130 is compensated. Thus, the steering torque can be detected with high precision while compensating the output signal that may change due to temperature.

The angle detection part 208 with hall elements 204 and 206 is disposed on the inner surface of the compensation coil 136. Provided that the length of tooth top portion 198a of the compensation ring 198 is L, the hall elements 204 and 206 each have a length of 2L. The hall element 204 is disposed on the left edge of the magnetic member 138 and the hall element 206 is disposed on the right edge of the magnetic member 138.

Figure 40A:
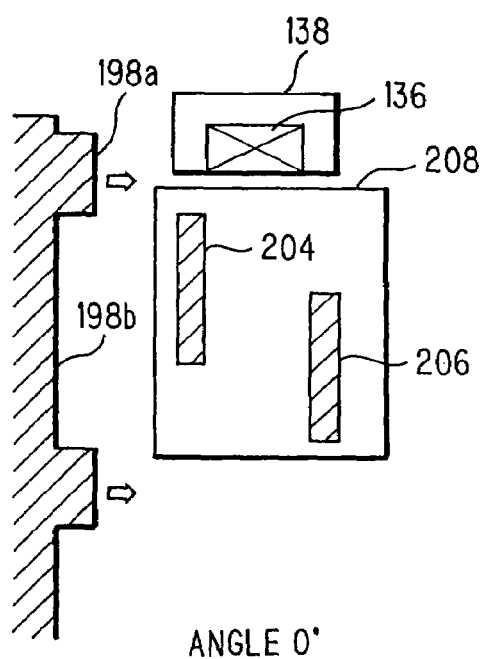
FIGS. 40A to 40D are illustrations showing relative positions between a compensation ring 198 and an angle detection part 208 with hall elements 204 and 204 when the compensation ring 198 rotates in the tenth embodiment.

As shown in FIG. 40A, when the angle is zero, the tooth top portion 198a does not overlap with the hall element 204 nor with the hall element 206. The output voltages of 204, 206 are zero.

Figure 40B:
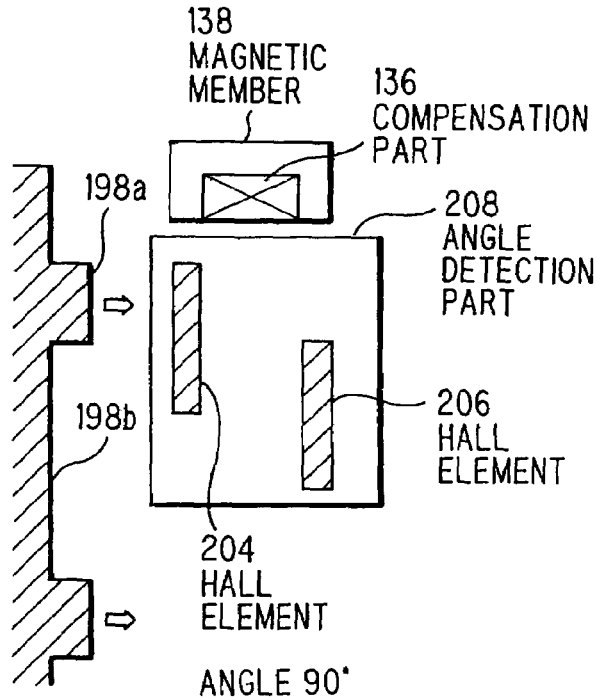

When the compensation ring rotates 90° as shown in FIG. 40B, only the hall element 204 is subject to the maximum flux. Therefore, only the output voltage of the hall element 204 is maximum and the output voltage of the hall element 206 is kept zero.

Figure 40C:
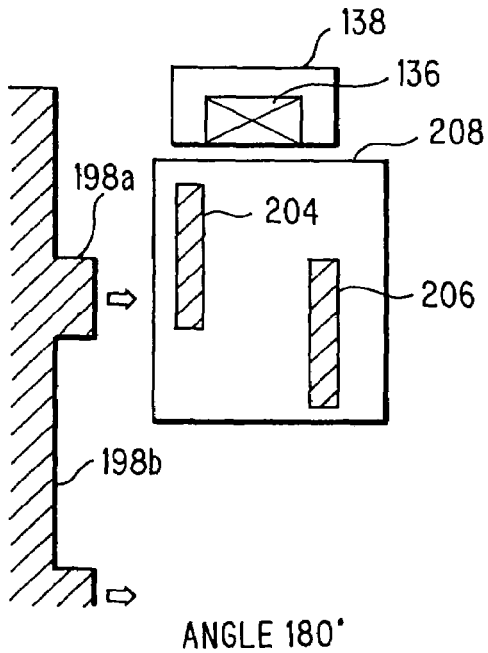

When the compensation ring rotates 180° as shown in FIG. 40C, the hall element 206 is subject to the flux to increase gradually. According to this, the output voltage of the hall element 206 increases to the maximum. During this period, the output voltage of the hall element 204 is kept maximum.

Figure 40D:
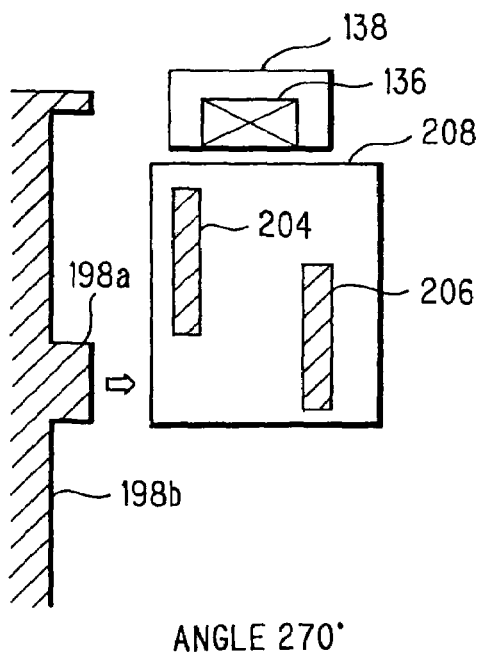

When the compensation ring rotates 270° as shown in FIG. 40D, the hall element 204 is subject to the flux to decrease gradually. According to this, the output voltage of the hall element 204 decreases to zero. When the compensation ring rotates 270° to 360°, the flux to the hall element 206 decreases and finally the voltage reaches zero.

This characteristic is the same as that in the fifth embodiment as shown in FIG. 20. Thus, in the tenth embodiment, the steering torque and steering angle can be detected by the integrated angle-torque sensor while employing the nonmagnetic rotation members.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An angle sensor, comprising:
a rotation axis;
a magnetic body that rotates according to the rotation of said rotation axis;
a coil that generates a flux in a magnetic path including said magnetic body;
a magnetic sensing element that detects the flux which changes according to the rotation of said rotation axis; and
a detection circuit that detects the rotation angle of said rotation axis by using the output of said magnetic sensing element according to the change of flux.

2. An angle sensor, comprising:
a rotation axis;
a magnetic body that includes a tooth portion and rotates according to the rotation of said rotation axis;
a coil that generates a flux in a magnetic path including said magnetic body;
a plurality of magnetic sensing elements that detect a change in flux according to the rotation of said rotation axis in said magnetic path and output alternating signals with different phases from each other; and
a detection circuit that detects the rotation angle of said rotation axis by using the alternating signals;
wherein said tooth portion of said magnetic body is capable of moving relatively to said magnetic sensing elements and rotates according to said rotation axis.

3. An angle sensor comprising:
a rotation axis; a magnetic body that includes a tooth portion and rotates according to the rotation of said rotation axis;
a coil that generates a flux in a magnetic path including said magnetic body;
a plurality of magnetic sensing elements that detect a change in flux according to the rotation of said rotation axis in said magnetic path and output alternating signals with different phases from each other; and
a detection circuit that detects the rotation angle of said rotation axis by using the alternating signals;
wherein said tooth portion of said magnetic body is capable of moving relatively to said magnetic sensing elements and rotates according to said rotation axis and wherein said magnetic sensing elements each have a length of approximately half the width of protrusion or groove of said tooth portion, and
said detection circuit is a bridge circuit that uses at least two of said magnetic sensing elements and output alternating signals with different phases from each other.

4. An angle-torque sensor, comprising:
first and second rotation axes that are connected to a torsion bar to be twisted by a torque;
a first magnetic body tat rotates with said first rotation axis;
a second magnetic body that rotates with said second rotation axis;
a torque detection coil that generates a flux in a magnetic path including said first and second magnetic bodies;
a torque detection circuit that detects the output voltage of said torque detection coil which changes according to a relative position between said first and second magnetic bodies;
a third magnetic body tat rotates according to the rotation of said second rotation axis;
a compensation coil that generates a flux in a magnetic path including said second and third magnetic bodies;
a compensation circuit that corrects the output of said torque detection circuit by using the output voltage of said compensation coil;
a first magnetic sensing element that detects a flux which changes according to the rotation of said third magnetic body; and
a first angle detection part that detects the rotation angle of said third magnetic body from the output of said first magnetic sensing clement according to the change in flux.

5. An electric power steering unit, comprising:
a steering sensor that includes; a first and second rotation axes that are connected to a torsion bar to be twisted by a steering torque; a first magnetic body that rotates with said first rotation axis; a second magnetic body that rotates with said second rotation axis; a torque detection coil that generates a flux in a magnetic path including said first and second magnetic bodies; a torque detection circuit that detects the output voltage of said torque detection coil which changes according to a relative position between said first and second magnetic bodies; a third magnetic body that rotates according to the rotation of said second rotation axis; a compensation coil that generates a flux in a magnetic path including said second and third magnetic bodies; a compensation circuit that corrects the output of said torque detection circuit by using the output voltage of said compensation coil; a first magnetic sensing element that detects a flux which changes according to the rotation of said third magnetic body; and a first angle detection part that detects the rotation angle of said third magnetic body from the output of said first magnetic sensing element according to the change in flux; and
a motor that drives a steering rotation axis;
wherein the torque of said motor is controlled by using said steering torque and steering angle detected by said steering sensor.

* * * * *